US009727296B2

(12) United States Patent
Wan et al.

(10) Patent No.: US 9,727,296 B2
(45) Date of Patent: Aug. 8, 2017

(54) DISPLAY SWITCHING METHOD, INFORMATION PROCESSING METHOD AND ELECTRONIC DEVICE

(71) Applicant: Lenovo (Beijing) Co., Ltd., Beijing (CN)

(72) Inventors: Xi Wan, Beijing (CN); Xu Zhao, Beijing (CN); Ge Gao, Beijing (CN); Yuanyuan Deng, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 87 days.

(21) Appl. No.: 14/584,630

(22) Filed: Dec. 29, 2014

(65) Prior Publication Data

US 2015/0378662 A1    Dec. 31, 2015

(30) Foreign Application Priority Data

Jun. 27, 2014  (CN) .......................... 2014 1 0302611
Jul. 31, 2014  (CN) .......................... 2014 1 0374861
Sep. 9, 2014   (CN) .......................... 2014 1 0455816

(51) Int. Cl.
*G09G 5/14*      (2006.01)
*G06F 3/14*      (2006.01)
(Continued)

(52) U.S. Cl.
CPC ........... *G06F 3/1423* (2013.01); *G04G 21/00* (2013.01); *G06F 1/163* (2013.01); *G06F 1/1647* (2013.01);
(Continued)

(58) Field of Classification Search
CPC .......... G06F 3/012; G06F 3/013; G06F 3/014; G06F 3/016; G06F 3/017; G06F 3/0346;
(Continued)

(56) References Cited

U.S. PATENT DOCUMENTS 8,754,831 B2    6/2014   Kollin
2009/0228820 A1*  9/2009   Kim .................... G06F 3/04817
                                                        715/769

(Continued)

FOREIGN PATENT DOCUMENTS

CN    101072293    11/2007
CN    101529364     9/2009
(Continued)

OTHER PUBLICATIONS

First Office Action dated Apr. 18, 2017 (15 pages including English translation) out of Chinese Priority Application No. 201410302611.1.

*Primary Examiner* — Lun-Yi Lao
*Assistant Examiner* — Jarurat Suteerawongsa
(74) *Attorney, Agent, or Firm* — Brinks Gilson & Lione; G. Peter Nichols

(57) ABSTRACT

A wearable electronic device and a display switching method thereof, includes turning on a first display apparatus of the wearable electronic device to make the first display apparatus in a working state; rendering a first image in a first display region of the first display apparatus with a first display effect by the first display apparatus; obtaining first parameter information related to an input operation, by a sensing apparatus of the wearable electronic device; judging whether a second display apparatus of the wearable electronic device is to be turned on or not, according to the sensing parameter; and rendering a second image in a second display region of the second display apparatus with a second display effect by the second display apparatus, when the second display apparatus is to be turned on to make the second display apparatus in the working state.

34 Claims, 31 Drawing Sheets

(51) Int. Cl.
*G06F 3/01* (2006.01)
*G06F 1/16* (2006.01)
*G04G 21/00* (2010.01)

(52) U.S. Cl.
CPC ............ *G06F 1/1694* (2013.01); *G06F 3/013* (2013.01); *G09G 2320/08* (2013.01); *G09G 2330/022* (2013.01); *G09G 2340/0407* (2013.01); *G09G 2354/00* (2013.01); *G09G 2358/00* (2013.01); *G09G 2370/22* (2013.01)

(58) Field of Classification Search
CPC ......... G06F 2200/1637; G06F 3/03547; G06F 3/041; G06F 3/0412; G06F 3/0414; G06F 3/046; G06F 3/047; G06F 2203/041; G06F 3/044; G06F 3/045; G06F 3/0428; G06F 2203/04109; G06F 3/1423; G06F 1/163; G06F 1/1647; G06F 1/1694; G06F 2203/04107; G06F 2203/04111; G06F 2203/04112; G06F 2203/04113; G06F 3/042; G06F 3/0421; G06F 3/0423; G09G 1/005; G09G 2330/021; G09G 2330/022; G09G 2330/023; G09G 2330/024; G09G 2330/025; G09G 2330/026; G09G 2330/027; G09G 5/14; G09G 5/373; G09G 2320/08; G09G 2354/00; G09G 2358/00; G09G 2370/22

See application file for complete search history.

(56) References Cited

U.S. PATENT DOCUMENTS

| 2010/0013863 | A1 | 1/2010 | Harris |
| 2014/0179225 | A1* | 6/2014 | Teng ................. H04M 1/72522 455/41.1 |
| 2015/0160622 | A1* | 6/2015 | Kim ....................... G04G 21/02 368/9 |
| 2015/0193102 | A1* | 7/2015 | Lanier .................... G06F 3/017 715/746 |
| 2016/0048212 | A1 | 2/2016 | Leng |

FOREIGN PATENT DOCUMENTS

| CN | 103294369 | 9/2013 |
| CN | 103530060 | 1/2014 |
| CN | 103733247 | 4/2014 |
| EP | 1 316 877 | 6/2003 |

\* cited by examiner watching at a remote
distance:time display watching at a near
distance:time display watching at a remote
distance:brief information watching at a near distance:
detailed information watching at a remote
distance:direction watching at a near
distance:detailed geographic
location information watching at a remote
distance:exercise state watching at a near
distance:current change in the
exercise intensity watching at a remote
distance:icon watching at a near
distance:icon overview

DISPLAY SWITCHING METHOD, INFORMATION PROCESSING METHOD AND ELECTRONIC DEVICE

This application claims priority to Chinese patent application No. 201410302611.1 filed on Jun. 27, 2014; Chinese patent application No. 201410374861.6 filed on Jul. 31, 2014; and Chinese patent application No. 201410455816.3 filed on Sep. 9, 2014, the entire contents of which are incorporated herein by reference.

BACKGROUND

The present disclosure relates to the field of computer technology, and more particularly, relates to a display switching method, an information processing method and an electronic device.

Currently, a wearable electronic device such as a smart watch is generally equipped with a general display such as a liquid crystal display (LCD), an Organic Electro-luminescence Display, an Organic Light-Emitting Diode (OLED) display, and so on. However, since the wearable electronic device such as the smart watch is limited by the size thereof, the display area of the equipped general display is very small, and only limited information within the size can be displayed.

Therefore, there is a need of an electronic device, an information processing method and a display switching method, which can provide an image or video display with a larger size and a higher resolution, without being limited by the size of the wearable electronic device such as the smart watch itself.

SUMMARY

In an aspect of the present disclosure, a display switching method for a wearable electronic device is provided, the method comprising: turning on a first display apparatus of the wearable electronic device to make the first display apparatus in a working state; rendering a first image in a first display region of the first display apparatus with a first display effect by the first display apparatus; obtaining sensing parameter related to an input operation, by a sensing apparatus of the wearable electronic device; judging whether a second display apparatus of the wearable electronic device is to be turned on or not and obtaining a first judging result, according to the sensing parameter; and rendering a second image in a second display region of the second display apparatus with a second display effect by the second display apparatus, when the first judging result indicates that the second display apparatus is to be turned on to make the second display apparatus in the working state.

In another aspect of the present disclosure, a wearable electronic device is provided, comprising: a first turning-on unit for turning on a first display apparatus of the wearable electronic device to make the first display apparatus in a working state; a first rendering unit for rendering a first image in a first display region of the first display apparatus with a first display effect by the first display apparatus; an information obtaining unit for obtaining sensing parameter related to an input operation performed by a user, by a sensing apparatus of the wearable electronic device; an operation judging unit for judging whether a second display apparatus of the wearable electronic device is to be turned on or not and obtaining a first judging result, according to the sensing parameter; and a second rendering unit for rendering a second image in a second display region of the second display apparatus with a second display effect by the second display apparatus, when the first judging result indicates that the second display apparatus is to be turned on to make the second display apparatus in the working state.

In a further aspect of the present disclosure, an information recording medium is provided, having stored therein a program for switching a display of a wearable electronic device by the following steps when being executed by a processor of the wearable electronic device: turning on a first display apparatus of the wearable electronic device to make the first display apparatus in a working state; rendering a first image in a first display region of the first display apparatus with a first display effect by the first display apparatus; obtaining first parameter information related to an input operation performed by a user, by a sensing apparatus of the wearable electronic device; judging whether a second display apparatus of the wearable electronic device is to be turned on or not and obtaining a first judging result, according to the sensing parameter; and rendering a second image in a second display region of the second display apparatus with a second display effect by the second display apparatus, when the first judging result indicates that the second display apparatus is to be turned on to make the second display apparatus in the working state.

BRIEF DESCRIPTION OF THE DRAWINGS

The drawings are provided for a further understanding of the present disclosure, and consist a part of the description, which is used to explain the present disclosure together with the embodiments of the present disclosure and are not limitative of the present disclosure.

DETAILED DESCRIPTION

Figure 1:
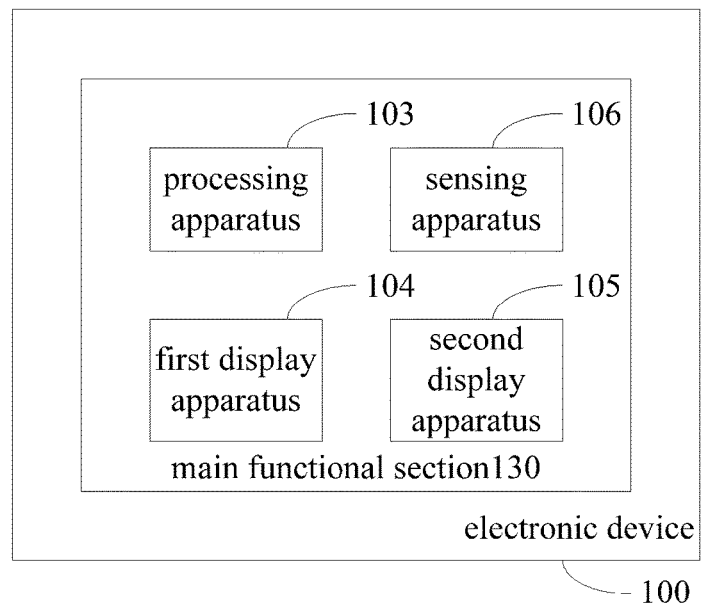
FIG. 1 illustrates a functional block diagram of an electronic device according to an embodiment of a first implementation of the present disclosure.

The embodiments of the disclosure will be described in detail with reference to the accompany drawings. Herein, it is noted that like reference number is given to consisting parts with the same or similar structure and function substantially, and the repeated description of them will be omitted.

(First Implementation)

As described in the background, since the wearable electronic device such as the smart watch is limited by the size itself, the display area of the equipped conventional display is generally very small, and only limited information can be displayed, and thus there are the following facts in use:

1. Limited Display Content

The volume of the wearable electronic device (particularly, a wrist device) is much smaller than other electronic devices such as a mobile phone or the like due to its portability, which necessarily results in the content displayed in the display interface being limited, and rich and detailed information cannot be displayed as in an electronic device equipped with a large screen.

2. Complex Operation

The wearable electronic device has a function for the user to process his/her personal issues at any time, for example, looking up for contacts, reading messages, checking pictures, or the like. However, since it only has a display interface with a small screen, many frequent operations may be necessary to complete the reading and input of content with a large information amount.

3. Inconvenient Acquisition of Key Information

Since the user may not always be in a state of focusing on acquiring information when using the wearable electronic device, and the content which should be rendered in the large screen originally is always of a large information amount, the user may often feel inconvenient to acquire key information quickly when it is rendered in the small screen of the wearable electronic device directly.

As for the above first fact, in the related art, the display screen of the wearable electronic device may be enlarged as much as possible. However, this will definitely make the wearable electronic device bulk. Moreover, considering the convenience when being worn on the user body, the size of the display screen even being enlarged is still limited.

As for the above second fact, in the related art, the operation manner and the human-machine interaction interface of the wearable electronic device may be modified. However, currently, the convenience of acquiring information by the user is still not improved in essence.

As for the above third fact, there is no good solution currently in the related art.

In view of this, an electronic device and a display switching method are provided in the embodiments of the present disclosure, which can provide an image or video display with a larger size and a higher resolution, without being limited by the size of the wearable electronic device such as the smart watch itself. Moreover, the content displayed in the electronic device can be judged and switched automatically according to the distance of the viewer.

Hereinafter, the electronic device according to the embodiment of the first implementation of the present disclosure will be described with reference to FIG. 1.

FIG. 1 illustrates a functional block diagram of the electronic device according to the embodiment of the first implementation of the present disclosure.

In terms of the function, as shown in FIG. 1, the electronic device 100 according to the embodiment of the present disclosure includes a main functional section 130. The main functional section 130 may be a circuit section for completing various operation functions, such as displaying information, generating sound, capturing images, or the like, in the electronic device.

Particularly, the main functional section 130 includes a processing apparatus 103, a first display apparatus 104, a second display apparatus 105 and a sensing apparatus 106.

Obviously, the consisting parts of the main functional section are not limited thereto. For example, the main functional section 130 may further include other additional units not shown, for example, a power supply apparatus such as a battery unit, an image capturing apparatus such as a camera, a sound regenerating unit such as a loudspeaker, or the like.

In the main functional section 130, the processing apparatus 103 is used to generate a display image to be displayed and perform a display control.

For example, the processing apparatus 103 may include a central processing unit (CPU), a micro processing unit (MPU), a digital signal processor (DSP), a field programmable gate array (FPGA), an application specific integrated circuit (ASIC) and/or other chips with a processing capability, or the like.

The first display apparatus 104 has a first display output region, and is used to render a first image with a first display effect in the first display output region. Particularly, the first display apparatus 104 may output the first image generated by the processing apparatus 103 under the display control performed by the processing apparatus 103. For example, the first image may be display data of any type, which may include, but not limited to, an image, a video, a text, or even more generally, a graphic user interface of an application, or a standby picture (which may be referred to as a home interface) of the electronic device 100, or the like. Further, the first display apparatus 104 may be a display apparatus following various display principles, and the first display effect is dependent on the display principle of the first display apparatus 104.

Similarly, the second display apparatus 105 has a second display output region, and is used to render a second image with a second display effect in the second display output region. Particularly, the second display apparatus 105 may output the second image generated by the processing apparatus 103 under the display control performed by the processing apparatus 103. For example, the second image may be display data of any type, which may include, but not limited to, an image, a video, a text, or even more generally, a graphic user interface of an application, or a standby picture (which may be referred to as a home interface) of the electronic device 100, or the like. Further, the second display apparatus 105 may be a display apparatus following various display principles, and the second display effect is dependent on the display principle of the second display apparatus 105.

The sensing apparatus 106 is used to obtain parameter information related to an input operation performed by the viewer. For example, the parameter information is used to characterize the input operation on the electronic device 100 by the viewer.

Particularly, the sensing apparatus 106 may be a sensor following various sensing principles. For example, the sensing apparatus 106 may include, but not limited to, a gyro, a gravity sensor, a near distance sensor, a pressure sensor, a touch sensor, and/or other sensors capable of detecting a spatial location, for example, an image capturing apparatus, a sound capturing apparatus, a biometric feature capturing apparatus, or the like, to capture various parameter information of the same or different types, so that it is determined whether the input operation on the electronic device 100 by the viewer meets a predetermined condition or not.

In terms of structure, the electronic device 100 according to the embodiment of the present disclosure may be any electronic device including the above apparatuses. For example, it may be a wearable electronic device or an electronic device of any other type.

In one case that the electronic device 100 is the wearable electronic device, it may include a frame, a fixing apparatus connected to the frame and a main functional section, the fixing apparatus being used for maintaining a relative location relationship with a user of the electronic device 100.

Further, in another case that the electronic device 100 is the head mounted electronic device, the fixing apparatus may have corresponding support parts according to the shape of the head mounted electronic device (for example, the head mounted electronic device being a smart glass or a helmet display). For example, in the case of the smart glass, the fixing apparatus are two support parts connecting at both sides of the smart glass (i.e., the glass legs and the nosepiece) or third support parts at both sides and in the middle of the glass (i.e., the glass legs, the mirror frame and the nosepiece), so that the glass legs at both sides of a space and the nosepiece in the middle of the space form a nearly rectangular space surrounding the human head. When the user is equipped with the head mounted electronic device, the display output region of the display apparatus is arranged in the eye region of the user, so that the outgoing direction of the display apparatus is directed to the human eye. Further, the electronic device 100 may be a wrist mounted electronic device with such as a watch shape or a finger mounted electronic device with such as a ring shape.

Hereinafter, an application scenario of a wrist mounted electronic device will be further described in detail in a detailed example with reference to FIG. 2.

Figure 2:
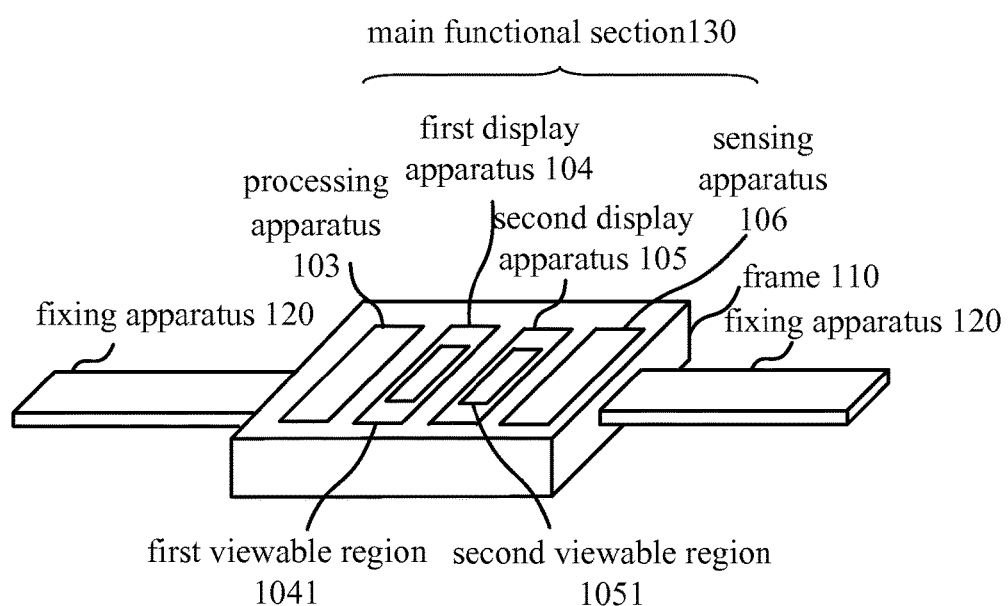
FIG. 2 illustrates a structural diagram of the electronic device according to an detailed example of the embodiment of the first implementation of the present disclosure.

FIG. 2 illustrates a structural diagram of the electronic device according to a detailed example of the embodiment of the first implementation of the present disclosure.

As shown in FIG. 2, in the detailed example, the electronic device 100 is a wrist mounted electronic device which includes the frame 110, the fixing apparatus 120 and the main functional section 130.

The fixing apparatus 120 is connected to the frame 110, and is used to fix the electronic device to a first operation body, such as the head, the arm, the finger, or the like, of the viewer such as the user.

Particularly, the fixing apparatus 120 has at least a fixing state in which the fixing apparatus 120 can be at least a part of an annular space or an approximate annular space meeting a first shape condition, which may surround at the outside of a cylinder meeting a second shape condition.

In the following, a first configuration example to a fourth configuration example of the fixing apparatus will be further described with reference to FIG. 3a to FIG. 3d. In FIG. 3a to FIG. 3d, for the convenience of the description, only the frame 110 and the fixing apparatus 120 in the electronic device 100 are shown.

Figure 3A:
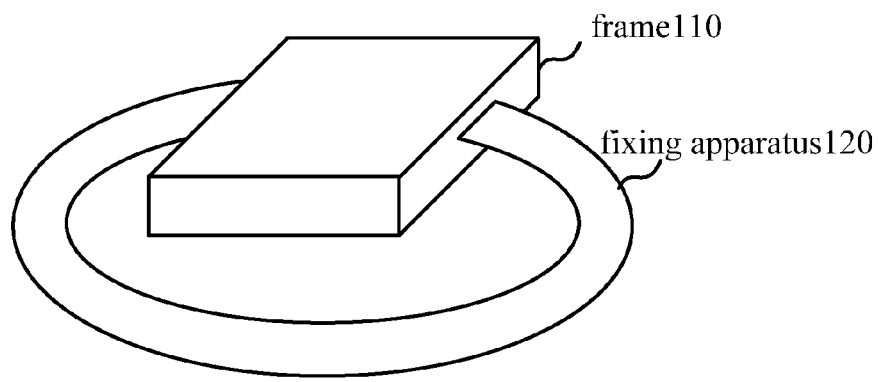
FIG. 3a-FIG. 3d are structural diagrams illustrating a first configuration example to a fourth configuration example in a fixing apparatus of the electronic device according to the embodiment of the first implementation of the present disclosure, respectively.
Figure 3B:
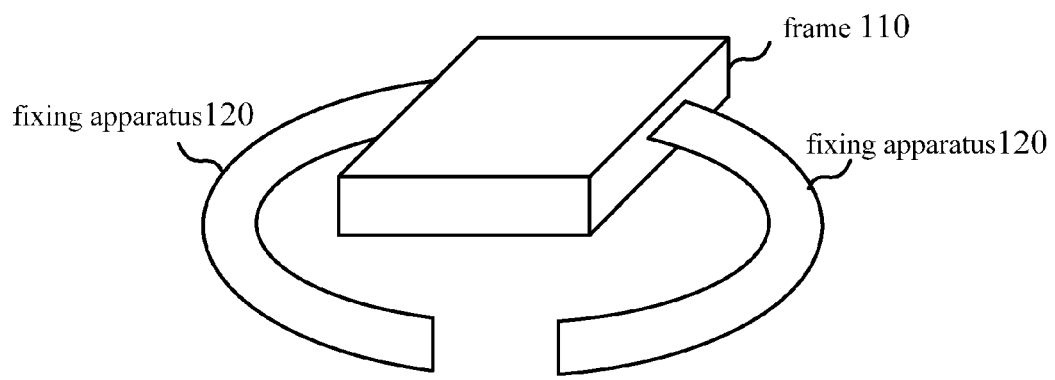

Particularly, FIG. 3a and FIG. 3b show two fixed states of connection between the frame 110 and the fixing apparatus 120, respectively. In a first fixed state as shown in FIG. 3a, the fixing apparatus 120 and the frame 110 form a closed-loop annular space, wherein the fixing apparatus 120 and the frame 110 form a part of the annular space, respectively. In a second fixed state as shown in FIG. 3b, the fixing apparatus 120 and the frame 110 form an approximate annular space with a small opening, wherein the fixing apparatus 120 and the frame 110 form a part of the annular space, respectively. In an embodiment of the present disclosure, the frame 110 is a dial section of the smart watch, and the fixing apparatus 120 is a watchband section of the smart watch. The annular space or the approximate annular space formed by the frame 110 and the fixing apparatus 120 can surround a wrist (as the cylinder) of a user of the smart watch, and the diameter of the annular space or the approximate annular space is larger than the diameter of the wrist of the user and smaller than the diameter of the first of the user.

Figure 3C:
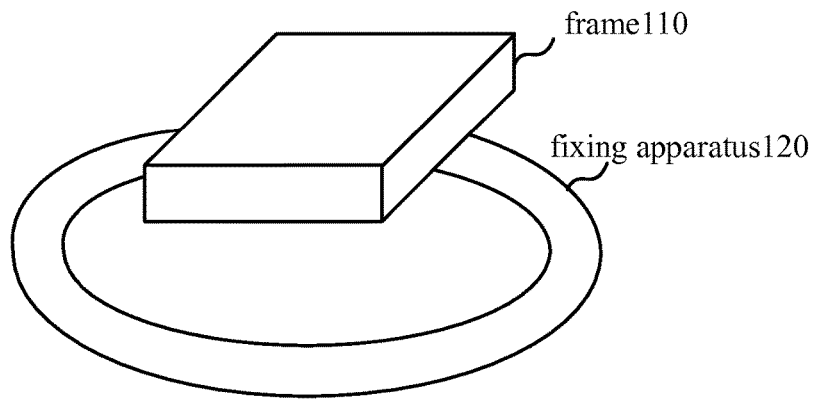
Figure 3D:
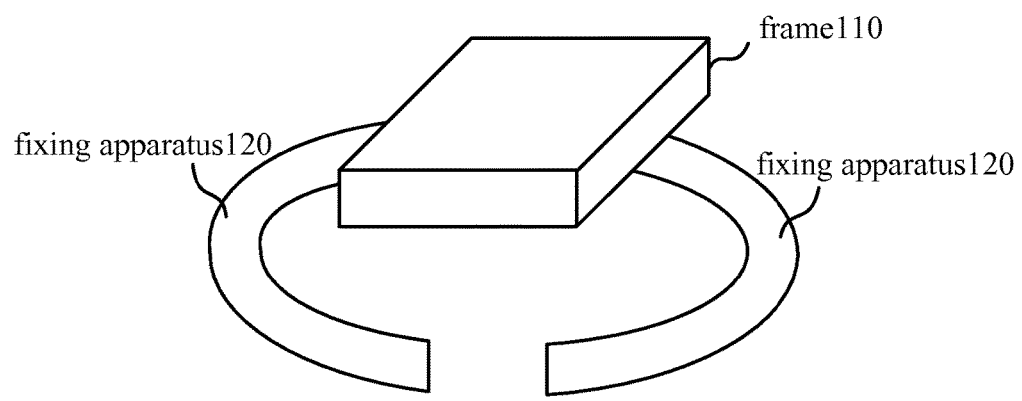

Also, FIG. 3c and FIG. 3d illustrate other two fixed states of the fixing apparatus 120 and the frame 110 being connected, respectively. Of course, the annular space or the approximate annular space may be formed by the fixing apparatus 120 alone. As shown in FIG. 3c and FIG. 3d, the frame 110 is arranged on the fixing apparatus 120 (i.e., the frame 110 is attached to the fixing apparatus 120 by contact with its surface), so that only the fixing apparatus 120 itself forms the annular space (FIG. 3c) or the approximate annular space (FIG. 3d) surrounding the cylinder from the outside. The fixing apparatus 120 is arranged with a fixing structure such as an agraffe, a snap fastener, a slide fastener, or the like (not shown).

Back to FIG. 2, other configuration of the electronic device 100 will be further described.

Since the main functional section 130 is the circuit part for completing various operation functions such as displaying information, generating sound, capturing image, or the like, in the electronic device, the main functional section 130 may be arranged at the frame 110 and the fixing apparatus 120 having a certain support force to ensure its safety and stableness.

In one example, all functional modules in the main functional section 130 may be arranged inside of the frame 110. For example, the processing apparatus 103, the first display apparatus 104, the second display apparatus 105 and the sensing apparatus 106, as well as other additional units, may all be arranged inside of the frame 110.

In another example, to save the thickness and the area of the main body of the wearable electronic device provided in the embodiment of the present disclosure, at least a part of the functional modules in the main functional section 130 may be arranged inside of the frame 110, and the other part of the functional modules of the main functional section 130 may be arranged inside of the fixing apparatus 120. For example, as shown in FIG. 2, the first display apparatus 104, the second display apparatus 105 and the sensing apparatus 106 are arranged inside of the frame 110, and the processing apparatus 103 as well as the other additional units are arranged inside of the fixing apparatus 120. Alternatively, certain functional modules of a certain apparatus may be arranged inside of the frame 110, and the remaining functional modules are arranged on the fixing apparatus 120. For example, the display output region of the display apparatus may be arranged on one surface of the frame 110, but the optical devices inside of the display apparatus are arranged in the fixing apparatus 120.

In still another example, all the functional modules in the main functional section 130 may be arranged inside of the fixing apparatus 120.

Hereinafter, different configurations of the first display apparatus 104 and the second display apparatus 105 will be described in detail.

In order for the viewer to see the first image, the first display apparatus 104 may include a first display output region 1041 which is a part in the first display apparatus 104 being viewed by the user to perceive the display content. That is, the first display apparatus 104 include many parts, depending on its principle, wherein the first display output region 1041 is a region where the user sees the image content display actually. Herein, the location of the first display apparatus 104 as described above may refer to the location of the first display output region 1041 actually.

Similarly, in order for the viewer to see the second image, the second display apparatus 105 may include a second display output region 1051 which is a part in the second display apparatus 105 being viewed by the user to perceive the display content. That is, the second display apparatus 105 include many parts, depending on its principle, wherein the second display output region 1051 is a region where the user sees the image content display actually. Herein, the location of the second display apparatus 105 as described above may refer to the location of the second display output region 1051 actually.

In an example, the first display apparatus 104 and the second display apparatus 105 may be entirely the same display apparatuses. For example, the first display apparatus 104 and the second display apparatus 105 may refer to the same display apparatus. In this case, the first display output region 1041 and the second display output region 1051 are the same display output region.

In another example, the first display apparatus 104 and the second display apparatus 105 are two logical parts obtained by dividing the same physical display apparatus in terms of display function. In this case, the first display output region 1041 and the second display output region 1051 are different display output regions. For example, one LCD display may be divided by a certain proportion in terms of display screen.

In still another example, for example, as shown in FIG. 2, the first display apparatus 104 and the second display apparatus 105 are two different display apparatuses. In this case, the first display output region 1041 and the second display output region 1051 are two different display output regions corresponding thereto respectively.

Particularly, in an embodiment, the first display apparatus 104 and the second display apparatus 105 may be two physical display apparatuses following the same display principle.

Alternatively, the first display apparatus 104 and the second display apparatus 105 may also be display apparatuses following different display principles. That is, the first display apparatus 104 and the second display apparatus 105 are display apparatuses of different types.

For example, the first display apparatus 104 may be a normal optical display system, which include, but not limited to, a liquid crystal display (LCD), an Organic Electroluminescence Display, an Organic Light-Emitting Diode (OLED) display, an E Ink type display apparatus, or the like.

In this case, the first display apparatus 104 may render the first image with a display effect of a real image in the first display output region 1041.

Meanwhile, the second display apparatus 105 may be a near-to-eye optical display system. In this case, the second display apparatus 105 may render the second image with a display effect of a virtual image in the second display output region 1051. That is, the second display apparatus 105 is used to output the virtual image corresponding to the second image.

Figure 4:
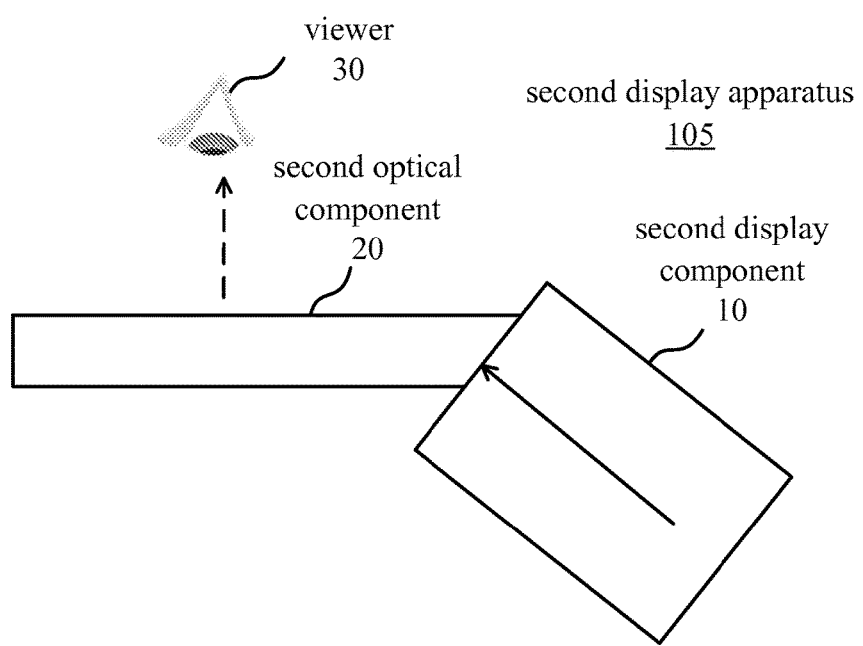
FIG. 4 illustrates a principle diagram of a second display apparatus according to the embodiment of the first implementation of the present disclosure.

FIG. 4 illustrates a principle diagram of the second display apparatus according to the embodiment of the first implementation of the present disclosure.

As shown in FIG. 4, the second display apparatus 105 includes a second display component 10 and a second optical component 20.

The second display component 10 is used to output original light corresponding to the second image, such as the light shown by the solid arrow in FIG. 4.

The second optical component 20, also known as a second optical path changing component, is used to receive the original light corresponding to the second image from the second display component 10, and change the light path of the original light to form a virtual image corresponding to the second image, so that the viewer 30 at a certain location from the electronic device 100 can perceive the virtual image, wherein the size of the virtual image being perceived is larger than the size of the second optical component 20.

Particularly, in an embodiment of the present disclosure, the second display component 10 may be a self-illuminating display component such as an OLED display, or may be a back light display component such as a LED display. The second optical component 20 may include a lens group for collimating and enlarging the image and a waveguide plate or a flexible waveguide for changing the exit direction of the image. Further, the viewer 30 at the certain location may perceive the virtual image corresponding to the second image. Particularly, imaging may be done to a certain location by the second optical component 20 according to the design requirement. For example, as shown in FIG. 4, the certain location may be any one side with respect to the second optical component 20.

Thus, the second display apparatus 105 according to the embodiment of the present disclosure as shown in FIG. 4 may not be limited by the size of the electronic device itself equipped with the second display apparatus 105, and thus can provide an image or video display with a larger size and a higher resolution to the viewer at the certain location according to the design requirement.

Hereinafter, different configuration examples of the first display output region and the second display apparatus of the electronic device according to the embodiment of the present disclosure will be described with reference to FIG. 5a to FIG. 5f, based on the above embodiment in which the first display apparatus 104 is a normal display and the second display apparatus 105 is a near-to-eye display.

Figure 5A:
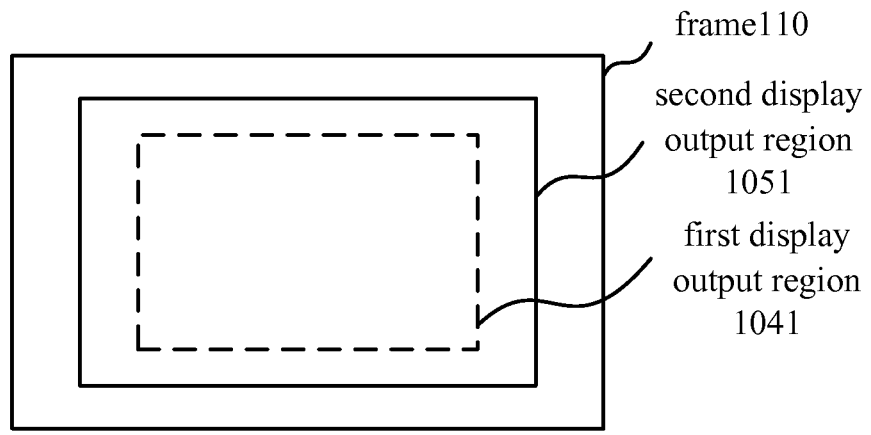
FIG. 5a and FIG. 5b are a top view and a side view of the first configuration example of a viewable part of the electronic device according to the embodiment of the first implementation of the present disclosure, respectively.
Figure 5B:
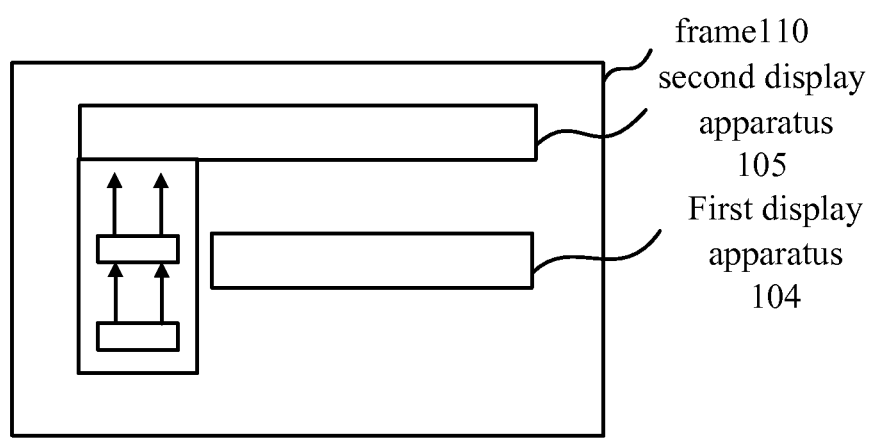

FIG. 5a and FIG. 5b are a vertical view and a side view of the first configuration example of the display output region of the electronic device according to the embodiment of the first implementation of the present disclosure, respectively.

As shown in FIG. 5a, the first display output region 1041 and the second display output region 1051 has the first configuration example of being arranged on the frame 110 overlapped with each other. The present disclosure is not limited thereto, and the first display output region 1041 and the second display output region 1051 may also be arranged on the fixing apparatus 120 overlapped with each other.

FIG. 5b further shows the vertical view of the first configuration example of the first display output region 1041 and the second display output region 1051 being overlapped. As shown in FIG. 5b, the first display apparatus 104 arranged with the first display output region 1041 and the second display apparatus 105 arranged with the second display output region 1051 are configured as shown in FIG. 5b, so that the transmittance of at least the display output region out of the first display output region 1041 and the second display output region 1051 which is at the outer side of the annular space or the approximate annular space, meets a predetermined condition in the outwards direction of the annular space or the approximate annular space, which may be that the transmittance is larger than or equal to a predetermined value (such as 70%). In the example shown in FIG. 5a and FIG. 5b, the second display output region 1051 is arranged at the outer side. The present disclosure is not limited thereto, and the first display output region 1041 may be arranged at the outer side. By making the transmittance of the second display output region 1051 larger than or equal to the predetermined value, only one of the first display output region 1041 and the second display output region 1051 is in display, and the display output region not in display will not affect the display function of the display output region in display, and a more compact configuration may be realized.

Figure 5C:
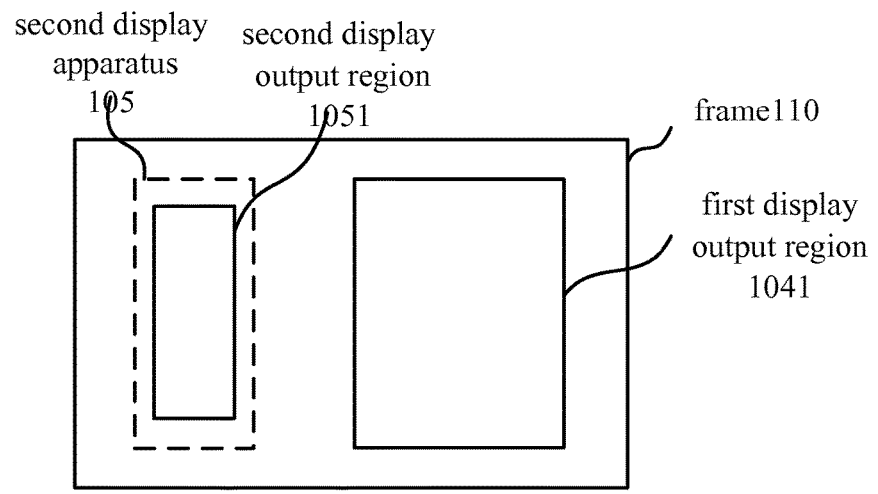
FIG. 5c and FIG. 5d are a top view and a side view of the second configuration example of a viewable part of the electronic device according to the embodiment of the first implementation of the present disclosure, respectively.
Figure 5D:
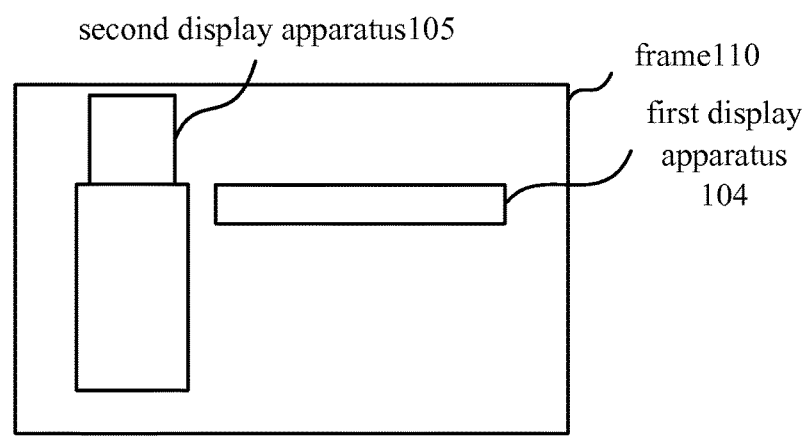

FIG. 5c and FIG. 5d are a vertical view and a side view of the second configuration example of the display output region of the electronic device according to the embodiment of the first implementation of the present disclosure, respectively.

As shown in FIG. 5c, the first display output region 1041 and the second display output region 1051 has the second configuration example of being arranged on the frame 110 or the fixing apparatus 120 adjacently with each other. In FIG. 5c and FIG. 5d, the first display output region 1041 and the second display output region 1051 are arranged adjacently in the frame 110. The present disclosure is not limited thereto, and the first display output region 1041 and the second display output region 1051 may be arranged on the frame 110 and the fixing apparatus 120 respectively, and the distance between the first display output region 1041 and the second display output region 1051 is smaller than a threshold such as 1 cm.

FIG. 5d further shows the vertical view of the second configuration example of the first display output region 1041 and the second display output region 1051 adjacently with each other. As shown in FIG. 5d, the first display apparatus 104 arranged with the first display output region 1041 and the second display apparatus 105 arranged with the second display output region 1051 are configured adjacently as shown in FIG. 5d, and the display directions of the first display output region 1041 and the second display output region 1051 are at the outwards direction of the annular space or the approximate annular space.

Figure 5E:
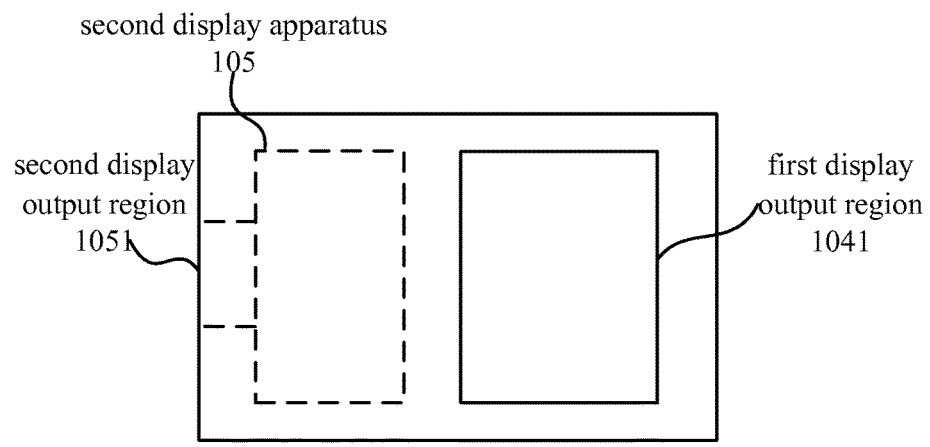
FIG. 5e and FIG. 5f are a top view and a side view of the third configuration example of a viewable part of the electronic device according to the embodiment of the first implementation of the present disclosure, respectively.
Figure 5F:
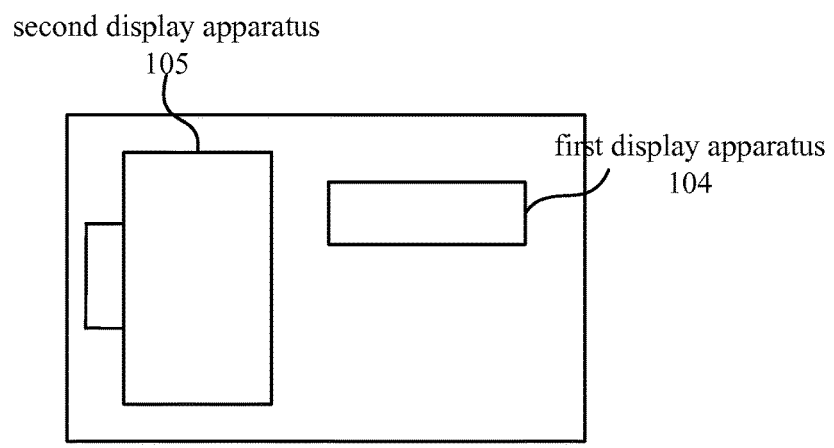

FIG. 5e and FIG. 5f are a vertical view and a side view of the third configuration example of the display output region of the electronic device according to the embodiment of the first implementation of the present disclosure, respectively.

As shown in FIG. 5e, the first display output region 1041 and the second display output region 1051 has the third configuration example of being arranged on the frame 110 or the fixing apparatus 120 adjacently with each other. Different from the second configuration example shown in FIG. 5c and FIG. 5d, as shown in FIG. 5e, the display direction of one of the first display output region 1041 and the second display output region 1051 is the outwards direction of the annular space or the approximate annular space, and the display direction of the other one of the first display output region 1041 and the second display output region 1051 is in the direction vertically to the outwards direction of the annular space or the approximate annular space.

Hereinafter, an example of the appearance effect of the electronic device applied with the display output region as shown in FIG. 5*c* and FIG. 5*d* will be described in detail with reference to FIG. 6.

Figure 6:
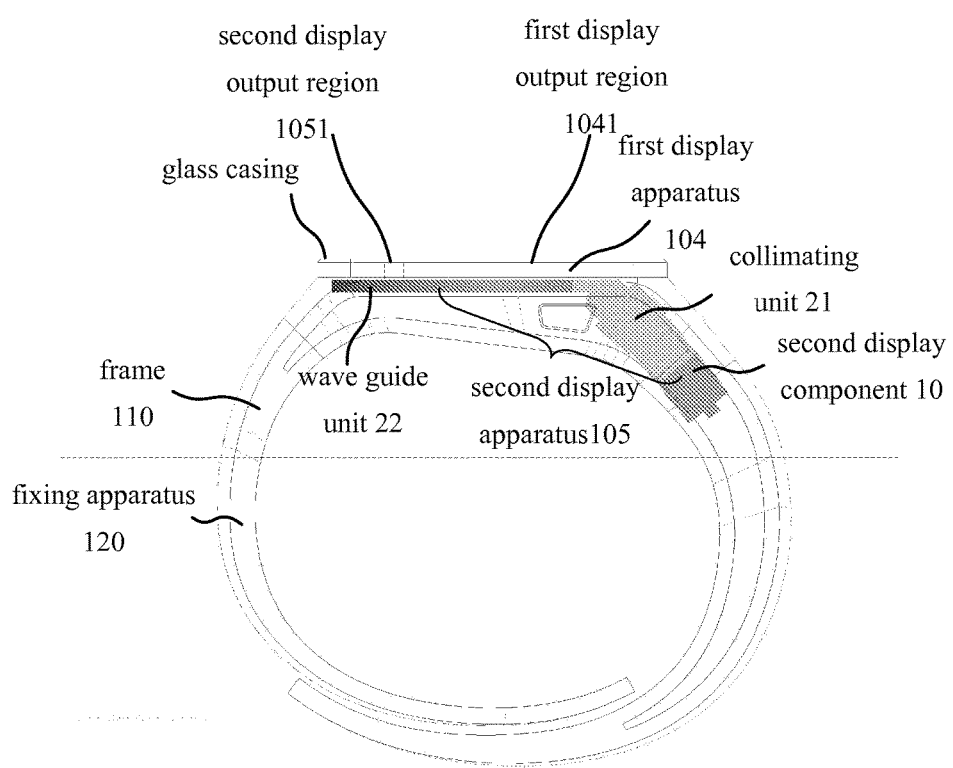
FIG. 6 illustrates a side view of an appearance of the electronic device according to the embodiment of the first implementation of the present disclosure.

FIG. 6 illustrates a side view of the appearance of the electronic device according to the embodiment of the first implementation of the present disclosure.

As shown in FIG. 6, the first display apparatus 104 is a normal optical display system, and the first display output region 1041 is a region corresponding to the first display screen of the first display apparatus 104. Also, the second display apparatus 105 may be a near-to-eye optical display system, and the second display output region 1051 may be at least a part of a surface of the second optical component 20 which exits light, and the second display output region 1051 may be arranged in the frame 110.

It is to be noted that, although the second display component 10 and the second optical component 20 including the collimating unit 21 and the waveguide unit 22 are arranged in the frame 110 in FIG. 6, the present disclosure is not limited thereto. For example, the second optical component 20 may be arranged across the frame 110 and the fixing apparatus 120, and the second display component 10 may be arranged in the frame 110.

In an embodiment, as shown in FIG. 6, due to the display principles of the normal display and the near-to-eye display, the size of the first display output region 1041 may be larger than that of the second display output region 1051. Therefore, the size of the first image rendered in the first display output region 1041 with the first display effect viewed by the viewer is larger than that of the second image rendered in the second display output region 1051 with the second display effect being perceived by the viewer, when a distance from the viewer to the frame is a first distance, which is a far distance.

The above phenomenon is generated for the following reason. When the viewer 30 is at a certain location far from the electronic device 100 (the first distance where no virtual image may be been perceived), the size of the first image rendered in the first display output region 1041 with the first display effect viewed by the viewer 30 is equal to the size of the first display output region 1041, and the second image rendered in the second display output region 1051 with the second display effect being perceived by the viewer 30 only forms a light spot because it cannot form a virtual image, and thus the size is about equal to the size of the second display output region 1051.

In another embodiment, the first display apparatus 104 may include a first display screen having a first size equal to the size of the first display output region. Meanwhile, the second display apparatus 105 includes a second display screen having a second size smaller than the size of the second display output region.

Due to the display principles of the normal display and the near-to-eye display, the size of the first image rendered in the first display output region with the first display effect viewed by the viewer is equal to the size of the first display output region, when a distance from the viewer to the frame is a second distance (for example, the second distance being a near distance), and the size of the second image rendered in the second display output region with the second display effect being perceived by the viewer is larger than the size of the second display output region, when a distance from the viewer to the frame is the second distance (assuming it is at the certain location where the virtual image can be perceived).

The above phenomenon is generated for the following reason. When the viewer 30 is at the certain location (a second distance where the virtual image can be perceived) close to the electronic device 100, the size of the first image rendered in the first display output region 1041 with the first display effect viewed by the viewer 30 is still equal to the size of the first display output region 1041, but the second image rendered in the second display output region 1051 with the second display effect perceived by the viewer 30 forms a magnified virtual image, and the size is larger than that of the second display output region 1051. Depending on the arrangement of the second display apparatus 105, when the viewer 30 is just at the certain location from the electronic device 100 to view, it is even possible that the size of the virtual image as the second image rendered in the second display output region 1051 with the second display effect which is perceived by the viewer 30 is several times, even tens of times of the size of the real image as the first image.

It can be seen that in the embodiments of the present disclosure, the first display apparatus is used to output a real image corresponding to the display image, so that the viewer at a first distance from the electronic device can see the real image in the first display output region, and the second display apparatus is used to output a virtual image corresponding to the display image, so that the viewer at a second distance from the electronic device can perceive the virtual image in the second display output region, wherein the size of the real image being viewed is equal to the size of the first display output region, and the size of the virtual image being perceived is larger than the size of the second display output region. Therefore, the electronic device can provide an image or video display with a larger size and a higher resolution, without being limited by the size of the wearable electronic device such as the smart watch itself.

Hereinafter, the display switching method according to the embodiment of the present disclosure will be described with reference to FIG. 7.

Figure 7:
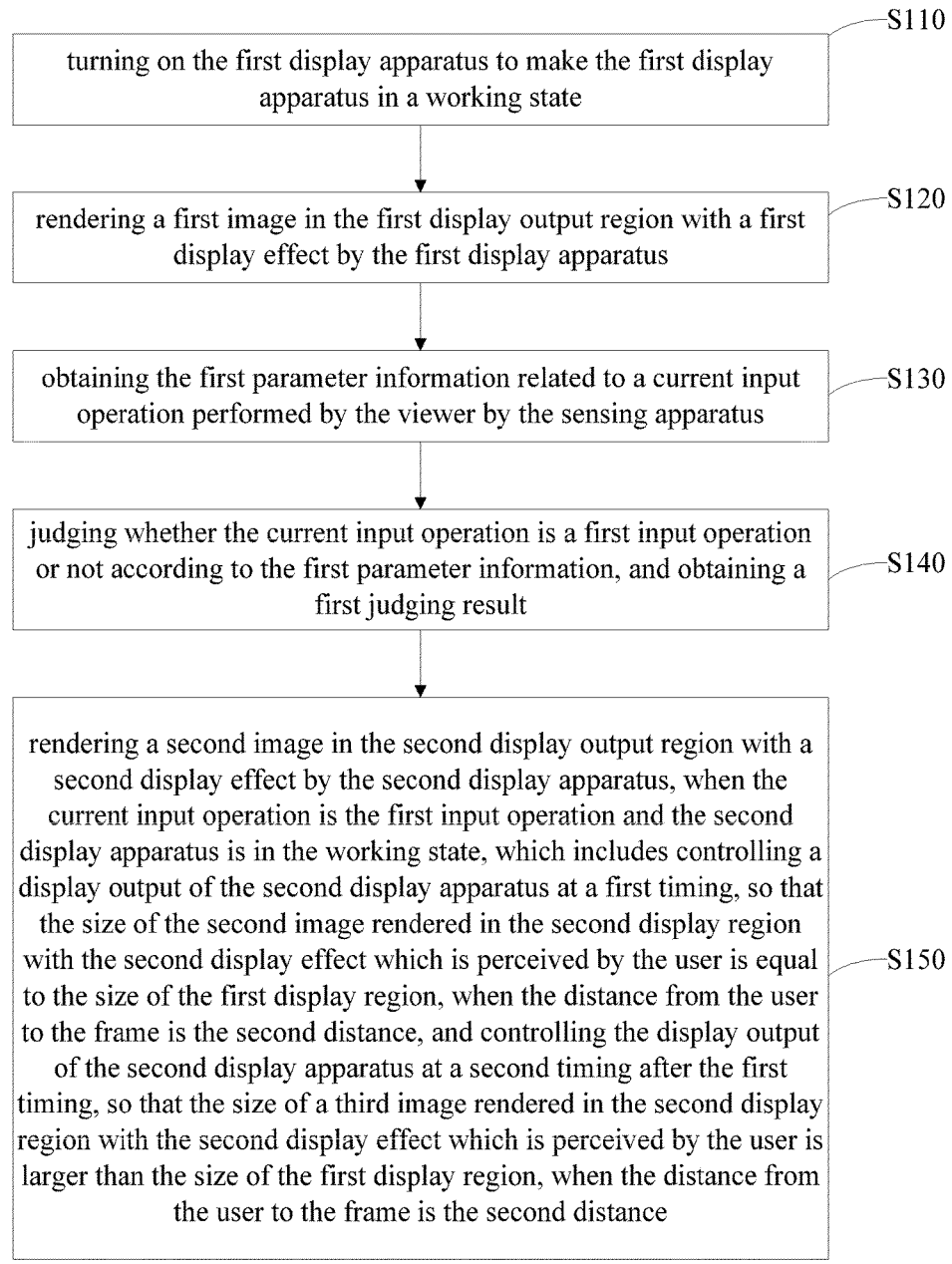
FIG. 7 illustrates a flowchart of a display switching method according to the embodiment of the first implementation of the present disclosure.

FIG. 7 illustrates a flowchart of the display switching method according to the embodiment of the present disclosure.

The display switching method according to the embodiment of the present disclosure shown in FIG. 7 may be applied to the electronic device shown in FIG. 1.

Hereinafter, the display switching method according to the embodiment of the present disclosure will be described in detail with reference to FIG. 7, still taking the electronic device being a wrist mounted electronic device as shown in FIG. 2, as an example. However, it is to be noted that the present disclosure is not limited thereto. The electronic device may be an electronic device of any type, which includes, but not limited to, a finger mounted electronic device, a notebook computer, a tablet, a mobile phone, a multimedia player, a PDA or the like. The first display apparatus and the second display apparatus may be display apparatuses of the same or different types. For example, one of the first display apparatus and the second display apparatus may be the normal display, and the other one is the near-to-eye display. Alternatively, both may be the normal display at the same time, or be the near-to-eye display at the same time. Further, the display switching method according to the embodiment of the present disclosure may be applied to any other processing in the electronic device.

As shown in FIG. 7, the display switching method according to the embodiment of the present disclosure may include the following steps.

At step S110, the first display apparatus is turned on to make the first display apparatus in a working state.

When the user needs to use the electronic device 100 to complete a certain function such as checking time, dialing/receiving a phone call, receiving and transmitting a short message, browsing a webpage, or the like, no operations such as the location alignment is necessary when the user is viewing, since the viewable angle of the normal display is large, which is more convenient in use compared to the near-to-eye display. Therefore, the first display apparatus 104 may be used preferably.

In order to provide the graphic user interface to the user, in the electronic device 100, the processing apparatus 103 may continually generate display images and control the first display apparatus 104 to display continually.

However, generally, since the electronic device 100 may be a portable electronic device, such as a wearable electronic device, powered by an internal battery, and the capability of the internal battery is not large due to the volume of the wearable electronic device, the continuous image display in the first display apparatus 104 will shorten the standby time of the electronic device 100 largely. Therefore, the electronic device 100 may be made in the standby state when there is no user operation in order to save the power consumption, and may be reactivated when there is a user operation.

In order to judge whether it is necessary to activate the electronic device 100 to the working state from the standby state, second parameter information related to a current input operation performed by the viewer may be obtained by the sensing apparatus 106. It is judged whether the current input operation is a second input operation or not according to the second parameter information, and a second judging result is obtained. When the second judging result indicates that the current input operation is the second input operation, the first display apparatus is turned on to make the first display apparatus in the working state.

In a first embodiment of the present disclosure, the above detection operation may be performed depending on different usage postures of the user with respect to the electronic device 100.

For example, firstly, it is detected whether the current input operation performed by the user is the second input operation which may be driving the own arm by the user to move the electronic device 100 from other location to a relatively remote location at a first distance from himself/herself. Then, the electronic device 100 is switched from the standby state to the working state only when it is detected that the user performs the second input operation.

Hereinafter, for convenience of understanding, the first embodiment will be described taking an example in which the wrist mounted electronic device such as the smart watch is the electronic device 100.

In a case that the wrist mounted electronic device is in normal use, the user may wear the electronic device 100 on his/her wrist. The specific usage posture determines the fact that the user may relax his/her arm when the user does not need to use the electronic device 100, so that the arm is close to one side of his/her own body. Obviously, if the user is not in a relaxed state and is performing other operations, the user's arm may be at other locations. For example when the user is running, the arms are at both sides of the body and are swinging. When the user needs to use the first display apparatus 104 of the electronic device 100, the user may raise up the arm and revert the part wearing the electronic device 100, for example, the wrist, so that the electronic device 100 is close to the user as the viewer, and the first display output region 1041 is kept at the first distance far from the user in a horizontal or almost horizontal state. For example, the user may see the real image corresponding to the first image in the first display output region 1041 of the first display apparatus 104 at the first distance.

That is, when the user needs to use the first display apparatus 104 to complete a certain function, for example, checking time, dialing/receiving a phone call, transmitting and receiving a short message, browsing a webpage, or the like, the user may drive the arm firstly to move the electronic device 100 from one side of the body to the chest, until the user is at a first distance from the electronic device 100. Then, the user may view the corresponding user interface of the electronic device 100 through the first display output region 1041 of the first display apparatus 104, and control the electronic device 100 to complete the above specific function through a specific input apparatus, such as a touch screen, a handwriting pen, a sound control, a somatic control, or the like, which is not shown.

Therefore, whether the input operation on the electronic device by the viewer is the second input operation or not may be detected, based on a principle that the gravity acceleration components of the electronic device 100 in the individual axis directions of a reference coordinates such as a 3D coordinates are different when the electronic device 100 is in different usage states.

Assuming that an X axis, a Y axis and a Z axis consisting a 3D coordinates are arranged on the electronic device, the plane consisted of the X axis and the Y axis is horizontal to the screen where the first display output region 1041 is located, and the Z axis is vertical to the screen where the first display output region 1041 is located. When the user holds the electronic device 100 by hand so that the first display output region 1041 is vertical to the ground, the Y axis is in a straight line with the direction of the gravity acceleration G.

Particularly, when the user relaxes the arm with the electronic device 100, as described above, the electronic device 100 necessarily slides down to the front part of the wrist and is stopped by the palm, due to the function of the gravity. In this way, the component of the gravity acceleration G in the X axis is relatively large, and the components in the Y axis and the Z axis are relatively small. ON the contrary, when the user checks the first display apparatus 104 of the electronic device 100 as the smart watch, the user needs to raise up the electronic device 100 and turn over the first display output region 1041 of the electronic device 100 to the horizontal state which is towards the user's eyes. In this way, the components of the gravity acceleration G in individual axes will undergo a series of change and are finally kept in a state in which the component in the Z axis is the largest and the components in the X axis and the Y axis are relatively small.

Therefore, the sensing apparatus 106 may be the first sensing apparition for obtaining spatial location information of the electronic device under the control of the input operation performed by the viewer. In this way, depending on the above usage postures of the electronic device in the normal case, whether the electronic device is moved from the original location (for example, the original location which is very far away from the viewer) to the first location (for example, a first distance which is relatively far away from the viewer) in the gravity direction or not and whether the electronic device is rotated to the first angle (horizontal to the ground, that is, the Z axis being opposite to the gravity direction) from the original angle (vertical to the ground, that is, the X axis pointing to the gravity direction) around the center as the first operating body may be judged, according to the spatial location information obtained by the sensing apparatus 106, so that the above detection function is completed.

For example, the sensing apparatus 106 may include a gyro or a gravity sensor arranged inside of the electronic device 100. When the user's arm is in a certain posture, the gyro or the gravity sensor may detect the component parameters of the gravity acceleration of the electronic device 100 in the individual axis directions of the 3D coordinates and sense the angular acceleration component parameter generated when the user turns over the wrist, and whether the current input operation of the user is the second input operation may be judged by the combination of the two actions.

Further, in a second embodiment of the present disclosure, the electronic device 100 may be woken up from the standby state by detecting that an activation region in the electronic device 100 is touched by the user, so that the first display apparatus 104 is turned on to be in the working state.

Thus, the sensing apparatus 106 may be a second sensing apparatus for sensing control operation information generated when a second operating body of the viewer, such as a finger, approaches or contacts the sensing region which may include at least a part of the first display output region 1041.

For example, the sensing apparatus 106 may be a touch sensor. In this case, whether the second operating body approaches or contacts at least a part of the first display output region or not may be judged by the control operation information such as track information, click information, approaching information or the like, obtained by the sensing apparatus 106, to detect whether the user operates the activation region in the first display apparatus 104 of the electronic device.

Alternatively, in a third embodiment of the present disclosure, simply, whether the input operation on the electronic device by the viewer is the second input operation or not may be detected based on the principle that the distances from the electronic device 100 to the user are different when the electronic device 100 is in different usage states.

Particularly, when the user is not using the electronic device 100, the electronic device 100 is often far away from the user's eyes. In this case, the distance from the electronic device 100 to the user is very far. On the contrary, when the user views the first display apparatus 104 of the electronic device 100 as the smart watch, the user needs to raise up the electronic device 100 and turn the first display output region 1041 over to the horizontal state which is towards the user's eye. In this case, the electronic device 100 (especially the first display output region 1041) is far from the user with a distance for example the first distance.

Thus, the sensing apparatus 106 may be a third sensing apparatus for sensing the distance from the viewer to the electronic device 100, particularly, the frame 110.

For example, the sensing apparatus 106 may be an approaching sensor. When the user's arm is in a certain posture, the approaching sensor may detect the distance from the electronic device 100 to the user, and judge whether the user's input operation is the second input operation or not, according to whether the distance from the electronic device 100 to the user is the first distance or not.

Figure 8:
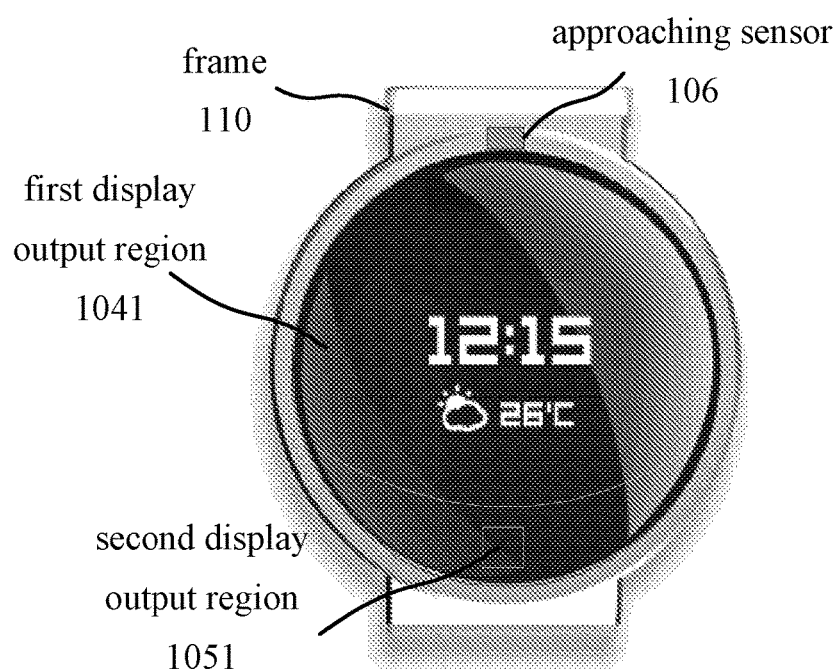
FIG. 8 illustrates a top view of the electronic device according to the embodiment of the first implementation of the present disclosure.

FIG. 8 illustrates a top view of an effect of the electronic device according to the embodiment of the first implementation of the present disclosure.

As shown in FIG. 8, the approaching sensor is arranged at a location in the same surface with the first display output region 1041 and near the first display output region 1041 in the electronic device 100.

Also, in another embodiment, the sensing apparatus 106 may be a pressure sensor for detecting whether the user presses the power button equipped in the electronic device 100 or not. Alternatively, the sensing apparatus 106 may be a voice sensor for detecting whether the user issues a voice instruction for turning on the first display apparatus.

In step S120, a first image is rendered in the first display output region with a first display effect by the first display apparatus.

After the first display apparatus 104 is switched to the working state, the first image may be rendered in the manner of a real image display in the first display output region 1041.

Particularly, when the viewer takes the electronic device 100 in front of himself/herself and keeps the first distance to view the first display output region 1041, since generally a first display apparatus 104 with a small size is equipped in the electronic device 100 as the wearable electronic device, the displayed first image may be a display interface including brief or abstract information due to the size limitation.

For example, as shown in FIG. 8, the first image is summary information on time and weather forecast. Alternatively, when the electronic device 100 is receiving an incoming call from a communication initiating party, only the incoming number, an icon for selecting whether the incoming call is taken or not may be displayed in the first image.

In step S130, the first parameter information related to a current input operation performed by the viewer is obtained by the sensing apparatus.

Next, in order for the user to see a richer and funny display interface in the electronic device 100, the first display apparatus 104 with a smaller display output region may be switched to the second display apparatus 105 with a larger display output region automatically or manually by the user, so as to achieve a better user experience.

In order to judge whether it is necessary to switch the electronic device 100 from the first display apparatus 104 to the second display apparatus 105 or not, the first parameter information related to the current input operation performed by the viewer may be obtained by the sensing apparatus 106.

Similarly to that in the step S110, in the first embodiment of the present disclosure, the above detection operation may be performed depending on different usage postures of the user with respect to the electronic device 100.

For example, firstly, it is detected whether the current input operation performed by the user is the first input operation which may be driving the own arm by the user to move the electronic device 100 from a relatively remote location at a first distance to a relatively near location at a second distance from himself/herself. Then, the display apparatus switching operation is performed only when it is detected that the user performs the first input operation.

Hereinafter, the first embodiment will be described still taking an example in which the wrist mounted electronic device such as the smart watch is the electronic device 100.

In a case that the wrist mounted electronic device is in normal use, the user may wear the electronic device 100 on his/her wrist. The specific usage posture determines the fact that the user may further raise up his/her arm and turn over the part wearing the electronic device 100, such as the wrist, based on the usage posture of the first display apparatus 104 when the user needs to use the second display apparatus 105, so that the electronic device 100 is more close to the user as the viewer, and keeps the second display output region 1051 at a relatively near location with the second distance in a vertical or nearly vertical state with respect to the ground. For example, at the second distance, the user may view a magnified virtual image corresponding to the display interface of the electronic device 100 in the second display output region 1051 of the second display apparatus 105.

That is, when the user needs to use the second display apparatus 105 to complete a certain function, for example, checking time, dialing/receiving a phone call, transmitting and receiving a short message, browsing a webpage, or the like, the user may continue to drive the arm to move the electronic device 100 from the chest to the location in front of the eyes, until the user is at the second distance from the electronic device 100. Then, the user may view the corresponding user interface of the electronic device 100 through the second display output region 1051 of the second display apparatus 105, and control the electronic device 100 to complete the above specific function through a specific input apparatus not shown, such as a touch screen, a handwriting pen, a sound control, a somatic control, or the like.

Therefore, whether the input operation on the electronic device by the viewer is the first input operation or not may be detected, based on a principle that the gravity acceleration components of the electronic device 100 in the individual axis directions of a reference coordinates such as a 3D coordinates are different when the electronic device 100 is in different usage states.

Still assuming that a X axis, a Y axis and a Z axis consisting a 3D coordinates are arranged on the electronic device, the plane consisted of the X axis and the Y axis is horizontal to the screen where the first display output region 1041 is located, and the Z axis is vertical to the screen where the first display output region 1041 is located.

Particularly, when the user views the second display apparatus 105 of the electronic device 100, the user needs to further raise up the electronic device 100 and turn over the second display output region 1051 of the electronic device 100 to the vertical state which is aligned with the user's eye. In this way, the distance from the electronic device 100 (especially the second display output region 1051) to the user is relatively near, for example, is the second distance.

Therefore, the sensing apparatus 106 may be the above first sensing apparition, for example a gyro or a gravity sensor arranged inside of the electronic device 100, for obtaining spatial location information of the electronic device under the control of the input operation performed by the viewer. In this way, depending on the above usage postures of the electronic device in the normal case, whether the electronic device is moved from the first location (for example, the location at the first distance which is very far away from the viewer) to the second location (for example, the second distance which is relatively close to the viewer) in the gravity direction or not and whether the electronic device is rotated to the second angle (vertical to the ground, that is, the Y axis being opposite to the gravity direction) from the first angle (horizontal to the ground, that is, the Z axis being opposite to the gravity direction) around the center as the first operating body may be judged according to the spatial location information obtained by the sensing apparatus 106, so that the above detection function is completed.

Further, in a second embodiment of the present disclosure, the first display apparatus 104 may be switched to the second display apparatus 105 by detecting that an activation region in the electronic device 100 is touched by the user.

Thus, the sensing apparatus 106 may be the above second sensing apparatus such as a touch sensor arranged inside of the electronic device 100, for sensing control operation information generated when a second operating body of the viewer, such as a finger, approaches or contacts the sensing region which may include at least a part of the first display output region 1041 and at least a part of the second display output region 1051.

In this case, whether the second operating body slides from at least a part of the first display output region to at least a part of the second display output region or not may be judged by the control operation information such as track information, click information, approaching information or the like, obtained by the sensing apparatus 106, to detect whether the user operates the activation region in the second display apparatus 105 of the electronic device or not.

Alternatively, in a third embodiment of the present disclosure, whether the input operation on the electronic device by the viewer is the first input operation may be detected by detecting the distance from the electronic device 100 to the user Particularly, when the user views the second display apparatus 105 of the electronic device 100 as the smart watch, the user needs to further raise up the electronic device 100 and turns over the second display output region 1051 in the electronic device to the vertical state which is aligned with the user's eye. In this way, the electronic device 100 (especially the second display output region 1051) is close to the user with a distance for example the second distance.

Thus, the sensing apparatus 106 may be the above third sensing apparatus, for example an approaching sensor arranged inside of the electronic device 100, which may be common to the approaching sensor for detecting the above second input operation, or may be an individual approaching sensor arranged at a location in the same surface with the second display output region 1051 and is close to the second display output region 1051 in the electronic device 100.

Also, in another embodiment, the sensing apparatus 106 may be a voice sensor for sensing whether the user issues a voice instruction for switching from the first display apparatus to the second display apparatus.

In step S140, whether the current input operation is a first input operation or not is judged according to the first parameter information, and a first judging result is obtained.

After obtaining the first parameter information related to the current input operation performed by the viewer, whether the current input operation is a first input operation or not may be determined according to the first parameter information. That is, it is judged whether there is a viewer at a specific location of the electronic device (with a distance where the user can perceive the virtual image) under the control of the first input operation performed by the user.

Since the detailed determination principle has been described with reference to the first embodiment to the fourth embodiment in the above step S130, the detailed description will be omitted.

If a positive determination result is obtained, the following step S150 may be performed. On the contrary, if a negative determination result is obtained, it may return to step S130 to continue the detection operation.

Further, in an example, in order to save the power consumption of the electronic device 100, the power supply to the second display apparatus 105 may be turned off when the second display apparatus 105 is not in use. Therefore, before performing step S150, the second display apparatus may be turned on when the first judging result indicates that the current input operation is the first input operation so that the second display apparatus is in the working state.

In another example, similarly, in order to save the power consumption of the electronic device 100, a power saving operation may be performed on the first display apparatus 104 after switching the display apparatus being used from the first display apparatus 104 to the second display apparatus 105. For example, the display output of the first display apparatus may be controlled, so that the first display apparatus stops rendering the first image. Alternatively, the power supply to the first display apparatus may be turned off directly.

In step S150, a second image is rendered in the second display output region with a second display effect by the second display apparatus, when the first judging result indicates that the current input operation is the first input operation and the second display apparatus is in the working state.

After the second display apparatus 105 is switched to the working state, the second image may be rendered in a display manner of a virtual image in the second display output region 1051.

Particularly, when the viewer holds the electronic device 100 in front of his/her eyes and aligns the second display output region 1051 with his/her eyes while keeping the second distance, since the second display apparatus 105 equipped in the electronic device 100 as the wearable electronic device is a virtual image display apparatus, the virtual image rendered by it is not limited to the screen with the small size, and thus the displayed second image may include a display interface of detailed information.

FIG. 9*a* to FIG. 9*e* illustrate a comparison diagram of the first image and the second image according to the embodiment of the first implementation of the present disclosure.

The first image rendered with the first display effect in the first display output region by the first display apparatus in step S120 is shown in the left diagram of FIG. 9*a* to FIG. 9*e*, and the second image rendered with the second display effect in the second display output region by the second display apparatus in step S150 is shown in the right diagram of FIG. 9*a* to FIG. 9*e*.

Figure 9A:
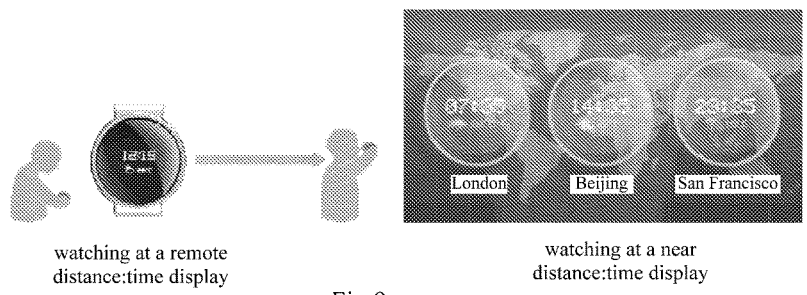
FIG. 9a to FIG. 9e illustrate comparison diagrams of a first image and a second image according to the embodiment of the first implementation of the present disclosure.

Particularly, in FIG. 9*a*, brief information on the time display including only the time and the temperature is rendered in the left diagram, while detailed information on the time display including the world time, the world map, the city name, or the like, is rendered in the right diagram.

Figure 9B:
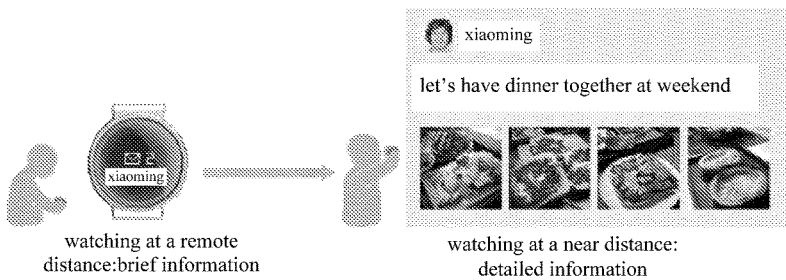

In FIG. 9*b*, brief information on information display including only the unread information amount and the contact name is rendered in the left diagram, while detailed information on the information display including the contact image, the contact name and the detailed content of the information (the text and the image) or the like, is rendered in the right diagram.

Figure 9C:
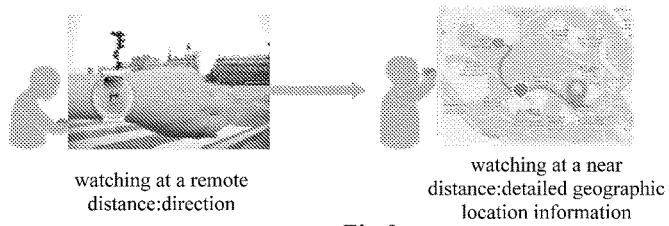

In FIG. 9*c*, brief information on the navigation display including only the direction indication is rendered in the left diagram, while detailed information on the navigation display including the map, the path plan, the location indication for the current location, the next node and the key node or the like, is rendered in the right diagram.

Figure 9D:
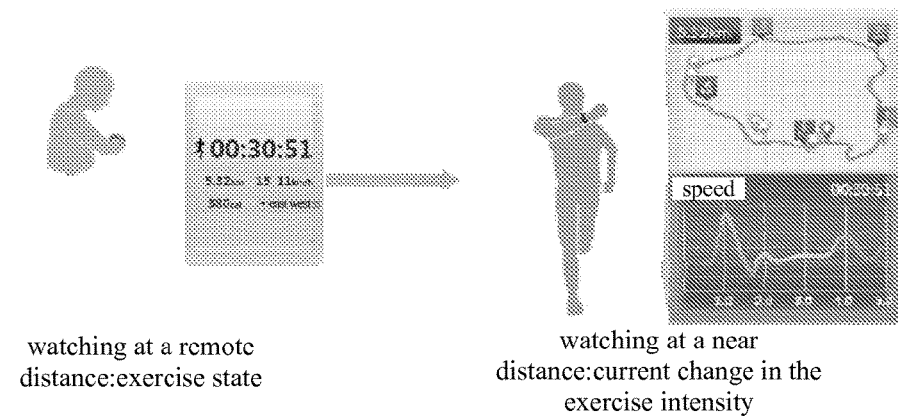

In FIG. 9*d*, brief information on the sport display including only the timing, the kilometers, the speed, the calorie and the direction, is rendered in the left diagram, while detailed information on the sport display including the timing, the kilometers, the speed histogram, the map, the movement track, and the indication for the current location and the history location or the like, is rendered in the right diagram.

Figure 9E:
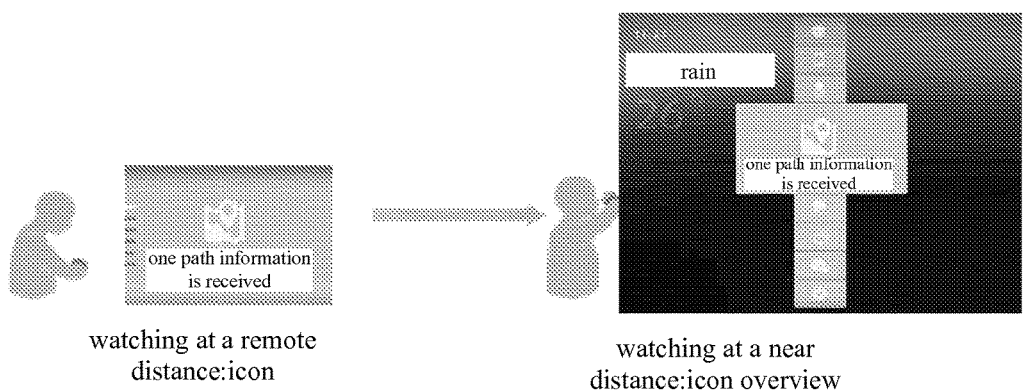

In FIG. 9*e*, brief information on the icon display including only the current display image is rendered in the left diagram, while detailed information on the icon display including a list of the time, the temperature, the current icon and the adjacent icon, or the like, is rendered in the right diagram.

Therefore, in the embodiment of the present disclosure, the display content may be switched between the normal display and the near-to-eye display through tow side-by-side adjacent screens, by the change of the distance. In addition, the display content may be switched in two screens overlapped with each other, wherein the upper screen is a transparent screen.

The switching of the display content may be done in various manners.

In a first example, the display switching between the first image and the second image may be simple and direct. For example, the display of the first image may be turned off first, and then the display of the second image is turned on. Similarly, the display of the second image may be turned on first, and the display of the first image is turned off. Alternatively, the display of the second image may be turned on while keeping the first image to be displayed.

In a second example, the watching experience of the user may be improved by a dynamic switching effect between the first image and the second image.

That is, for example, in the process from the above steps S110-S150, the transition from the remote image to the near image is natural to keep the continuousness of the watching experience by a dynamic effect of a remote image to a near image, in the process in which the user drives his/her arm to move the electronic device 100 from one side of the body gradually to the location in front of his/her chest and further to move it from the location in front of his chest to the location in front of his/her eyes.

In one embodiment, the process of rendering a second image in the second display output region with a second display effect by the second display apparatus may comprise: controlling a display output of the second display apparatus at a first timing, so that the size of the second image rendered in the second display output region with the second display effect which is perceived by the viewer is equal to the size of the first display output region, when the distance from the viewer to the frame is the second distance; and controlling a display output of the second display apparatus at a second timing after the first timing, so that the size of the third image rendered in the second display output region with the second display effect which is perceived by the viewer is larger than the size of the first display output region, when the distance from the viewer to the frame is the second distance; and wherein a display content of the second image is consistent with that of the first image.

In this embodiment, the following display effect may be generated. When the electronic device is in front of the viewer's chest, the first image including brief information is displayed in the normal display. When the electronic device is moved from the location in front of the chest to the location in front of the eyes, the second image with the same size and content as the first image will be displayed in the near-to-eye display. Then, the second image is further enlarged on the near-to-eye display to switch the second image to a third image including detailed information, so that a display effect of a seamless transition from the normal display and the near-to-eye display is achieved.

In another embodiment, the process of rendering a second image in the second display output region with a second display effect by the second display apparatus may comprise: controlling a display output of the first display apparatus at a first timing, so that the size of the first image rendered in the first display output region with the first display effect which is viewed by the viewer is equal to the size of the first display output region, when the distance from the viewer to the frame is the second distance; controlling a display output of the first display apparatus at a second timing after the first timing, so that the size of the first image rendered in the first display output region with the first display effect which is viewed by the viewer is smaller than the size of the first display output region, when the distance from the viewer to the frame is the second distance; controlling a display output of the second display apparatus at a third timing after the second timing, so that the size of the second image rendered in the second display output region with the second display effect which is perceived by the viewer is smaller than the size of the first display output region, when the distance from the viewer to the frame is the second distance; and controlling a display output of the second display apparatus at a fourth timing after the third timing, so that the size of the third image rendered in the second display output region with the second display effect which is perceived by the viewer is larger than the size of the first display output region, when the distance from the viewer to the frame is the second distance; and wherein the size of the second image perceived by the viewer at the third timing is equal to the size of the first image viewed by the viewer at the second timing, and a display content of the second image is consistent with that of the first image.

In this embodiment, the following display effect is generated. When the electronic device is in front of the viewer's chest, the first image including brief information is displayed in the normal display. When the electronic device is moved from the location in front of the chest to the location in front of the eyes, the first image is reduced gradually and finally becomes the second image with a small size, such as with a shape of a circle, a square, a certain pattern, even no display. Then, a third image with the same size and content as the second image will be displayed in the near-to-eye display. Next, the third image is enlarged gradually on the near-to-eye display to become a fourth image including detailed information finally, so that another display effect of a seamless transition from the normal display to the near-to-eye display is achieved.

Obviously, the dynamic switching effect between the first image and the second image is not limited to the above two manners, as long as it keeps the consistency of the interface animation between the normal display and the near-to-eye display at the moment when it is moved from a side of the body to the location in front of the chest and then to the location in front of the eyes. For example, in still another embodiment, the first image displayed in the normal display is changed from a small image to a large image and become hidden gradually. At the same time when the first image is hidden gradually, an effect of a movement from a near location to a far location is generated in the second image displayed in the near-to-eye, and the content is changed from small to large and emerges gradually.

It can be see that, with the display switching apparatus according to the embodiments of the present disclosure, the parameter information related to the input operation can be obtained when it is detected that the viewer performs the input operation on the electronic device, and different display apparatuses are started according to the parameter information, so that the display images are displayed in different display output regions with different display effects by different display apparatuses accordingly, based on different user requirements. Therefore, in the embodiments of the present disclosure, the first display apparatus is used to output a real image corresponding to the display image, so that the viewer at a first distance from the electronic device can see the real image in the first display output region, and the second display apparatus is used to output a virtual image corresponding to the display image, so that the viewer at a second distance from the electronic device can perceive the virtual image in the second display output region, wherein the size of the real image being viewed is equal to the size of the first display output region, and the size of the virtual image being perceived is larger than the size of the second display output region. Based on the above configuration of the display apparatus, an electronic device and a display switching apparatus are provided, which can provide an image or video display with a larger size and a higher resolution, without being limited by the size of the wearable electronic device such as the smart watch itself. Moreover, the content displayed in the electronic device can be judged and switched automatically according to the distance of the viewer. Also, a smooth switching can be provided to the user with a dynamic effect between the real image and the virtual image, to achieve a good watching experience for the user.

That is, the advantages of the embodiments of the present disclosure lies in that:

1. the display information is rendered intelligently which is suited to the watching expectation of the user, in a manner of acquiring the brief information at a remote location and viewing the detailed information at a near location;

2. frequent operations on a small screen are simplified;

3. the display content is not limited by the screen with a small size, and rich information may be displayed;

4. the fact of a sudden and uncomfortable watching experience brought about to the user because of the size inconsistency of the near image and the remote image in the traditional LOE-based display device is avoided, and the transition between the remote image and the near image is natural to keep the continuousness of the watching experience by a dynamic effect between a remote image and a near image.

Hereinafter, a display switching apparatus according to the embodiment of the first implementation of the present disclosure will be described with reference to FIG. 10.

Figure 10:
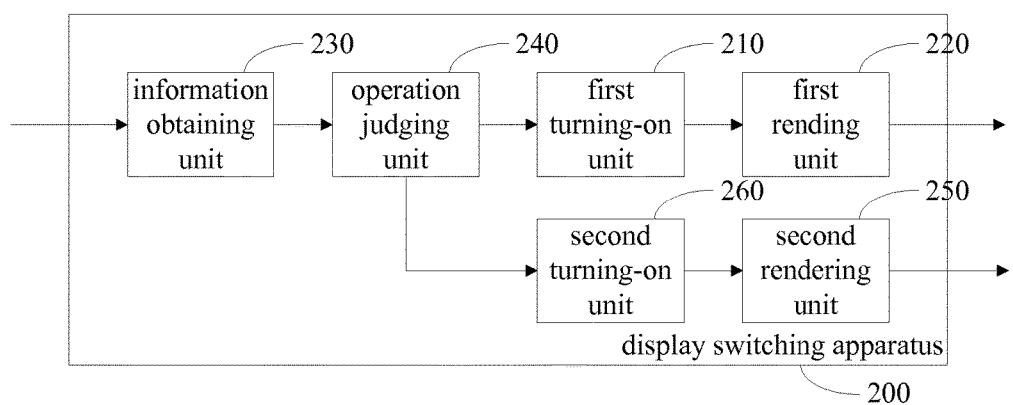
FIG. 10 illustrates a block diagram of a display switching apparatus according to the embodiment of the first implementation of the present disclosure.

FIG. 10 illustrates a block diagram of the display switching apparatus according to the embodiment of the present disclosure.

The display switching method according to the embodiment of the present disclosure shown in FIG. 7 may be realized by the display switching apparatus 200 shown in FIG. 10.

For example, the display switching apparatus 200 may judge and switch the content displayed in the electronic device automatically according to the user's watching distance, and the display switching apparatus 200 may be applied to the electronic device 100 shown in FIG. 1.

As shown in FIG. 1, the electronic device 100 according to the embodiment of the present disclosure includes a frame 110, a fixing apparatus 120 and a main functional section 130.

The fixing apparatus 120 may be connected to the frame 110, and the fixing apparatus 120 may be used for fixing the electronic device to a first operating body of a viewer.

The main functional section 130 is a circuit part in the electronic device 100 for completing various operation functions, such as displaying information, generating sound and capturing image, or the like.

Particularly, the main functional section 130 may include a processing apparatus 103, a first display apparatus 104, a second display apparatus 105 and a sensing apparatus 106.

The processing apparatus 103 is used to generate a display image to be displayed and perform a display control.

The first display apparatus 104 has a first display output region, and is used to render a first image with a first display effect in the first display output region.

The second display apparatus 105 has a second display output region, and is used to render a second image with a second display effect in the second display output region.

The second display apparatus 105 may include a second display component 20 and a second optical component 20.

The second display component 10 is used to output original light corresponding to the display interface.

The second optical component 20 is used to receive the original light corresponding to the second image from the second display component 10, and change the light path of the original light to form a virtual image corresponding to the display interface, so that the viewer 30 at a first certain location from the electronic device 100 can perceive the virtual image, wherein the size of the virtual image being perceived is larger than the size of the second optical component 20.

The sensing apparatus 106 is used to obtain parameter information related to an input operation performed by the viewer. For example, the parameter information is used to characterize the input operation on the electronic device 100 by the viewer.

In an example, the first display apparatus 104, the second display apparatus 105 and the sensing apparatus 106 may be arranged in the frame 110.

In an example, the first display apparatus and the second display apparatus may be different display apparatuses, and the first display output region and the second display output region may be different display output regions.

In an example, the first display apparatus and the second display apparatus may be display apparatuses following different display principles, and the size of the first display output region may be larger than that of the second display output region; and the size of the first image rendered in the first display output region with the first display effect which is viewed by the viewer may be larger than that of the second image rendered in the second display output region with the second display effect which is perceived by the viewer, when a distance from the viewer to the frame is a first distance.

In an example, the first display apparatus may comprise a first display screen having a first size equal to the size of the first display output region; the second display apparatus may comprise a second display screen having a second size smaller than the size of the second display output region; the size of the first image rendered in the first display output region with the first display effect viewed by the viewer may be equal to the size of the first display output region, when a distance from the viewer to the frame is a second distance; and the size of the second image rendered in the second display output region with the second display effect which is perceived by the viewer may be larger than the size of the second display output region, when a distance from the viewer to the frame is the second distance.

In addition, the display switching apparatus 200 may communicate with the electronic device 100 in any manner.

In an example, the display switching apparatus 200 may be integrated into the electronic device 100 as a software module and/or a hardware module. In other words, the electronic device 100 may include the display switching apparatus 200. For example, when the electronic device 100 is a mobile phone, the display switching apparatus 200 may be a software module in the operation system of the mobile phone, or may be an application developed for the mobile phone. Of course, the display switching apparatus 200 may be one of many hardware modules of the mobile phone.

Alternatively, in another example, the display switching apparatus 200 and the electronic device 100 may be separate devices, and the display switching apparatus 200 may be connected to the electronic device 100 by wire and/or wireless network, and transfer interaction information in an agreed data format.

As shown in FIG. 10, the display switching apparatus 200 includes a first turning-on unit 210, a first rendering unit 220, an information obtaining unit 230, an operation judging unit 240 and a second rendering unit 250. In addition, the display switching apparatus 200 may include a second turning-on unit 260.

The first turning-on unit 210 may be used for turning on the first display apparatus to make the first display apparatus in a working state.

The first rendering unit 220 may be used for rendering a first image in the first display output region with a first display effect by the first display apparatus.

The information obtaining unit 230 may be used for obtaining first parameter information related to a current input operation performed by the viewer, by the sensing apparatus.

The operation judging unit 240 may be used for judging whether the current input operation is a first input operation or not and obtaining a first judging result, according to the first parameter information.

The second rendering unit 250 may be used for rendering a second image in the second display output region with a second display effect by the second display apparatus, when the first judging result indicates that the current input operation is the first input operation and the second display apparatus is in the working state.

In an example, the sensing apparatus 106 may be a first sensing apparatus for obtaining spatial location information of the electronic device under a control of an input operation by the viewer; and the operation judging unit 240 may judge whether the current input operation is a first input operation or not according to the first parameter information by operations of: judging whether the electronic device is moved from a first location to a second location in a gravity direction or not, and judging whether the electronic device is rotated from a first angle to a second angle around the first operating body as the center, according to the space location information.

In an example, the sensing apparatus 106 may be a second sensing apparatus for sensing control operation information generated when a second operating body of the viewer is approaching or contacting a sensing region including at least a part of the first display output region and at least a part of the second display output region; and the operation judging unit 240 may judge whether the current input operation is a first input operation or not according to the first parameter information by operations of: judging whether the second operating body slides from the at least a part of the first display output region to the at least a part of the second display output region or not, according to the control operation information.

In an example, the second turning-on unit 260 may be used for turning on the second display apparatus to make the second display apparatus in the working state, when the first judging results indicates that the current input operation is the first input operation, before rendering a second image in the second display output region with a second display effect by the second display apparatus.

In an example, the first rendering unit 220 may be further used for controlling the display output of the first display apparatus to make the first display apparatus stop rendering the first image, after the second turning-on unit 260 turns on the second display apparatus.

In an example, the size of the first image rendered in the first display output region with the first display effect viewed by the viewer may be equal to the size of the first display output region, when a distance from the viewer to the frame is a second distance; and the second rendering unit 250 may render a second image in the second display output region with a second display effect by the second display apparatus by operations of: controlling a display output of the second display apparatus at a first timing, so that the size of the second image rendered in the second display output region with the second display effect which is perceived by the viewer is equal to the size of the first display output region, when the distance from the viewer to the frame is the second distance; and controlling a display output of the second display apparatus at a second timing after the first timing, so that the size of the third image rendered in the second display output region with the second display effect which is perceived by the viewer is larger than the size of the first display output region, when the distance from the viewer to the frame is the second distance; and wherein a display content of the second image is consistent with that of the first image.

In an example, the second rendering unit 250 may render a second image in the second display output region with a second display effect by the second display apparatus by operations of: controlling a display output of the first display apparatus at a first timing, so that the size of the first image rendered in the first display output region with the first display effect viewed by the viewer is equal to the size of the first display output region, when the distance from the viewer to the frame is the second distance; controlling a display output of the first display apparatus at a second timing after the first timing, so that the size of the first image rendered in the first display output region with the first display effect viewed by the viewer is smaller than the size of the first display output region, when the distance from the viewer to the frame is the second distance; controlling a display output of the second display apparatus at a third timing after the second timing, so that the size of the second image rendered in the second display output region with the second display effect which is perceived by the viewer is smaller than the size of the first display output region, when the distance from the viewer to the frame is the second distance; and controlling a display output of the second display apparatus at a fourth timing after the third timing, so that the size of the third image rendered in the second display output region with the second display effect which is perceived by the viewer is larger than the size of the first display output region, when the distance from the viewer to the frame is the second distance; and wherein the size of the second image which is perceived by the viewer at the third timing is equal to the size of the first image viewed by the viewer at the second timing, and a display content of the second image is consistent with that of the first image.

In an example, the second rending unit 250 may render a second image in the second display output region with a second display effect by the second display apparatus by operations of: controlling a display output of the first display apparatus at a first timing, so that the size of the first image rendered in the first display output region with the first display effect viewed by the viewer is equal to the size of the first display output region, when the distance from the viewer to the frame is the second distance; controlling a display output of the first display apparatus at a second timing after the first timing, so that the size of the first image rendered in the first display output region with the first display effect viewed by the viewer is smaller than the size of the first display output region, when the distance from the viewer to the frame is the second distance; controlling a display output of the second display apparatus at a third timing after the second timing, so that the size of the second image rendered in the second display output region with the second display effect which is perceived by the viewer is smaller than the size of the first display output region, when the distance from the viewer to the frame is the second distance; and controlling a display output of the second display apparatus at a fourth timing after the third timing, so that the size of the third image rendered in the second display output region with the second display effect which is perceived by the viewer is larger than the size of the first display output region, when the distance from the viewer to the frame is the second distance; and wherein the size of the second image which is perceived by the viewer at the third timing is equal to the size of the first image viewed by the viewer at the second timing, and a display content of the second image is consistent with that of the first image.

The detailed configurations and operations of the units of the display switching apparatus 200 and the apparatuses of the electronic device 100 according to the embodiment of the present disclosure have been described above with reference to FIG. 1 to FIG. 9e, and thus the repeated description thereof is omitted.

It can be seen that, with the display switching apparatus according to the embodiments of the present disclosure, the parameter information related to the input operation can be obtained when it is detected that the viewer performs the input operation on the electronic device, and different display apparatuses are turned on according to the parameter information, so that the display images are displayed in different display output regions with different display effects by different display apparatuses accordingly based on different user requirements. Therefore, in the embodiments of the present disclosure, the first display apparatus is used to output a real image corresponding to the display image, so that the viewer at a first distance from the electronic device can see the real image in the first display output region, and the second display apparatus is used to output a virtual image corresponding to the display image, so that the viewer at a second distance from the electronic device can perceive the virtual image in the second display output region, wherein the size of the real image being viewed is equal to the size of the first display output region, and the size of the virtual image which is perceived is larger than the size of the second display output region. Based on the above configuration of the display apparatus, an electronic device and a display switching apparatus are provided, which can provide an image or video display with a larger size and a higher resolution, without being limited by the size of the wearable electronic device such as the smart watch itself. Moreover, the content displayed in the electronic device can be judged and switched automatically according to the distance of the viewer. Also, a smooth switching can be provided to the user with a dynamic effect between the real image and the virtual image, to achieve a good watching experience for the user.

In addition, although the units are described above as the performing bodies of the steps to illustrate the embodiments of the present disclosure, those skilled in the art may understand that the present disclosure is not limited thereto. The performing bodies of the steps may be other one or more devices, apparatuses, units, or even modules.

For example, the steps performed by the above first turning-on unit 210, the first rendering unit 220, the information obtaining unit 230, the operation judging unit 240, the second rendering unit 250 and the second turning-on unit 260 may be realized collectively by the CPU in the electronic device.

(Second Implementation)

Figure 11A:
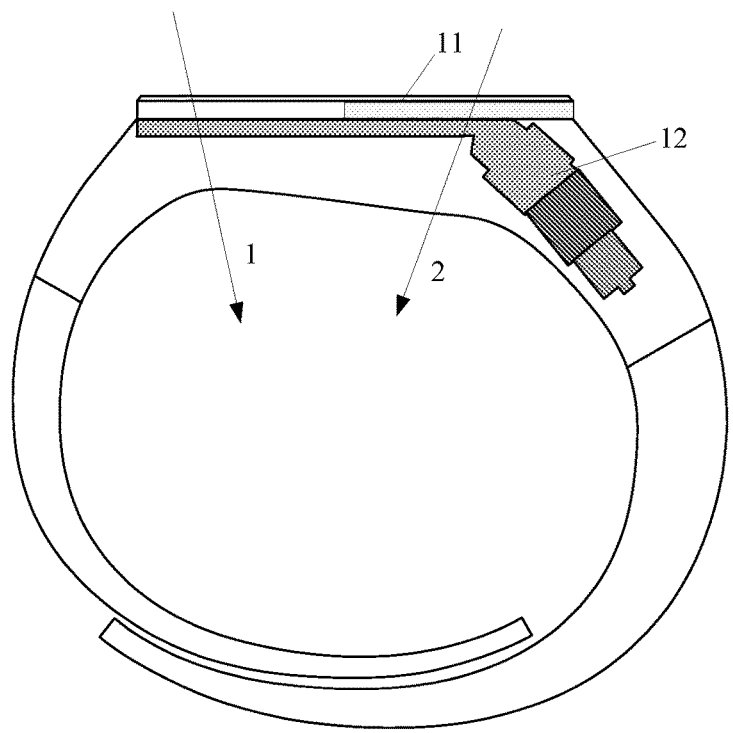
FIG. 11a to FIG. 11c are schematic diagrams of scenes of the electronic device to which the information processing method is applied according to an embodiment of a second implementation of the present disclosure.
Figure 11B:
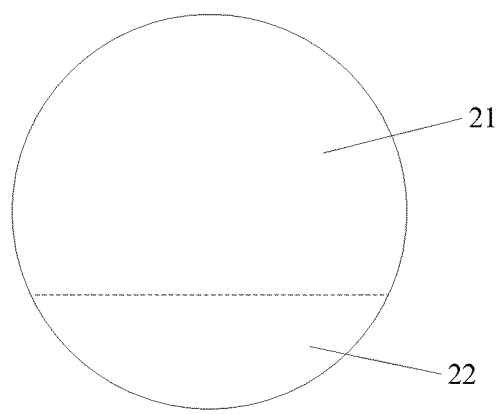
Figure 11C:
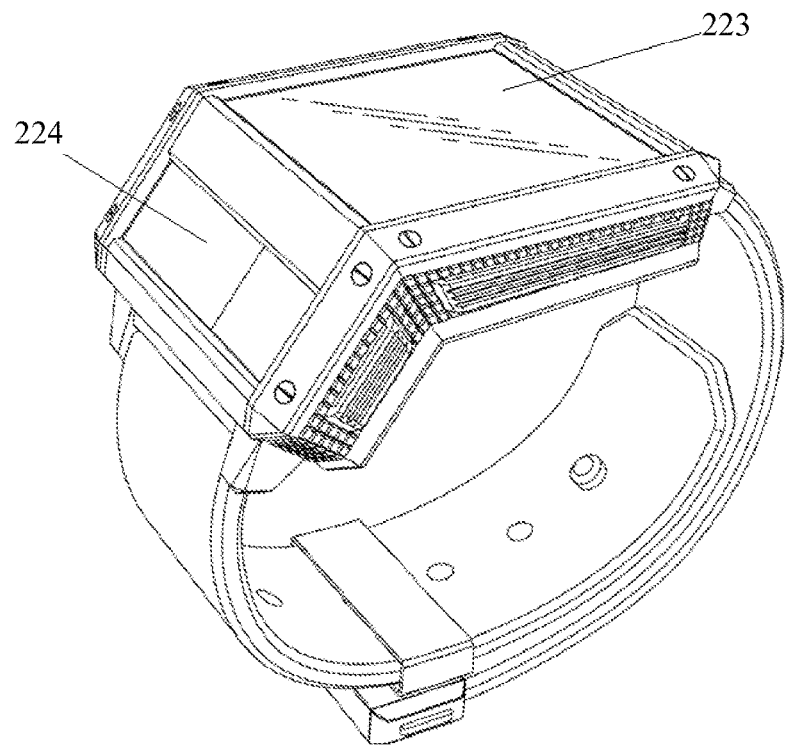

In various method embodiments of the present disclosure, the information processing method is applied to an electronic device which may be a smart phone or a smart wearable electronic device such as a smart watch. FIG. 11a to FIG. 11c are schematic diagrams showing scenarios of an electronic device to which the information processing method according to the embodiment of the second implementation of the present disclosure is applied. In this scenario, the electronic device is a smart wearable electronic device, i.e., a smart watch. FIG. 11a and FIG. 11b are schematic diagrams of a first scenario of the electronic device to which the information processing method according to the embodiment of the second implementation of the present disclosure is applied. As shown in FIG. 11a, the smart watch has a first display module 11 and a second display module 12 with different display principles. Taking the dial section of the smart watch being circle as an example, the first display module 11 has a first display region 21, the second display module 12 has a second display region 22 smaller than the first display region 21. A first interaction way for a user using the first display module of the electronic device as an observation way in which the user's eyes are away from the first display region 21 of the electronic device (as shown by the arrow 2 in FIG. 11a) is different from a second interaction way for the user using the second display module of the electronic device as an observation way in which the user's eyes are close to the second display region 22 of the electronic device (as shown by the arrow 1 in FIG. 11a), due to the different display principles of the first display module 11 and the second display module 12. Light beam from the second display module 12 is incident to the user's eyes to make a second perception image, the size of which is larger than that of the second display region 12, be perceived by the user when the user approaches the second display region 22 of the electronic device in the second interaction way. A first perception image, the size of which is equal to that of the first display region 21, is perceived by the user when the user is away from the first display region 21 of the electronic device in the first interaction way. The dial section of the smart watch is not limited to the circle shape, and may be of other shape such as a square or a rectangular.

In the present example, the first display region 21 and the second display region 22 are in the dial section (display screen) of the smart watch. In another example, the first display region 21 and the second display region 22 may be arranged in two display screens, which may be arranged in the same plane or different planes, of the smart watch respectively. FIG. 11c is a schematic diagram of a second scenario of an electronic device to which the information processing method according to the embodiment of the second implementation is applied. As shown in FIG. 11c, the electronic device is a smart wearable electronic device, and in particular a smart watch. The smart watch has a first display region 223 and a second display region 224, which are two display screens respectively and are arranged on different planes.

In another implementation scenario, the electronic device may be a smart phone having any structure of the above FIG. 11a. Differently, the first display region and the second display region may be arranged on different surfaces of the smart phone. For example, the first display region is arranged on a first surface of the smart phone, the surface where the display screen in the related art is located, i.e., the front surface. The second display region may be arranged on the back surface or the side surface of the smart phone, the particular location of which may be decided flexibly according to the arrangement of the display modules of the smart phone.

Figure 12:
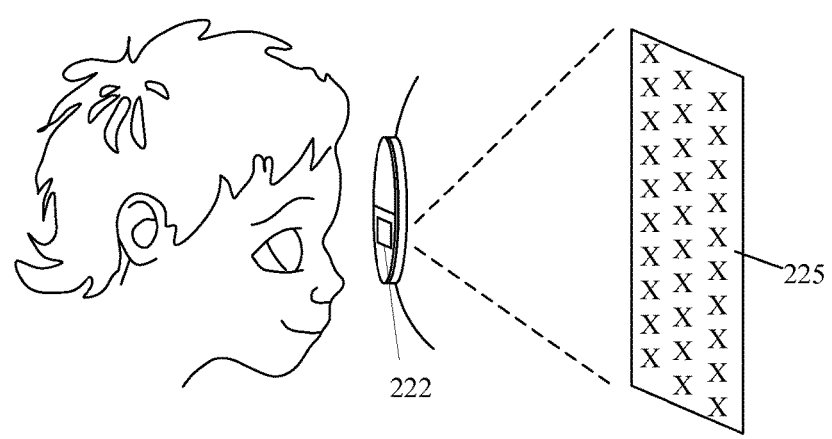
FIG. 12 is a schematic diagram in which the user observes a second display region in a second interaction way according to an embodiment of the second implementation of the present disclosure.

FIG. 12 is a schematic diagram in which the user observes the second display region in the second interaction way in the embodiment of the second implementation of the present disclosure. As shown in FIG. 12, when the user's eyes approaches the second display region 222 of the electronic device, the light from the second display module is incident to the user's eye directly, i.e., in a projection way, so that the size of the second perception image 225 perceived by the user is much larger than that of the second display region 222 in the user's view field, and the distance from the user's eye to the second perception image 225 perceived by the user may be several meters to tens of meters. The distance from the user's eye to the first perception image is about equal to the length of an arm (tens of centimeters) in the maximum when the user observes the first display region in the first interaction way. Compared to the tens of centimeters, the distance of the second perception image perceived by the user in the second interaction way is much larger than the distance of the first perception image perceived in the first interaction way. Thus, the size of the perceived image is larger when the user observes the second display region in the second interaction way, and the visual experience of the user is greatly improved.

The following method embodiments can be applied to the electronic device having the first display module and the second display module. The mobile phone or the smart wearable electronic device is arranged with a first display screen, the display region of which corresponds to the first display region, and a second display screen, the display region of which corresponds to the second display region. Particularly, when the electronic device is a mobile phone, the first display screen and the second display screen may be arranged on the first surface and the second surface of the mobile phone, respectively. The first surface and the second surface are opposite to each other, and are two surfaces with the maximum area in the mobile phone, i.e., the so called front surface and the back surface. When the electronic device is a smart wearable electronic device, the first display screen and the second display screen may be arranged on the same plane or different planes of the smart wearable electronic device, depending on the practical product.

Hereinafter, a further detailed description of the second implementation of the present disclosure will be made with reference to the accompany drawings.

First Embodiment of Second Implementation

Figure 13:
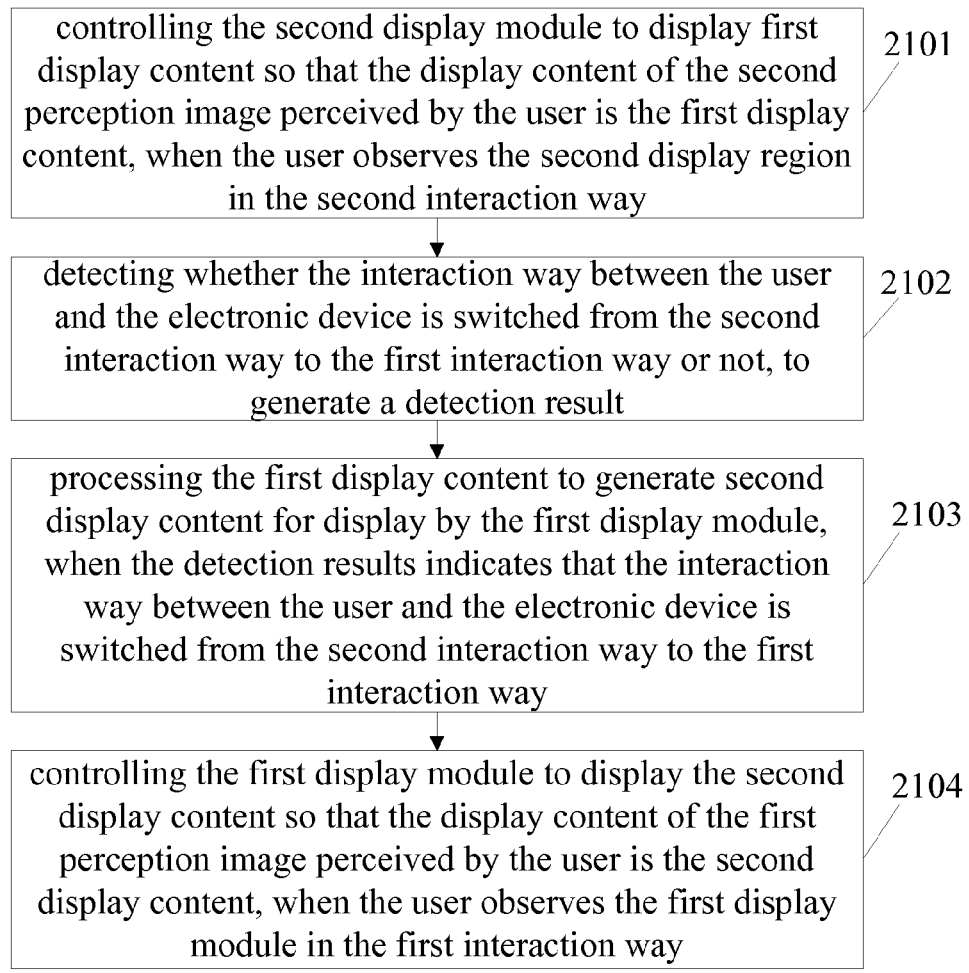
FIG. 13 is a schematic diagram of a flowchart of an information processing method according to a first embodiment of the second implementation of the present disclosure.

An information processing method applied to an electronic device is provided in the embodiment of the present disclosure. FIG. 13 is a flowchart schematic diagram of an information processing method according to the first embodiment of the second implementation of the present disclosure.

At step S2101, the second display module is controlled to display first display content so that the display content of the second perception image perceived by the user is the first display content, when the user observes the second display region in the second interaction way.

Herein, the second interaction way is an observation way in which the user's eyes approach the second display region of the electronic device. That is, in the second interaction way, the user's eyes approach the second display region and the user observes the second display region.

The first display content may be content stored in the electronic device, such as an image, a video, or the like. The first display content may also be network resource acquired from the network after the electronic device is accessed to the network, such as content of a webpage, a video on a website, an image on a website, or the like.

At step S2102, it is detected whether the interaction way between the user and the electronic device is switched from the second interaction way to the first interaction way or not, to generate a detection result.

Herein, whether the interaction way between the user and the electronic device is switched from the second interaction way to the first interaction way or not may be detected in the following ways particularly.

In a first way, the electronic device is arranged with a switch key. When it is detected that the switch key is triggered in the electronic device, it is determined that the interaction way between the user and the electronic device is switched from the second interaction way to the first interaction way. In another embodiment, it may also be determined that the interaction way between the user and the electronic device is switched from the first interaction way to the second interaction way by detecting that the switch key is triggered again. Particularly, the switch key may be a physical key on the electronic device, or may be a virtual key which may be triggered by the touch display screen corresponding to the first display region. This way may be applied to the mobile phone or the smart wearable electronic device.

In a second way, the electronic device is arranged with a voice recognition unit. When a voice operation corresponding to a preset switch instruction is recognized in the electronic device, the switch instruction is triggered according to the voice operation, and the interaction way between the user and the electronic device is switched from the second interaction way to the first interaction way by the switch instruction. In another embodiment, the interaction way between the user and the electronic device may be switched from the first interaction way to the second interaction way by the switch instruction. This way may be applied to the mobile phone or the smart wearable electronic device.

In a third way, the electronic device is arranged with a gravity sensing unit or a gyro sensor. When it is detected that the placement direction of the electronic device is changed by the gravity sensing unit or the gyro sensor of the electronic device, if the interaction way between the user and the electronic device is the second interaction way, it is detected that the back surface of the electronic device is towards the first direction by the gravity sensing unit or the gyro sensor. When it is detected that the front surface of the electronic device is towards the first direction by the gravity sensing unit or the gyro sensor, it is determined that the interaction way between the user and the electronic device is switched from the second interaction way to the first interaction way. Accordingly, when it is detected that the back surface of the electronic device is towards the first direction again by the gravity sensing unit or the gyro sensor, it is determined that the interaction way between the user and the electronic device is switched from the first interaction way to the second interaction way. This way may be applied to the mobile phone.

In a fourth way, the electronic device is arranged with a distance sensor which may be arranged on the same plane with the second display screen. When it is detected that the distance from an obstacle to the electronic device is smaller than a first threshold by the distance sensor of the electronic device, it is determined that the interaction way between the user and the electronic device is the second interaction way. When it is detected that the distance from the obstacle to the electronic device is larger than the first threshold by the distance sensor of the electronic device, it is determined that the interaction way between the user and the electronic device is switched from the second interaction way to the first interaction way. Accordingly, when it is detected that the distance from the obstacle to the electronic device is smaller than the first threshold by the distance sensor, it is determined that the interaction way between the user and the electronic device is switched from the first interaction way to the second interaction way. This way may be applied to the mobile phone or the smart wearable electronic device.

In a fifth way, the electronic device is arranged with a gravity sensing unit or a gyro sensor. When it is detected that the electronic device is raised up from a first height (the height where the electronic device is at in the user's hand when the user's arm is put down naturally) to a second height (a height where the user's eyes is at) and it is detected that the orientation of the electronic device is changed from being towards the outer side of the user's side (i.e., a plane where the user's arm is located) to being towards the inner side of the user's face (i.e., a plane where the user's face is located) by the gravity sensing unit or the gyro sensor of the electronic device, it is determined that the interaction way between the user and the electronic device is the second interaction way. When it is detected that the electronic device falls down from the second height to a third height (a height where the user's chest is at) by the gravity sensing unit or the gyro sensor and the orientation of the electronic device is not changed, it is determined that the interaction way between the user and the electronic device is switched from the second interaction way to the first interaction way. This way may be applied to the smart wearable electronic device.

At step S2103, the first display content is processed to generate second display content for display by the first display module, when the detection results indicates that the interaction way between the user and the electronic device is switched from the second interaction way to the first interaction way.

Herein, the interaction way between the user and the electronic device is switched from the second interaction way to the first interaction way. That is, the user's eye is moved from approaching the second display region of the electronic device to being away from the first display region of the electronic device.

In the present embodiment, the first display content and the second display content may be associated, or may be unrelated. Particularly, when the first display content and the second display content are associated, the second display content may be an identification image for obtaining the first display content, for example, a 2D code which can be used to obtain the first display content. The second display content may also be a data item which may be performed on the first display content, for example, a virtual operation key such as a sharing key, a download key or the like. Alternatively, the second display content may also be a part of the content of the first display content.

At step 2104, the first display module is controlled to display the second display content so that the display content of the first perception image perceived by the user is the second display content, when the user observes the first display module in the first interaction way.

Figures 14A, 14B:
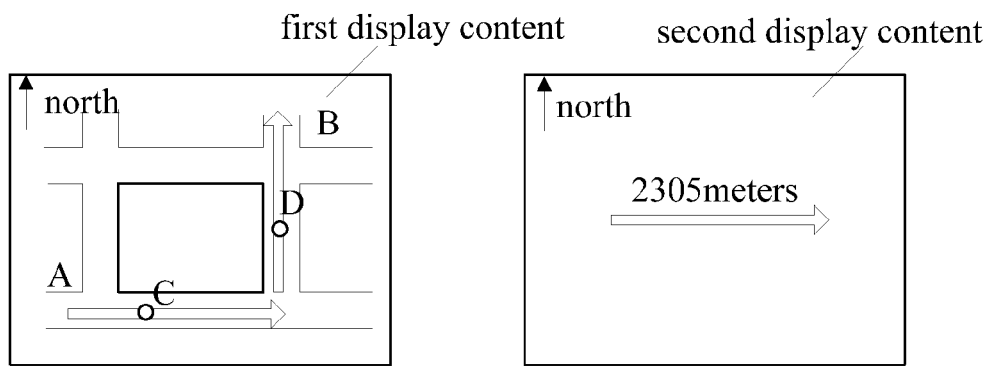
FIG. 14a and FIG. 14b are schematic diagrams of a first kind of first display content and second display content according to an embodiment of the second implementation of the present disclosure, respectively.

According to an embodiment of the present disclosure, FIG. 14*a* and FIG. 14*b* are first schematic diagrams of the first display content and the second display content of the embodiment of the second implementation of the present disclosure, respectively. As shown in FIG. 14*a*, in the present embodiment, the first display content is navigation path information. When the user observes the first display content in the second interaction way, the second perception image perceived by the user is the navigation path information. When the interaction way between the user and the electronic device is changed from the second interaction way to the first interaction way, the electronic device abstracts the original location, the final location and the path information, such as the location A as the original location and the location B as the final location in FIG. 14*a*, in the navigation path information according to the navigation path information displayed in the first display content. The electronic device acquires its current location information in real time by its location system, determines the movement direction at the current location according to the current location information and the path information of the electronic device, and makes the movement direction be the second display content. For example, when the current location of the electronic device is the location C, the electronic device determines the movement direction of the electronic device is the direction from the west to the east according to the location C and the path information, and makes the direction indication from west to east as the second display content, which may be shown in FIG. 14*b* particularly, the direction from west to east may be an arrow direction so that the user may move according to the arrow. For another example, when the current location of the electronic device is the location D, the electronic device determines the movement direction of the electronic device is the direction from the south to the north according to the location D and the path information, and makes the direction indication from south to north as the second display content. In another implementation, the direction indication may be a word identification indication. For example the second display content is a word indication of "moving to the east". Optionally, the electronic device determines the distance to the location where the direction is to be changed according to the current location and the path information. For example, the current location of the electronic device is the location C, and it is determined that the distance from the turning point to the location C is 2350 meters according to the path information, then, the direction indication from the west to the east and the 2350 meters are to be the second display content, as shown in FIG. 14*b*.

Optionally, in the present embodiment, the interaction way between the user and the electronic device is switched from the second interaction way to the first interaction way, which may be realized in the fifth way provided in step S2102. The two display modules in the electronic device described in the present embodiment may have various usage states in use. Taking the case in which the electronic device is worn at the wrist as a smart watch as an example.

That is, if the user wants to see the first display content which is more detailed and fully, he/shell will raise the electronic device to the first height, i.e., move the electronic device to be close to the user's eyes. Assuming the electronic device is in a third relative region (i.e., the region in front of the user's head) at this time. That is, when the electronic device is in the third relative region, the electronic device will enable the second display module. At this time, only the user himself/herself can see the first display content. When the user wants to associate the first display content seen through the second display module with the first display module, that is, when the user wants to make the first display content be seen by more people, the user lowers the electronic device to the second height. Assuming that the user puts his/her arm in front of the chest to make the electronic device in a second relative region (i.e., the region in front of the user's chest). At this time, the electronic device will detect that it is in the second relative region and enable the first display module (the first display module will be turned on or woken up), then the second display content in the present embodiment is displayed. When the user does not want to see the second display content, the user's arm lowers down naturally, and at this time, the first display module and the second display module of the electronic device may be in a turned-off state or a low power consumption state such as a standby state, which can save power to prolong the usage time of the electronic device. When the user's arm lowers down naturally, it may be considered that the electronic device is in a first relative region. That is, the first relative region indicates a relative location relationship between the user and the electronic device, i.e. the side region of the user's body.

With the technical solution of the present embodiment of the present disclosure, some basic information may be displayed by the first display module, and more and detailed information can be displayed by the second display module. Thus, the electronic device provided in the embodiment of the present disclosure may not be limited by the size of the wearable electronic device itself, and provide an image or video display with a larger size and a higher resolution. On the other hand, the technical solution provided in the present embodiment avoids the fact of the first display content seen by the user in the second interaction manner not being able to be seen by more people other than the user himself/herself, and the user's operation experience is greatly improved.

According to another aspect of the present embodiment, the first display content and the second display content are associated.

Particularly, the association between the first display content and the second display content will be described in detail in the second embodiment to the sixth embodiment of the second implementation hereinafter.

Second Embodiment of Second Implementation

Figure 15:
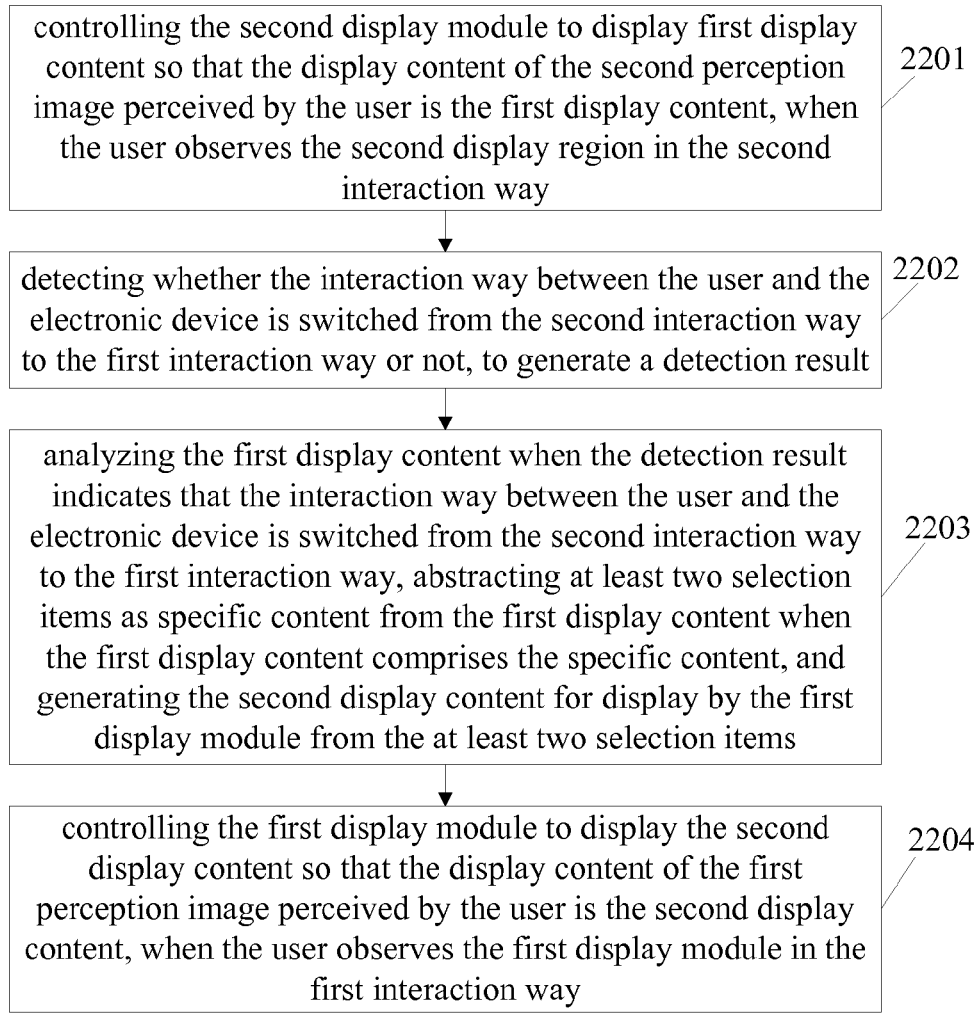
FIG. 15 is a schematic diagram of an information processing method according to a second embodiment of the second implementation of the present disclosure.

An information processing method applied to an electronic device is further provided in the embodiment of the second implementation of the present disclosure. FIG. 15 is a schematic diagram of a flowchart of the information processing method according to the second embodiment of the second implementation of the present disclosure. As shown in FIG. 15, the method includes the following steps.

At step 2201, the second display module is controlled to display first display content so that the display content of the second perception image perceived by the user is the first display content, when the user observes the second display region in the second interaction way.

Herein, the second interaction way is an observation way in which the user's eyes approach the second display region of the electronic device. That is, in the second interaction way, the user's eyes approach the second display region and the user observes the second display region.

The first display content may be content stored in the electronic device, such as an image, a video, or the like. The first display content may also be network resource acquired from the network after the electronic device is accessed to the network, such as content of a webpage, a video on a website, an image on a website, or the like.

At step S2202, it is detected whether the interaction way between the user and the electronic device is switched from the second interaction way to the first interaction way or not, to generate a detection result.

Herein, whether the interaction way between the user and the electronic device is switched from the second interaction way to the first interaction way or not may be detected in the following ways particularly.

In a first way, the electronic device is arranged with a switch key. When it is detected that the switch key is triggered in the electronic device, it is determined that the interaction way between the user and the electronic device is switched from the second interaction way to the first interaction way. In another embodiment, it may also be determined that the interaction way between the user and the electronic device is switched from the first interaction way to the second interaction way by detecting that the switch key is triggered again. Particularly, the switch key may be a physical key on the electronic device, or may be a virtual key which may be triggered by the touch display screen corresponding to the first display region. This way may be applied to the mobile phone or the smart wearable electronic device.

In a second way, the electronic device is arranged with a voice recognition unit. When a voice operation corresponding to a preset switch instruction is recognized in the electronic device, the switch instruction is triggered according to the voice operation, and the interaction way between the user and the electronic device is switched from the second interaction way to the first interaction way by the switch instruction. In another embodiment, the interaction way between the user and the electronic device may be switched from the first interaction way to the second interaction way by the switch instruction. This way may be applied to the mobile phone or the smart wearable electronic device.

In a third way, the electronic device is arranged with a gravity sensing unit or a gyro sensor. When it is detected that the placement direction of the electronic device is changed by the gravity sensing unit or the gyro sensor of the electronic device, if the interaction way between the user and the electronic device is the second interaction way, it is detected that the back surface of the electronic device is towards the first direction by the gravity sensing unit or the gyro sensor. When it is detected that the front surface of the electronic device is towards the first direction by the gravity sensing unit or the gyro sensor, it is determined that the interaction way between the user and the electronic device is switched from the second interaction way to the first interaction way. Accordingly, when it is detected that the back surface of the electronic device is towards the first direction again by the gravity sensing unit or the gyro sensor, it is determined that the interaction way between the user and the electronic device is switched from the first interaction way to the second interaction way. This way may be applied to the mobile phone.

In a fourth way, the electronic device is arranged with a distance sensor which may be arranged on the same plane with the second display screen. When it is detected that the distance from an obstacle to the electronic device is smaller than a first threshold by the distance sensor of the electronic device, it is determined that the interaction way between the user and the electronic device is the second interaction way. When it is detected that the distance from the obstacle to the electronic device is larger than the first threshold by the distance sensor of the electronic device, it is determined that the interaction way between the user and the electronic device is switched from the second interaction way to the first interaction way. Accordingly, when it is detected that the distance from the obstacle to the electronic device is smaller than the first threshold by the distance sensor, it is determined that the interaction way between the user and the electronic device is switched from the first interaction way to the second interaction way. This way may be applied to the mobile phone or the smart wearable electronic device.

In a fifth way, the electronic device is arranged with a gravity sensing unit or a gyro sensor. When it is detected that the electronic device is raised up from a first height (the height where the electronic device is in the user's hand when the user's arm is put down naturally) to a second height (a height where the user's eyes is at) and it is detected that the orientation of the electronic device is changed from being towards the outer side of the user's side (i.e., a plane where the user's arm is located) to being towards the inner side of the user's face (i.e., a plane where the user's face is located) by the gravity sensing unit or the gyro sensor of the electronic device, it is determined that the interaction way between the user and the electronic device is the second interaction way. When it is detected that the electronic device falls down from the second height to a third height (a height where the user's chest is at) by the gravity sensing unit or the gyro sensor and the orientation of the electronic device is not changed, it is determined that the interaction way between the user and the electronic device is switched from the second interaction way to the first interaction way. This way may be applied to the smart wearable electronic device.

At step S2203, the first display content is analyzed when the detection result indicates that the interaction way between the user and the electronic device is switched from the second interaction way to the first interaction way, at least two selection items as specific content are abstracted from the first display content when the first display content comprises the specific content of selection items which is required to be selected and judged, and the second display content for display by the first display module are generated from the at least two selection items.

Herein, the specific content comprising selection items that needs to be selected or judged may be a word with a selective meaning, such as "or". The detailed specific content may comprise A or B, going or not going, yes or no, or the like. The specific content comprising selection items that need to be selected or judged may also be content including a question, such as "is it OK to have a meal at the restaurant?" and so on. Particularly, in the present embodiment, the electronic device analyzes the first display content to determine whether it includes a word with a selective meaning, or whether the first display content is a question. Then, the electronic device determines whether the first display content includes specific content of selection items that needs to be selected or judged according to the analyzing result. Further, when it is determined that the first display content includes specific content of selection items that needs to be selected or judged, the obtained selection is to be the second display content displayed by the first display module according to the selection item (such as A or B) obtained by analysis or the selection item obtained by analyzing the question (such as the analysis result of the question "is it OK to have a meal at a restaurant?" being "Yes" and "No").

In the present embodiment, the first display content is words received by the electronic device (such as a short message) or an image including words (such as a multimedia message). If the first display content includes specific content of selection items that needs to be selected or judged, the first display content is analyzed. For example, FIG. 6a and FIG. 6b are first schematic diagrams of the first display content and the second display content in the embodiment of the present disclosure. As shown in FIG. 6a, the first display content includes "is it OK to have a meal at A restaurant?". The information included in the first display content that needs to be selected or judged is analyzed and abstracted to be "yes" or "no". Then at least two selection items are generated according to the abstracted information that needs to be selected or judged. The at least two selection items may feature the information that needs to be selected or judged, respectively. Optionally, the electronic device generates simple response content adaptively according to the abstracted information that needs to be selected or judged, such as the selection item of "OK, let's go to restaurant A" and the selection item of "sorry, I cannot go" displayed in the second display content as shown in FIG. 6b.

At step 2204, the first display module is controlled to display the second display content so that the display content of the first perception image perceived by the user is the second display content, when the user observes the first display module in the first interaction way.

Figures 16A, 16B:
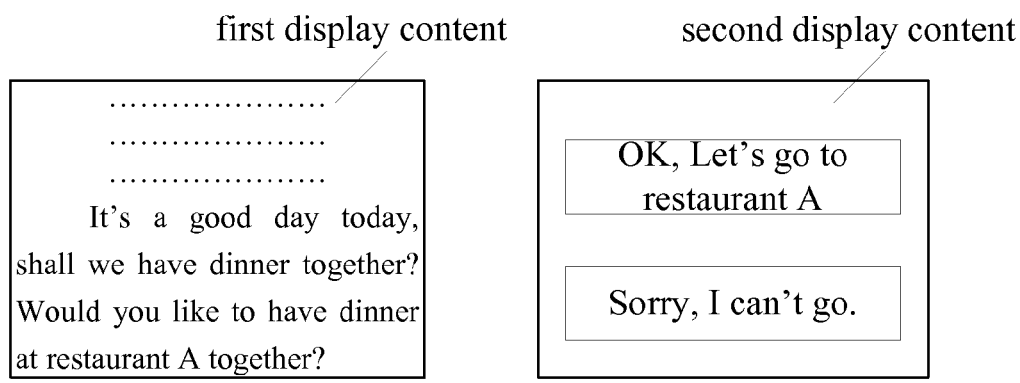
FIG. 16a and FIG. 16b are schematic diagrams of a first kind of first display content and second display content according to an embodiment of the second implementation of the present disclosure.

In the present embodiment, as shown in FIG. 16b, the display content of the first perception image perceived by the user is the two selection items rendered in the second display content which may be triggered by the user selection. When the user triggers one of the selection items, the electronic device transmits information indicating the selection item to the initiator of the first display content, i.e., responds to the first display content.

Figure 17:
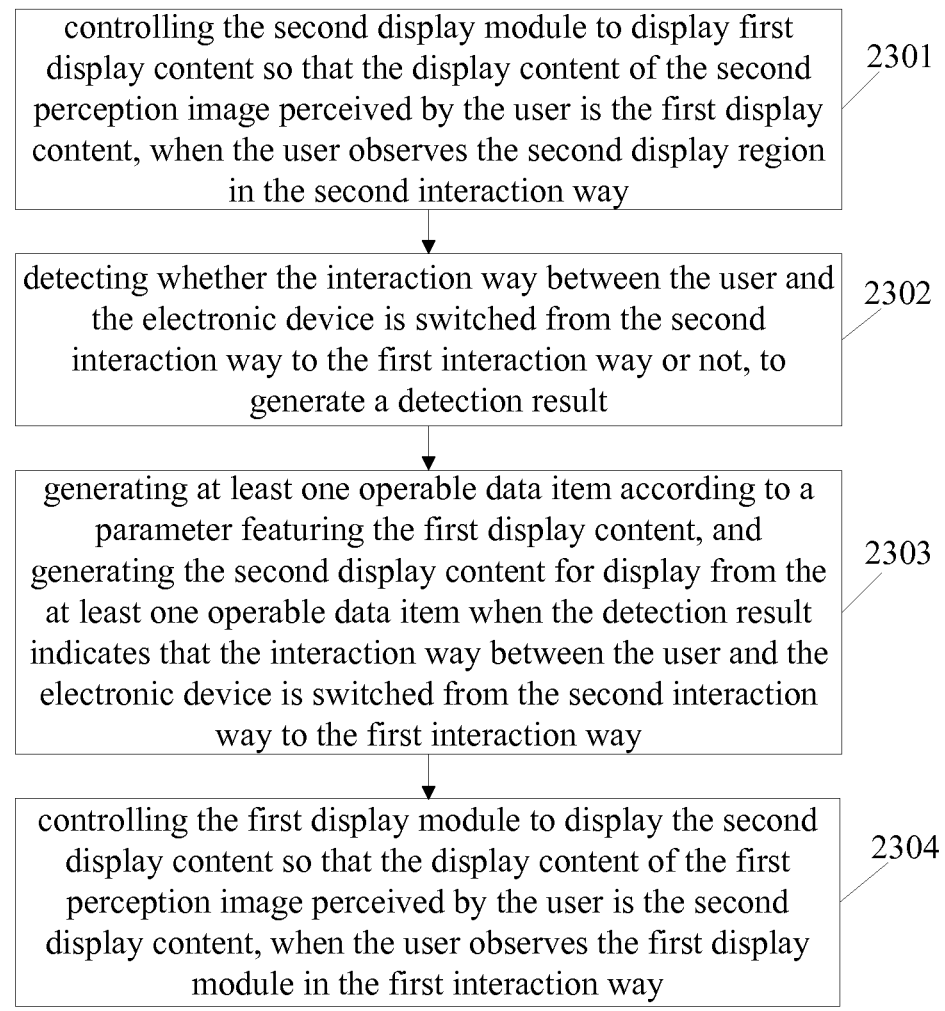
FIG. 17 is a schematic diagram of an information processing method according to a third embodiment of the second implementation of the present disclosure.

With the technical solution of the present embodiment of the present disclosure, some basic information may be displayed by the first display module, and more and detailed information can be displayed by the second display module. Thus, the electronic device provided in the embodiment of the present disclosure may not be limited by the size of the wearable electronic device itself, and provide an image or video display with a larger size and a higher resolution. On the other hand, the technical solution provided in the present embodiment avoids the fact of the first display content seen by the user in the second interaction way being not convenient to be operated. The first display content including selection items that needs to be selected or judged is displayed by the second display module which displays more detailed information, and the at least two selection items are displayed by the first display module to respond to the first display content displayed by the second display module, and the user experience is greatly improved. —d
Embodiment of Second Implementation An information processing method applied to an electronic device is further provided in the embodiment of the second implementation of the present disclosure. FIG. 17 is a schematic diagram of a flowchart of the information processing method according to the third embodiment of the second implementation of the present disclosure. As shown in FIG. 17, the method includes the following steps.

At step 2301, the second display module is controlled to display first display content so that the display content of the second perception image perceived by the user is the first display content, when the user observes the second display region in the second interaction way.

Herein, the second interaction way is an observation way in which the user's eyes approach the second display region of the electronic device. That is, in the second interaction way, the user's eyes approach the second display region and the user observes the second display region.

The first display content may be content stored in the electronic device, such as an image, a video, or the like. The first display content may also be network resource acquired from the network after the electronic device is accessed to the network, such as content of a webpage, a video on a website, an image on a website, or the like.

At step S2302, it is detected whether the interaction way between the user and the electronic device is switched from the second interaction way to the first interaction way or not, to generate a detection result.

Herein, whether the interaction way between the user and the electronic device is switched from the second interaction way to the first interaction way or not may be detected in the following ways particularly.

In a first way, the electronic device is arranged with a switch key. When it is detected that the switch key is triggered in the electronic device, it is determined that the interaction way between the user and the electronic device is switched from the second interaction way to the first interaction way. In another embodiment, it may also be determined that the interaction way between the user and the electronic device is switched from the first interaction way to the second interaction way by detecting that the switch key is triggered again. Particularly, the switch key may be a physical key on the electronic device, or may be a virtual key which may be triggered by the touch display screen corresponding to the first display region. This way may be applied to the mobile phone or the smart wearable electronic device.

In a second way, the electronic device is arranged with a voice recognition unit. When a voice operation corresponding to a preset switch instruction is recognized in the electronic device, the switch instruction is triggered according to the voice operation, and the interaction way between the user and the electronic device is switched from the second interaction way to the first interaction way by the switch instruction. In another embodiment, the interaction way between the user and the electronic device may be switched from the first interaction way to the second interaction way by the switch instruction. This way may be applied to the mobile phone or the smart wearable electronic device.

In a third way, the electronic device is arranged with a gravity sensing unit or a gyro sensor. When it is detected that the placement direction of the electronic device is changed by the gravity sensing unit or the gyro sensor of the electronic device, if the interaction way between the user and the electronic device is the second interaction way, it is detected that the back surface of the electronic device is towards the first direction by the gravity sensing unit or the gyro sensor. When it is detected that the front surface of the electronic device is towards the first direction by the gravity sensing unit or the gyro sensor, it is determined that the interaction way between the user and the electronic device is switched from the second interaction way to the first interaction way. Accordingly, when it is detected that the back surface of the electronic device is towards the first direction again by the gravity sensing unit or the gyro sensor, it is determined that the interaction way between the user and the electronic device is switched from the first interaction way to the second interaction way. This way may be applied to the mobile phone.

In a fourth way, the electronic device is arranged with a distance sensor which may be arranged on the same plane with the second display screen. When it is detected that the distance from an obstacle to the electronic device is smaller than a first threshold by the distance sensor of the electronic device, it is determined that the interaction way between the user and the electronic device is the second interaction way. When it is detected that the distance from the obstacle to the electronic device is larger than the first threshold by the distance sensor of the electronic device, it is determined that the interaction way between the user and the electronic device is switched from the second interaction way to the first interaction way. Accordingly, when it is detected that the distance from the obstacle to the electronic device is smaller than the first threshold by the distance sensor, it is determined that the interaction way between the user and the electronic device is switched from the first interaction way to the second interaction way. This way may be applied to the mobile phone or the smart wearable electronic device.

In a fifth way, the electronic device is arranged with a gravity sensing unit or a gyro sensor. When it is detected that the electronic device is raised up from a first height (the height where the electronic device is in the user's hand when the user's arm is down naturally) to a second height (a height where the user's eyes is at) and it is detected that the orientation of the electronic device is changed from being towards the outer side of the user's side (i.e., a plane where the user's arm is located) to being towards the inner side of the user's face (i.e., a plane where the user's face is located) by the gravity sensing unit or the gyro sensor of the electronic device, it is determined that the interaction way between the user and the electronic device is the second interaction way. When it is detected that the electronic device falls down from the second height to a third height (a height where the user's chest is at) by the gravity sensing unit or the gyro sensor and the orientation of the electronic device is not changed, it is determined that the interaction way between the user and the electronic device is switched from the second interaction way to the first interaction way. This way may be applied to the smart wearable electronic device.

At step S2303, at least one operable data item is generated according to a parameter featuring the first display content, and the second display content for display by the first display module is generated from the at least one operable data item when the detection result indicates that interaction way between the user and the electronic device is switched from the second interaction way to the first interaction way.

Figures 18A, 18B:
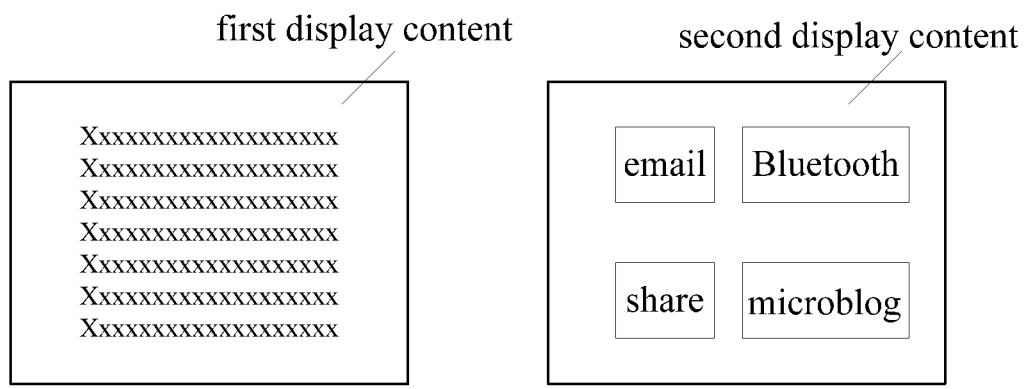
FIG. 18a and FIG. 18b are schematic diagrams of a second kind of first display content and second display content according to an embodiment of the second implementation of the present disclosure.

In the present embodiment, the first display content may be any information such as a word, an image or a video, or the like, or may be network resource obtained online from the network after the electronic device is accessed to the network. FIG. 8a and FIG. 8b are second schematic diagrams of the first display content and the second display content in the embodiment of the present disclosure. As shown in FIG. 8a, taking it as an example in which the first display content is word information stored in the electronic device itself, when the interaction way between the user and the electronic device is switched from the second interaction way to the first interaction way, at least one operable data item is generated according to a parameter featuring the first display content (which may include, but not limited to, the format parameter, the address information parameter, or the like of the first display content). As shown in FIG. 18b, there are four operable data items "email", "bluetooth", "sharing", "microblog" in the second display content, representing transmitting the first display content to a certain contact via email, starting Bluetooth and transmitting the first display content to a certain device through Bluetooth, sharing the first display content to a social network and transmitting the first display content to the microblog, respectively, wherein, the operable data item in the second display content is not limited to the above operable data items.

At step 2304, the first display module is controlled to display the second display content so that the display content of the first perception image perceived by the user is the second display content, when the user observes the first display module in the first interaction way.

In the present embodiment, as shown in FIG. 18b, the display content of the first perception image perceived by the user is the four operable data items rendered in the second display content which may be triggered by the user selection. When the user triggers one of the operable data items, the electronic device invokes an application interface corresponding to the data item, and transmits the first display content through the application interface.

With the technical solution of the present embodiment of the present disclosure, some basic information may be displayed by the first display module, and more and detailed information can be displayed by the second display module. Thus, the electronic device provided in the embodiment of the present disclosure may not be limited by the size of the wearable electronic device itself, and provide an image or video display with a larger size and a higher resolution. On the other hand, the technical solution provided in the present embodiment avoids the fact of the first display content seen by the user in the second interaction way being not convenient to be operated. The first display content is displayed by the second display module which displays more detailed information, and the at least one operable data item is displayed by the first display module to operate on the first display content displayed by the second display module in a more convenient operation, and the user experience is greatly improved.

Fourth Embodiment of Second Implementation

Figure 19:
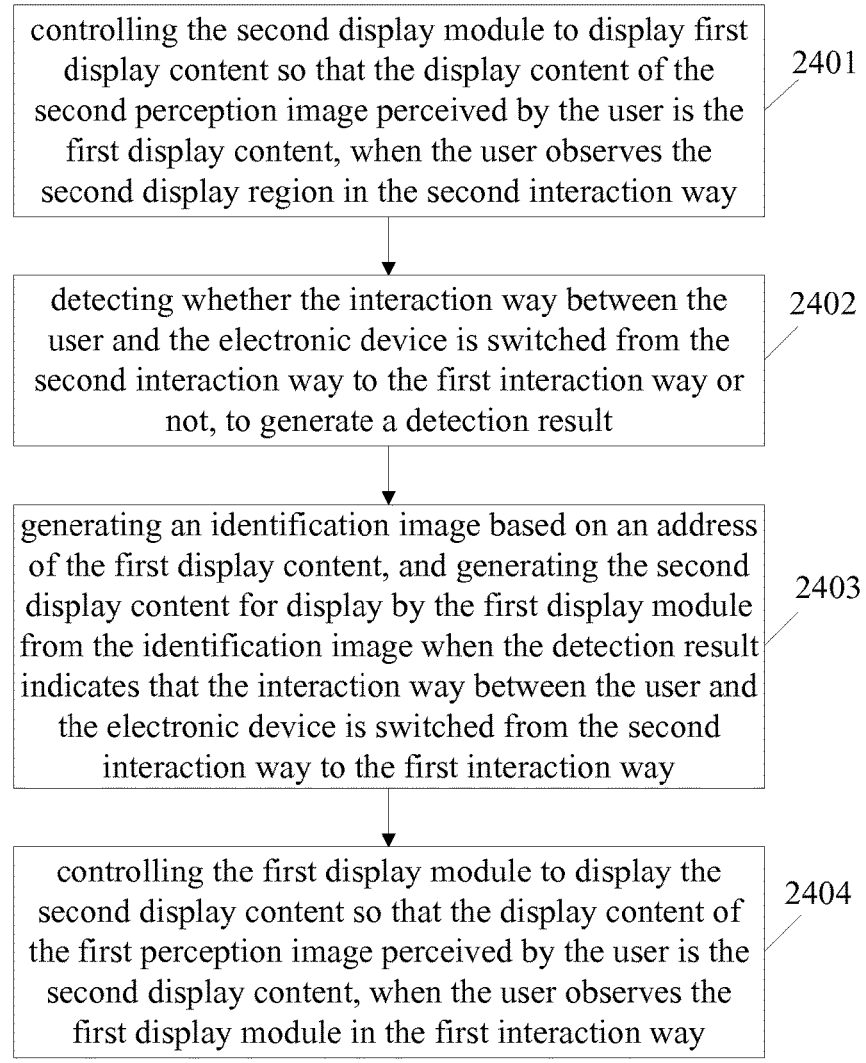
FIG. 19 is a schematic diagram of an information processing method according to a fourth embodiment of the second implementation of the present disclosure.

An information processing method applied to an electronic device is further provided in the embodiment of the second implementation of the present disclosure. FIG. 19 is a schematic diagram of a flowchart of the information processing method according to the fourth embodiment of the second implementation of the present disclosure. As shown in FIG. 19, the method includes the following steps.

At step 2401, the second display module is controlled to display first display content so that the display content of the second perception image perceived by the user is the first display content, when the user observes the second display region in the second interaction way.

Herein, the second interaction way is an observation way in which the user's eyes approach the second display region of the electronic device. That is, in the second interaction way, the user's eyes approach the second display region and the user observes the second display region.

The first display content may be content stored in the electronic device, such as an image, a video, or the like. The first display content may also be network resource acquired from the network after the electronic device is accessed to the network, such as content of a webpage, a video on a website, an image on a website, or the like.

At step S2402, it is detected whether the interaction way between the user and the electronic device is switched from the second interaction way to the first interaction way or not, to generate a detection result.

Herein, whether the interaction way between the user and the electronic device is switched from the second interaction way to the first interaction way or not may be detected in the following ways particularly.

In a first way, the electronic device is arranged with a switch key. When it is detected that the switch key is triggered in the electronic device, it is determined that the interaction way between the user and the electronic device is switched from the second interaction way to the first interaction way. In another embodiment, it may also be determined that the interaction way between the user and the electronic device is switched from the first interaction way to the second interaction way by detecting that the switch key is triggered again. Particularly, the switch key may be a physical key on the electronic device, or may be a virtual key which may be triggered by the touch display screen corresponding to the first display region. This way may be applied to the mobile phone or the smart wearable electronic device.

In a second way, the electronic device is arranged with a voice recognition unit. When a voice operation corresponding to a preset switch instruction is recognized in the electronic device, the switch instruction is triggered according to the voice operation, and the interaction way between the user and the electronic device is switched from the second interaction way to the first interaction way by the switch instruction. In another embodiment, the interaction way between the user and the electronic device may be switched from the first interaction way to the second interaction way by the switch instruction. This way may be applied to the mobile phone or the smart wearable electronic device.

In a third way, the electronic device is arranged with a gravity sensing unit or a gyro sensor. When it is detected that the placement direction of the electronic device is changed by the gravity sensing unit or the gyro sensor of the electronic device, if the interaction way between the user and the electronic device is the second interaction way, it is detected that the back surface of the electronic device is towards the first direction by the gravity sensing unit or the gyro sensor. When it is detected that the front surface of the electronic device is towards the first direction by the gravity sensing unit or the gyro sensor, it is determined that the interaction way between the user and the electronic device is switched from the second interaction way to the first interaction way. Accordingly, when it is detected that the back surface of the electronic device is towards the first direction again by the gravity sensing unit or the gyro sensor, it is determined that the interaction way between the user and the electronic device is switched from the first interaction way to the second interaction way. This way may be applied to the mobile phone.

In a fourth way, the electronic device is arranged with a distance sensor which may be arranged on the same plane with the second display screen. When it is detected that the distance from an obstacle to the electronic device is smaller than a first threshold by the distance sensor of the electronic device, it is determined that the interaction way between the user and the electronic device is the second interaction way. When it is detected that the distance from the obstacle to the electronic device is larger than the first threshold by the distance sensor of the electronic device, it is determined that the interaction way between the user and the electronic device is switched from the second interaction way to the first interaction way. Accordingly, when it is detected that the distance from the obstacle to the electronic device is smaller than the first threshold by the distance sensor, it is determined that the interaction way between the user and the electronic device is switched from the first interaction way to the second interaction way. This way may be applied to the mobile phone or the smart wearable electronic device.

In a fifth way, the electronic device is arranged with a gravity sensing unit or a gyro sensor. When it is detected that the electronic device is raised up from a first height (the height where the electronic device is in the user's hand when the user's arm is down naturally) to a second height (a height where the user's eyes is at) and it is detected that the orientation of the electronic device is changed from being towards the outer side of the user's side (i.e., a plane where the user's arm is located) to being towards the inner side of the user's face (i.e., a plane where the user's face is located) by the gravity sensing unit or the gyro sensor of the electronic device, it is determined that the interaction way between the user and the electronic device is the second interaction way. When it is detected that the electronic device falls down from the second height to a third height (a height where the user's chest is at) by the gravity sensing unit or the gyro sensor and the orientation of the electronic device is not changed, it is determined that the interaction way between the user and the electronic device is switched from the second interaction way to the first interaction way. This way may be applied to the smart wearable electronic device.

At step S2403, an identification image is generated based on an address of the first display content, and the second display content for display by the first display module is generated from the identification image when the detection result indicates that the interaction way between the user and the electronic device is switched from the second interaction way to the first interaction way.

Herein, the identification image may be a 2D code image. The present embodiment may be applied in the following scenarios.

First Scenario:

The first display content is network resource acquired from network after the electronic device is accessed to the network, such as an open webpage or a video on the website, or the like. At this time, the electronic device acquires the network address of the first display content, generates a 2D code image from the network address, and makes the 2D code image be the second display content to be displayed by the first display module.

Second Scenario:

The first display content is resource stored by the electronic device itself. At this time, the electronic device is set up as a wireless network hotspot by itself. Then, the electronic device acquires the storage location (the storage address) of the first display content in its storage area, generates the 2D code image based on the storage location, and makes the 2D code image be the second display content to be displayed by the first display module.

No matter in which scenario, other electronic devices may recognize the 2D code image in the second display content through the scanning function such as a 2D code scan, so that the first display content is obtained based on the 2D code image.

At step 2404, the first display module is controlled to display the second display content so that the display content of the first perception image perceived by the user is the second display content, when the user observes the first display module in the first interaction way.

In the present embodiment, taking it as an example in which the identification image is the 2D code image, the display content of the first perception image perceived by the user is the 2D code image, other electronic devices recognize the 2D code image in the second display content by a scanning function such as a 2D code scan, so as to obtain the first display content based on the 2D code image.

With the technical solution of the present embodiment of the present disclosure, some basic information may be displayed by the first display module, and more and detailed information can be displayed by the second display module. Thus, the electronic device provided in the embodiment of the present disclosure may not be limited by the size of the wearable electronic device itself, and provide an image or video display with a larger size and a higher resolution. On the other hand, the technical solution provided in the present embodiment avoids the fact of the first display content seen by the user in the second interaction way being not convenient to be shared. The first display content is displayed by the second display module which displays more detailed information, and the identification image featuring the address of the second display content is displayed by the first display module so that the first display content displayed by the second display module is obtained more quickly and conveniently through the identification image by other electronic devices, and the user experience is greatly improved.

Fifth Embodiment of Second Implementation

Figure 20:
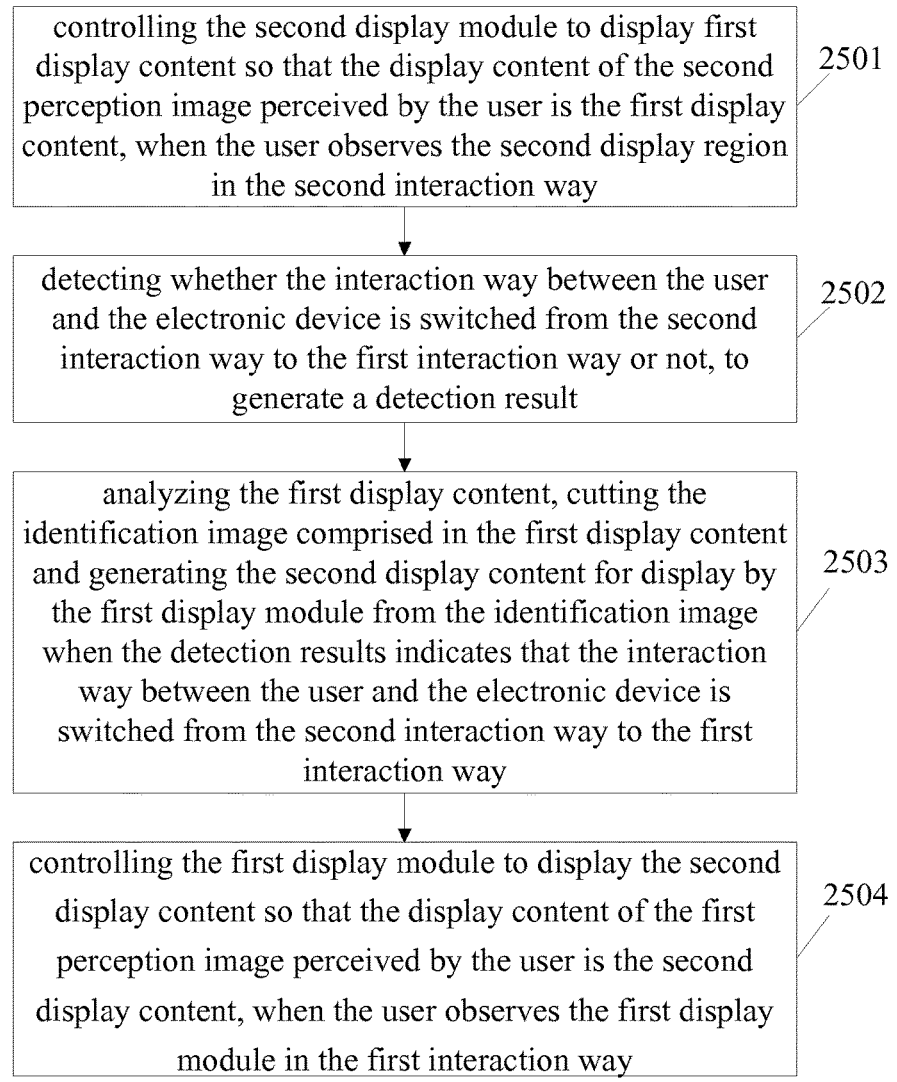
FIG. 20 is a schematic diagram of an information processing method according to a fifth embodiment of the second implementation of the present disclosure.

An information processing method applied to an electronic device is further provided in the embodiment of the second implementation of the present disclosure. FIG. 20 is a schematic diagram of a flowchart of the information processing method according to the fifth embodiment of the second implementation of the present disclosure. As shown in FIG. 20, the method includes the following steps.

At step 2501, the second display module is controlled to display first display content so that the display content of the second perception image perceived by the user is the first display content, when the user observes the second display region in the second interaction way.

Herein, the second interaction way is an observation way in which the user's eyes approach the second display region of the electronic device. That is, in the second interaction way, the user's eyes approach the second display region and the user observes the second display region.

The first display content may be content stored in the electronic device, such as an image, a video, or the like. The first display content may also be network resource acquired from the network after the electronic device is accessed to the network, such as content of a webpage, a video on a website, an image on a website, or the like.

At step S2502, it is detected whether the interaction way between the user and the electronic device is switched from the second interaction way to the first interaction way or not, to generate a detection result.

Herein, whether the interaction way between the user and the electronic device is switched from the second interaction way to the first interaction way or not may be detected in the following ways particularly.

In a first way, the electronic device is arranged with a switch key. When it is detected that the switch key is triggered in the electronic device, it is determined that the interaction way between the user and the electronic device is switched from the second interaction way to the first interaction way. In another embodiment, it may also be determined that the interaction way between the user and the electronic device is switched from the first interaction way to the second interaction way by detecting that the switch key is triggered again. Particularly, the switch key may be a physical key on the electronic device, or may be a virtual key which may be triggered by the touch display screen corresponding to the first display region. This way may be applied to the mobile phone or the smart wearable electronic device.

In a second way, the electronic device is arranged with a voice recognition unit. When a voice operation corresponding to a preset switch instruction is recognized in the electronic device, the switch instruction is triggered according to the voice operation, and the interaction way between the user and the electronic device is switched from the second interaction way to the first interaction way by the switch instruction. In another embodiment, the interaction way between the user and the electronic device may be switched from the first interaction way to the second interaction way by the switch instruction. This way may be applied to the mobile phone or the smart wearable electronic device.

In a third way, the electronic device is arranged with a gravity sensing unit or a gyro sensor. When it is detected that the placement direction of the electronic device is changed by the gravity sensing unit or the gyro sensor of the electronic device, if the interaction way between the user and the electronic device is the second interaction way, it is detected that the back surface of the electronic device is towards the first direction by the gravity sensing unit or the gyro sensor. When it is detected that the front surface of the electronic device is towards the first direction by the gravity sensing unit or the gyro sensor, it is determined that the interaction way between the user and the electronic device is switched from the second interaction way to the first interaction way. Accordingly, when it is detected that the back surface of the electronic device is towards the first direction again by the gravity sensing unit or the gyro sensor, it is determined that the interaction way between the user and the electronic device is switched from the first interaction way to the second interaction way. This way may be applied to the mobile phone.

In a fourth way, the electronic device is arranged with a distance sensor which may be arranged on the same plane with the second display screen. When it is detected that the distance from an obstacle to the electronic device is smaller than a first threshold by the distance sensor of the electronic device, it is determined that the interaction way between the user and the electronic device is the second interaction way. When it is detected that the distance from the obstacle to the electronic device is larger than the first threshold by the distance sensor of the electronic device, it is determined that the interaction way between the user and the electronic device is switched from the second interaction way to the first interaction way. Accordingly, when it is detected that the distance from the obstacle to the electronic device is smaller than the first threshold by the distance sensor, it is determined that the interaction way between the user and the electronic device is switched from the first interaction way to the second interaction way. This way may be applied to the mobile phone or the smart wearable electronic device.

In a fifth way, the electronic device is arranged with a gravity sensing unit or a gyro sensor. When it is detected that the electronic device is raised up from a first height (the height where the electronic device is in the user's hand when the user's arm is down naturally) to a second height (a height where the user's eyes is at) and it is detected that the orientation of the electronic device is changed from being towards the outer side of the user's side (i.e., a plane where the user's arm is located) to being towards the inner side of the user's face (i.e., a plane where the user's face is located)

by the gravity sensing unit or the gyro sensor of the electronic device, it is determined that the interaction way between the user and the electronic device is the second interaction way. When it is detected that the electronic device falls down from the second height to a third height (a height where the user's chest is at) by the gravity sensing unit or the gyro sensor and the orientation of the electronic device is not changed, it is determined that the interaction way between the user and the electronic device is switched from the second interaction way to the first interaction way. This way may be applied to the smart wearable electronic device.

At step S2503, the first display content is analyzed, the identification image comprised in the first display content is cut and the second display content for display by the first display module is generated from the identification image when the interaction way between the user and the electronic device is switched from the second interaction way to the first interaction way.

Herein, the identification image may be a 2D code image comprised in the first display content. The present embodiment may be applied in the following scenarios.

First Scenario:

The first display content is network resource acquired from network after the electronic device is accessed to the network, such as an open webpage or a video on the website, or the like. The webpage or the video comprises the 2D code image that can represent the address of webpage or the video, respectively. At this time, the electronic device analyzes the webpage or the video, cuts the 2D code image in the webpage or the video, and makes the 2D code image be the second display content to be displayed by the first display module.

Second Scenario:

The electronic device is set up as a wireless network hotspot by itself. The first display content is resource stored by the electronic device itself, such as a short message or a multimedia message, and the first display content comprises the 2D code image that can represent the storage location (the storage address) of the first display content in its storage area. The electronic device cuts the 2D code image in the first display content, and makes the 2D code image be the second display content to be displayed by the first display module.

At step 2504, the first display module is controlled to display the second display content so that the display content of the first perception image perceived by the user is the second display content, when the user observes the first display module in the first interaction way.

In the present embodiment, taking it as an example in which the identification image is the 2D code image, the display content of the first perception image perceived by the user is the 2D code image, other electronic devices recognize the 2D code image in the second display content by a scanning function such as a 2D code scan, so as to obtain the first display content based on the 2D code image.

With the technical solution of the present embodiment of the present disclosure, some basic information may be displayed by the first display module, and more and detailed information can be displayed by the second display module. Thus, the electronic device provided in the embodiment of the present disclosure may not be limited by the size of the wearable electronic device itself, and provide an image or video display with a larger size and a higher resolution. On the other hand, the technical solution provided in the present embodiment avoids the fact of the first display content seen by the user in the second interaction way being not convenient to be shared. The first display content is displayed by the second display module which displays more detailed information, and the identification image featuring the address of the second display content is displayed by the first display module so that the first display content displayed by the second display module is obtained more quickly and conveniently through the identification image by other electronic devices, and the user experience is greatly improved.

Sixth Embodiment of Second Implementation

Figure 21:
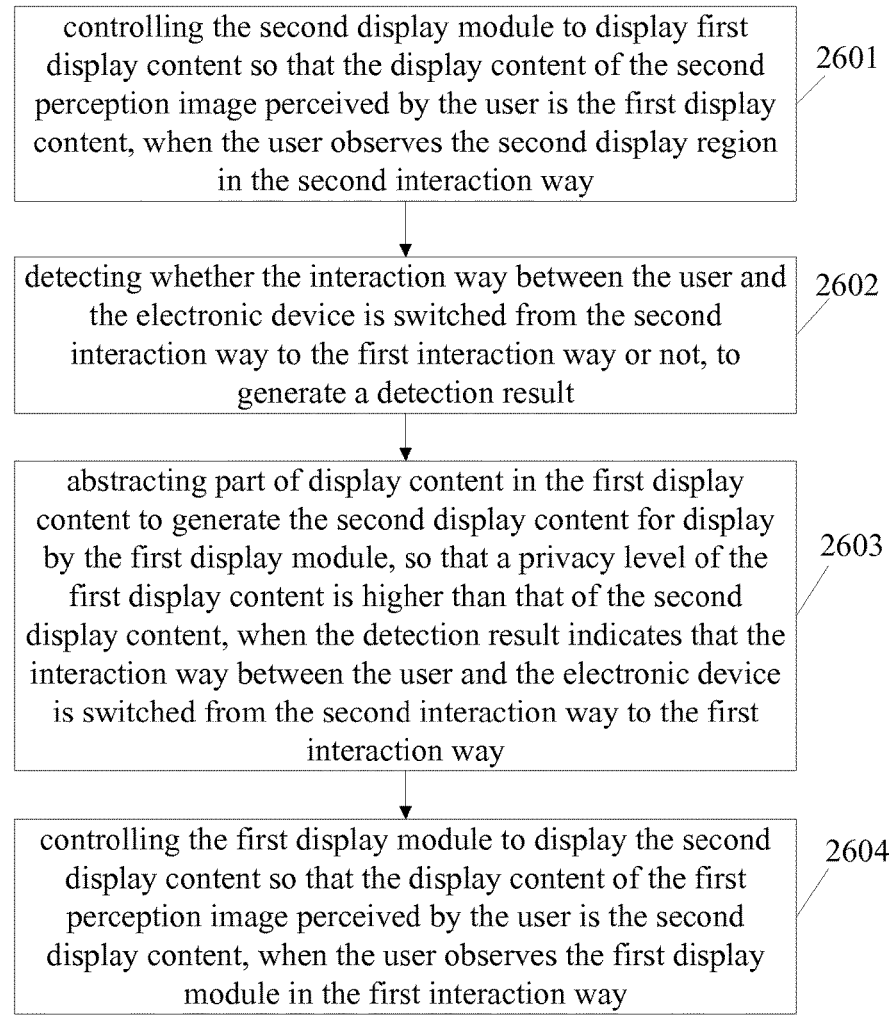
FIG. 21 is a schematic diagram of an information processing method according to a sixth embodiment of the second implementation of the present disclosure.

An information processing method applied to an electronic device is further provided in the embodiment of the second implementation of the present disclosure. FIG. 21 is a schematic diagram of a flowchart of the information processing method according to the sixth embodiment of the second implementation of the present disclosure. As shown in FIG. 21, the method includes the following steps.

At step 2601, the second display module is controlled to display first display content so that the display content of the second perception image perceived by the user is the first display content, when the user observes the second display region in the second interaction way.

Herein, the second interaction way is an observation way in which the user's eyes approach the second display region of the electronic device. That is, in the second interaction way, the user's eyes approach the second display region and the user observes the second display region.

The first display content may be content stored in the electronic device, such as an image, a video, or the like. The first display content may also be network resource acquired from the network after the electronic device is accessed to the network, such as content of a webpage, a video on a website, an image on a website, or the like.

At step S2602, it is detected whether the interaction way between the user and the electronic device is switched from the second interaction way to the first interaction way or not, to generate a detection result.

Herein, whether the interaction way between the user and the electronic device is switched from the second interaction way to the first interaction way or not may be detected in the following ways particularly.

In a first way, the electronic device is arranged with a switch key. When it is detected that the switch key is triggered in the electronic device, it is determined that the interaction way between the user and the electronic device is switched from the second interaction way to the first interaction way. In another embodiment, it may also be determined that the interaction way between the user and the electronic device is switched from the first interaction way to the second interaction way by detecting that the switch key is triggered again. Particularly, the switch key may be a physical key on the electronic device, or may be a virtual key which may be triggered by the touch display screen corresponding to the first display region. This way may be applied to the mobile phone or the smart wearable electronic device.

In a second way, the electronic device is arranged with a voice recognition unit. When a voice operation corresponding to a preset switch instruction is recognized in the electronic device, the switch instruction is triggered according to the voice operation, and the interaction way between the user and the electronic device is switched from the second interaction way to the first interaction way by the switch instruction. In another embodiment, the interaction way between the user and the electronic device may be switched from the first interaction way to the second interaction way by the switch instruction. This way may be applied to the mobile phone or the smart wearable electronic device.

In a third way, the electronic device is arranged with a gravity sensing unit or a gyro sensor. When it is detected that the placement direction of the electronic device is changed by the gravity sensing unit or the gyro sensor of the electronic device, if the interaction way between the user and the electronic device is the second interaction way, it is detected that the back surface of the electronic device is towards the first direction by the gravity sensing unit or the gyro sensor. When it is detected that the front surface of the electronic device is towards the first direction by the gravity sensing unit or the gyro sensor, it is determined that the interaction way between the user and the electronic device is switched from the second interaction way to the first interaction way. Accordingly, when it is detected that the back surface of the electronic device is towards the first direction again by the gravity sensing unit or the gyro sensor, it is determined that the interaction way between the user and the electronic device is switched from the first interaction way to the second interaction way. This way may be applied to the mobile phone.

In a fourth way, the electronic device is arranged with a distance sensor which may be arranged on the same plane with the second display screen. When it is detected that the distance from an obstacle to the electronic device is smaller than a first threshold by the distance sensor of the electronic device, it is determined that the interaction way between the user and the electronic device is the second interaction way. When it is detected that the distance from the obstacle to the electronic device is larger than the first threshold by the distance sensor of the electronic device, it is determined that the interaction way between the user and the electronic device is switched from the second interaction way to the first interaction way. Accordingly, when it is detected that the distance from the obstacle to the electronic device is smaller than the first threshold by the distance sensor, it is determined that the interaction way between the user and the electronic device is switched from the first interaction way to the second interaction way. This way may be applied to the mobile phone or the smart wearable electronic device.

In a fifth way, the electronic device is arranged with a gravity sensing unit or a gyro sensor. When it is detected that the electronic device is raised up from a first height (the height where the electronic device is in the user's hand when the user's arm is down naturally) to a second height (a height where the user's eyes is at) and it is detected that the orientation of the electronic device is changed from being towards the outer side of the user's side (i.e., a plane where the user's arm is located) to being towards the inner side of the user's face (i.e., a plane where the user's face is located) by the gravity sensing unit or the gyro sensor of the electronic device, it is determined that the interaction way between the user and the electronic device is the second interaction way. When it is detected that the electronic device falls down from the second height to a third height (a height where the user's chest is at) by the gravity sensing unit or the gyro sensor and the orientation of the electronic device is not changed, it is determined that the interaction way between the user and the electronic device is switched from the second interaction way to the first interaction way. This way may be applied to the smart wearable electronic device.

At step S2603, part of display content in the first display content is abstracted to generate the second display content for display by the first display module, so that a privacy level of the first display content is higher than that of the second display content, when the interaction way between the user and the electronic device is switched from the second interaction way to the first interaction way.

Herein, since the first display content can only been observed by the user when the user's eyes are close to the second display region or by other user when the other user's eyes are close to the second display region with the user's permission, and the second display content can be observed when the user's eyes are away from the first display region, i.e., all the users can observe the second display region, the privacy level of the first display content is higher than that of the second display content. Therefore, when the detection results represents that the interaction way between the user and the electronic device is switched from the second interaction way to the first interaction way, the electronic device abstracts a part of display content in the first display content which may be part of the beginning content in the first display content, such as the first paragraph, the first image or the beginning sentence of the first display content, or may be brief content of the first display content. In summary, when the first display content is the private content, all of the first display content can only been observed in the second interaction way.

At step 2604, the first display module is controlled to display the second display content so that the display content of the first perception image perceived by the user is the second display content, when the user observes the first display module in the first interaction way.

With the technical solution of the present embodiment of the present disclosure, some basic information may be displayed by the first display module, and more and detailed information can be displayed by the second display module. Thus, the electronic device provided in the embodiment of the present disclosure may not be limited by the size of the wearable electronic device itself, and provide an image or video display with a larger size and a higher resolution. On the other hand, the technical solution provided in the present embodiment avoids the fact of the first display content seen by the user in the second interaction way being not capable of being seen by multiple people other than the user. The first display content is displayed by the second display module which displays more detailed information, and part of content of the first display content is displayed by the first display module so that other users can obtain a part of content of the first display content displayed by the second display module, and the privacy of the electronic device is enhanced while the user experience is greatly improved.

Seventh Embodiment of Second Implementation

Figure 22:
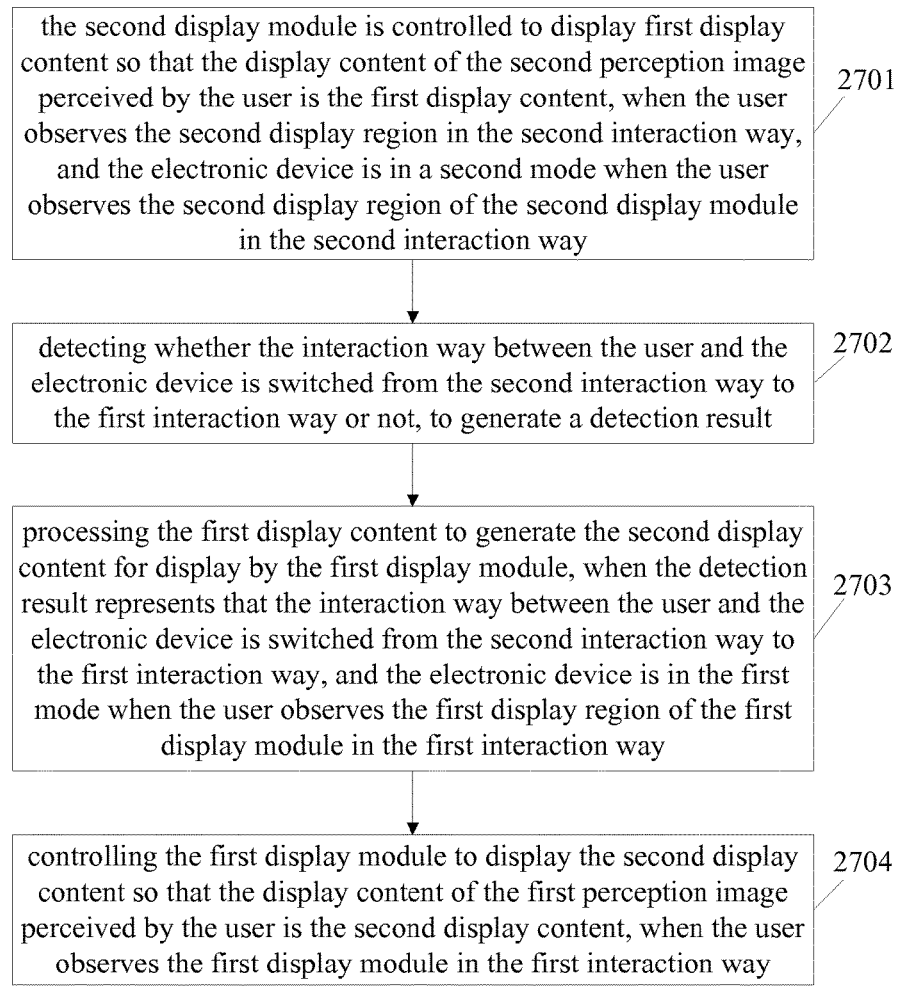
FIG. 22 is a schematic diagram of an information processing method according to a seventh embodiment of the second implementation of the present disclosure.

An information processing method applied to an electronic device is further provided in the embodiment of the second implementation of the present disclosure. FIG. 22 is a schematic diagram of a flowchart of the information processing method according to the seventh embodiment of the second implementation of the present disclosure. As shown in FIG. 22, the method includes the following steps.

At step 2701, the second display module is controlled to display first display content so that the display content of the second perception image perceived by the user is the first display content, when the user observes the second display region in the second interaction way, and the electronic device is in a second mode when the user observes the second display region of the second display module in the second interaction way.

Herein, the second interaction way is an observation way in which the user's eyes approach the second display region of the electronic device. That is, in the second interaction way, the user's eyes approach the second display region and the user observes the second display region.

The first display content may be content stored in the electronic device, such as an image, a video, or the like. The first display content may also be network resource acquired from the network after the electronic device is accessed to the network, such as content of a webpage, a video on a website, an image on a website, or the like.

In the present embodiment, the electronic device is set up with a first mode and a second mode. Different content is displayed in different modes. The electronic device is in the second mode when the user observes the second display region of the second display module in the second interaction way.

At step S2702, it is detected whether the interaction way between the user and the electronic device is switched from the second interaction way to the first interaction way or not, to generate a detection result.

Herein, whether the interaction way between the user and the electronic device is switched from the second interaction way to the first interaction way or not may be detected in the following ways particularly.

In a first way, the electronic device is arranged with a switch key. When it is detected that the switch key is triggered in the electronic device, it is determined that the interaction way between the user and the electronic device is switched from the second interaction way to the first interaction way. In another embodiment, it may also be determined that the interaction way between the user and the electronic device is switched from the first interaction way to the second interaction way by detecting that the switch key is triggered again. Particularly, the switch key may be a physical key on the electronic device, or may be a virtual key which may be triggered by the touch display screen corresponding to the first display region. This way may be applied to the mobile phone or the smart wearable electronic device.

In a second way, the electronic device is arranged with a voice recognition unit. When a voice operation corresponding to a preset switch instruction is recognized in the electronic device, the switch instruction is triggered according to the voice operation, and the interaction way between the user and the electronic device is switched from the second interaction way to the first interaction way by the switch instruction. In another embodiment, the interaction way between the user and the electronic device may be switched from the first interaction way to the second interaction way by the switch instruction. This way may be applied to the mobile phone or the smart wearable electronic device.

In a third way, the electronic device is arranged with a gravity sensing unit or a gyro sensor. When it is detected that the placement direction of the electronic device is changed by the gravity sensing unit or the gyro sensor of the electronic device, if the interaction way between the user and the electronic device is the second interaction way, it is detected that the back surface of the electronic device is towards the first direction by the gravity sensing unit or the gyro sensor. When it is detected that the front surface of the electronic device is towards the first direction by the gravity sensing unit or the gyro sensor, it is determined that the interaction way between the user and the electronic device is switched from the second interaction way to the first interaction way. Accordingly, when it is detected that the back surface of the electronic device is towards the first direction again by the gravity sensing unit or the gyro sensor, it is determined that the interaction way between the user and the electronic device is switched from the first interaction way to the second interaction way. This way may be applied to the mobile phone.

In a fourth way, the electronic device is arranged with a distance sensor which may be arranged on the same plane with the second display screen. When it is detected that the distance from an obstacle to the electronic device is smaller than a first threshold by the distance sensor of the electronic device, it is determined that the interaction way between the user and the electronic device is the second interaction way. When it is detected that the distance from the obstacle to the electronic device is larger than the first threshold by the distance sensor of the electronic device, it is determined that the interaction way between the user and the electronic device is switched from the second interaction way to the first interaction way. Accordingly, when it is detected that the distance from the obstacle to the electronic device is smaller than the first threshold by the distance sensor, it is determined that the interaction way between the user and the electronic device is switched from the first interaction way to the second interaction way. This way may be applied to the mobile phone or the smart wearable electronic device.

In a fifth way, the electronic device is arranged with a gravity sensing unit or a gyro sensor. When it is detected that the electronic device is raised up from a first height (the height where the electronic device is in the user's hand when the user's arm is down naturally) to a second height (a height where the user's eyes is at) and it is detected that the orientation of the electronic device is changed from being towards the outer side of the user's side (i.e., a plane where the user's arm is located) to being towards the inner side of the user's face (i.e., a plane where the user's face is located) by the gravity sensing unit or the gyro sensor of the electronic device, it is determined that the interaction way between the user and the electronic device is the second interaction way. When it is detected that the electronic device falls down from the second height to a third height (a height where the user's chest is at) by the gravity sensing unit or the gyro sensor and the orientation of the electronic device is not changed, it is determined that the interaction way between the user and the electronic device is switched from the second interaction way to the first interaction way. This way may be applied to the smart wearable electronic device.

At step S2703, the first display content is processed to generate the second display content for display by the first display module, when the detection result represents that the interaction way between the user and the electronic device is switched from the second interaction way to the first interaction way, and the electronic device is in the first mode when the user observes the first display region of the first display module in the first interaction way.

Herein, the electronic device is in the first mode when the user observes the first display region of the first display module in the first interaction way.

Particularly, in the embodiment of the present disclosure, the first mode may be a normal working mode (owner mode), and the second mode may be a guest mode. The distinguishing between the modes may protect the user's privacy better, so that the privacy of the electronic device is better. For example, the second display content observed by the user in the first interaction way in the first mode may be totally different from the first display content observed by the user in the second interaction way in the second mode, or the second display content may be part of the content in the first display content.

Particularly, when the second display content and the first display content are totally different, the electronic device displays an user interface corresponding to the first mode through the first display module when the electronic device is in the first interaction mode, and displays an user interface corresponding to the second mode through the second display module when the electronic device is in the second interaction mode, by setting user interfaces corresponding to the first mode and the second mode, respectively.

When the second display content is the same as part content of the first display content, and when the interaction way between the user and the electronic device is switched from the second interaction way to the first interaction way, the electronic device abstracts s part of display content in the first display content. The part of display content may be the beginning part content of the first display content, such as the first paragraph, the first image or the beginning sentence of the first display content, or the part of the display content may be the brief content of the first display content. The part of the display content in the abstracted first display content is the second display content for display by the first display module.

At step 2704, the first display module is controlled to display the second display content so that the display content of the first perception image perceived by the user is the second display content, when the user observes the first display module in the first interaction way.

With the technical solution of the present embodiment of the present disclosure, some basic information may be displayed by the first display module, and more and detailed information can be displayed by the second display module. Thus, the electronic device provided in the embodiment of the present disclosure may not be limited by the size of the wearable electronic device itself, and provide an image or video display with a larger size and a higher resolution. On the other hand, the technical solution provided in the present embodiment avoids the fact of the first display content seen by the user in the second interaction way being not capable of being seen by multiple people other than the user. The first display content is displayed by the second display module which displays more detailed information, and relevant or irrelevant content to the first display content is displayed by the first display module, by setting the first mode and the second mode in the electronic device, so that the privacy of the electronic device is enhanced while the user experience is greatly improved.

In the first embodiment to the seventh embodiment of the second implementation, the electronic device has the first display module and the second display module. FIG. 23*a* to FIG. 23*d* are structural diagrams of the detailed constitution of the electronic device in the embodiment of the second implementation of the present disclosure. A detailed description will be made to the constitution of the electronic device according to the embodiment of the present disclosure, taking the electronic device as an example.

Figure 23A:
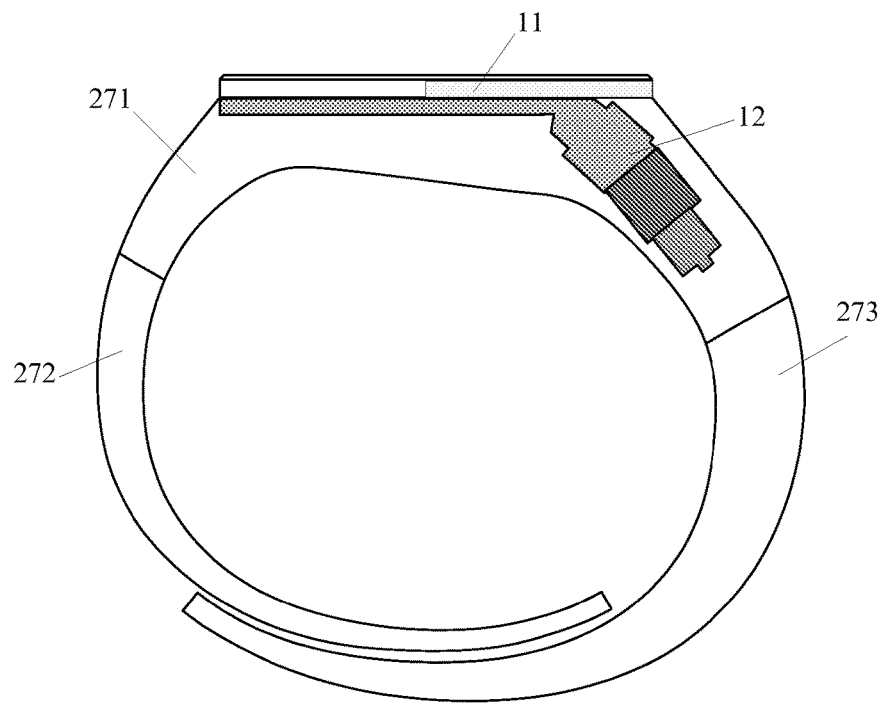
FIG. 23a to FIG. 23d are structural diagrams of an electronic device according to an embodiment of the second implementation of the present disclosure.
Figure 23B:
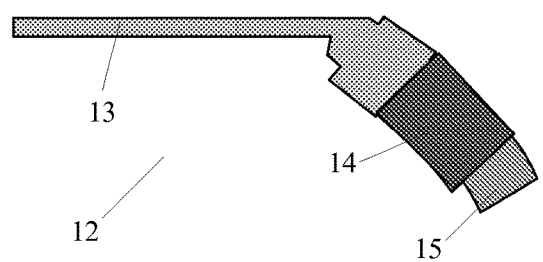

As shown in FIG. 23*a*, the first display module 11 is a first display screen for displaying the second display content, the size of the first display screen being equal to that of the first display region of the first display module. The second display module 12 is an optical projection system. As shown in FIG. 13*b*, the second display module 12 includes a first part 13 which is a light guild component made of a transparent material, and a second part including a display component 15 and a collimating component 14.

The display component 15 is used for displaying the second display content and projecting a first light beam output in a light beam way to the collimating component 14. The collimating component 14 is used for processing the first light beam output projected in the light beam way and turning it into a second light beam, to output it to the light guide component 13.

The light guide component 13, which is also called as a light path changing component, is used for guiding the second light beam in the transparent material consisting the light guide component, and wherein the light guide component comprises a reflection unit arranged at a specific region of a part, which is used for changing the guiding direction of the second light beam in the transparent material to project in a second direction being consistent with the output direction of the first display content of the first display screen of the first display module; and the specific region arranged with the reflection unit in the light guide component is the second display region of the second display module.

Figure 23C:
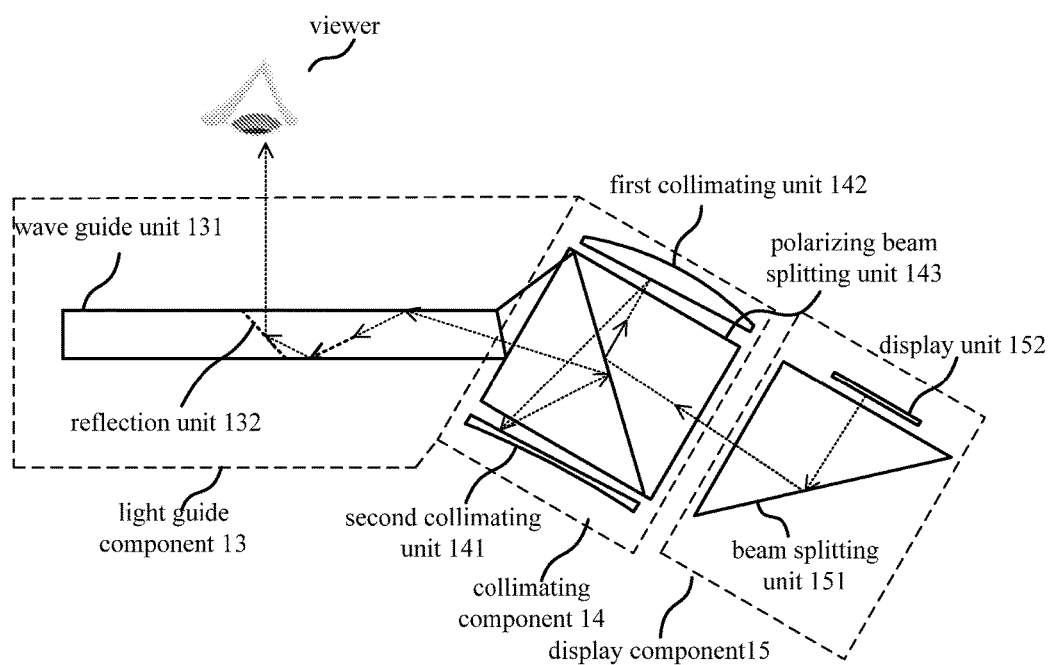
Figure 23D:
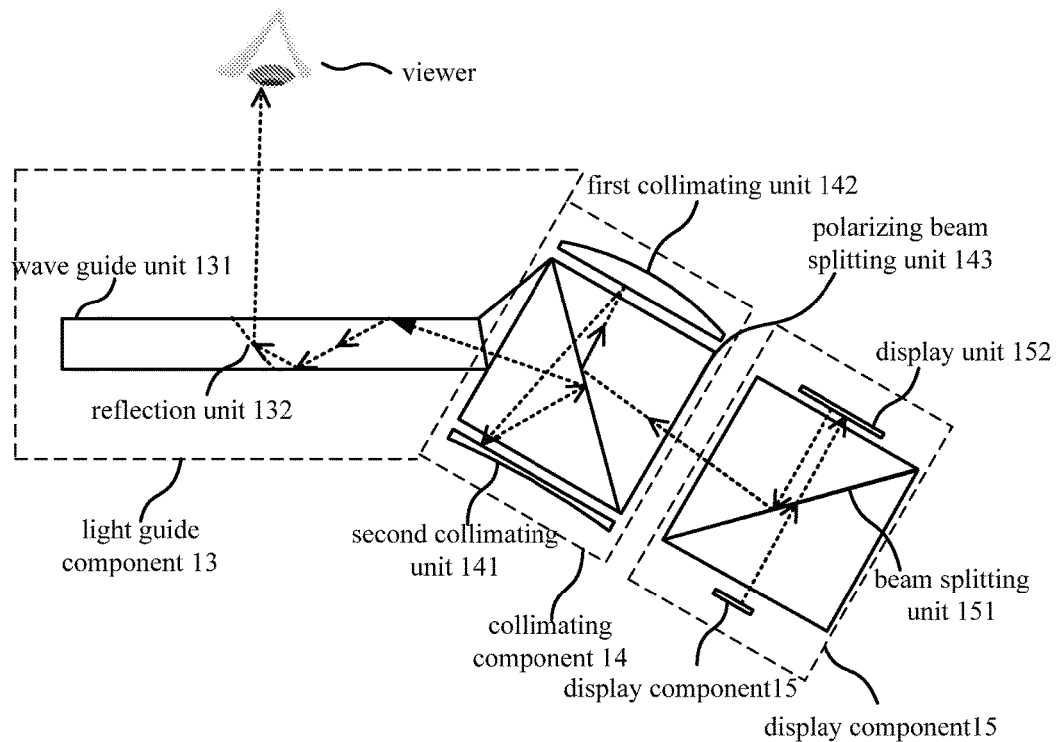

FIG. 23*c* and FIG. 23*d* are schematic diagrams of the constitution of the second display module in the embodiment of the present disclosure. As shown in FIG. 23*c* and FIG. 23*d*, the display component 15 includes a beam splitting unit 151 and a display unit 152. The collimating component 14 includes a second collimating unit 141, a first collimating unit 142 and a polarizing beam splitting unit 143. The light guide component 13 includes a waveguide unit 131 and a reflection unit 132. The display unit 15 in the FIG. 23-2 includes an illuminating unit 150. The collimating component 14 processes the first light beam projected in the light beam manner, and turns it into the second light beam to output it to the light guide component.

Particularly, the collimating component 14 includes the first collimating unit 142 and the second collimating unit 141 arranged opposite to each other, and the polarizing beam splitting unit 143 which is arranged there between. The first light beam output from the display component is reflected to the first collimating unit 142 through the polarizing beam splitting unit 143, and then collimated through the first collimating unit 142 and the second collimating unit 141 to exit through the polarizing beam splitting unit 143 as the second light beam.

Herein, the first collimating unit 142 and the second collimating unit 141 may be a single lens or a lens group designed as necessary.

The light guide component 13 is used to guide the second light beam in the material consisting the light guide component, and output to the observer finally. The light guide component 13 includes the waveguide unit 131 and the reflection unit 132. The second light beam can be controlled and exit to a specific location by setting the location and the angle of the reflection unit 132. In a first case, the collimating component 14 and the display component 15 are at a first side with respect to a plane where the light guide component 13 is located. When the reflection unit 132 is set as shown in FIG. 13*c* and FIG. 13*d*, the second light beam may be exit to a second side with respect to a plane where the waveguide unit 131 is located. The first side and the second side are opposite sides with respect to the plane where the waveguide unit 131 is located.

Particularly, when the second display module is applied to, for example, the smart watch, the above configuration example can be applied, so that the second light beam exits to the second side, i.e., exits to the eyes of the user wearing and watching the wrist mounted electronic device. In further detail, the exit direction of the second display module may be configured as necessary. For example, the rotation of the reflection unit 132 may be controlled so as to control the exit direction of the reflection unit 132, to achieve the switch between the two way displays of the second display module. In the embodiment of the present disclosure, the reflection unit 132 may be a single lens or a lens group as necessary.

In the embodiment of the present disclosure, the first display module 11 has a first display region. As described above, the first display module 11 is a first display screen. Therefore, the physical size of the first display screen is consistent with that of the first display output region.

The second display module 12 has a second display output region which is the specific region setting on the extruded part by the reflection unit. Generally, the physical size of the refection unit 132 seen by the observer (the user) is equal to or larger than that of the second display output region, and the size of the display unit 152 in the second display module 12 is smaller than the size of the second display output region. It is noted that FIG. 13c or FIG. 13d is only for better understanding of the technical solution of the present disclosure by those skilled in the art, and does not show the state when the electronic device provided in the embodiment of the present disclosure is in use. For example, the electronic device is fixed to a support body when in use. When the support body is a wrist, the user raises up the arm to place the electronic device in front of his/her eyes. It can be seen that the user may view the information provided by the electronic device in a front view angle.

The two display modules in the provided electronic device may have various use states when in use. Taking the electronic device as a smart watch worn on the wrist as an example. For example, when the user is walking, the user's arm is put down naturally. At this time, the first display module and the second display module of the electronic device may be both in the turned-off state or a low power consumption state such as a standby state which can prolong the use time of the electronic device. When the user's arm is put down naturally, it may be considered that the electronic device is in a first relative region. That is, the first relative region represents a first relative location relationship between the user and the electronic device, i.e., the side region of the user's body.

Next, when the user wants to check time at a moment during the walking, the user will raise up the arm at this time. Assuming the electronic device is in a second relative region (i.e., the region in front of the user's chest) when the user raises up his/her arm, the electronic device detects that it is in the second relative region itself, and enables the first display module (the first display module will be turned on or woken up), then the time is displayed to the user, or prompt information will be displayed to the user by the first display module.

At this time, if the user wants to see data content which is more relevant to the prompt information, he or shell will move the electronic device continually to make it close to the eyes. Assuming the electronic device is at the third relative region (i.e., the region in front of the user's head) at this time, that is, when the electronic device is at the third display region, the electronic device will enable the second display module. The relevant data content can be seen by the second display module when the second display module is enabled after the user's eyes are close to it.

Of course, the first display module and the second display module shown in FIG. 23a to FIG. 23d are arranged in the smart watch, but not limited to the smart watch or the smart wearable electronic device. The first display module and the second display module may be arranged in the smart phone. The detailed arrangement way may be flexible according to the internal arrangement of the smart phone.

Eighth Embodiment of Second Implementation

Figure 24:
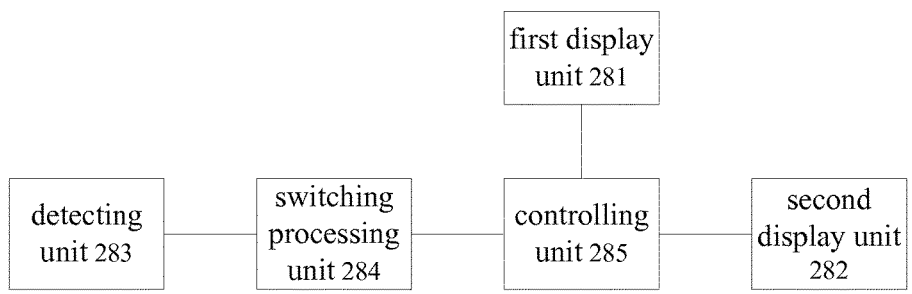
FIG. 24 is a schematic diagram of a structure of en electronic device according to the second implementation of the present disclosure.

An electronic device is provided in the embodiment of the second implementation of the present disclosure. FIG. 24 is a schematic diagram of the structure of the electronic device of the embodiment of the second implementation of the present disclosure. As shown in FIG. 24, the electronic device has a first display module 281 and a second display module 282 with different display principles, the first display module 281 having a first display region, the second display module 282 having a second display region smaller than the first display region; a first interaction way for a user using the first display module 281 of the electronic device as an observation way in which the user's eyes are away from the first display region of the electronic device, being different from a second interaction way for the user using the second display module 282 of the electronic device as an observation way in which the user's eyes are close to the second display region of the electronic device, due to the different display principles of the first display module 281 and the second display module 282; light beam from the second display module 282 being incident to the user's eyes to make a second perception image, the size of which is larger than that of the second display region, be perceived by the user when the user approaches the second display region of the electronic device in the second interaction way; light beam from the first display module being incident to the user's eyes to make a first perception image, the size of which is equal to that of the second display region, be perceived by the user when the user is away from the first display region of the electronic device in the first interaction way.

The electronic device further comprises: a controlling unit 285, a detecting unit 283 and a switching processing unit 284.

The controlling unit 285 is used for controlling the second display module 282 to display first display content so that the display content of the second perception image perceived by the user is the first display content, when the user observes the second display region in the second interaction way; and is used for controlling the first display module 281 to display second display content so that the display content of the first perception image perceived by the user is the second display content, when the user observes the first display region in the first interaction way.

The detecting unit 283 is used for detecting whether the interaction way between the user and the electronic device is switched from the second interaction way to the first interaction way or not, to generate a detection result.

The switching processing unit 284 is used for processing the first display content to generate second display content for display by the first display module 281, when the detection results indicates that the interaction way between the user and the electronic device is switched from the second interaction way to the first interaction way.

Those skilled in the art should understand that the functions of the processing units in the electronic device of the embodiment of the present disclosure may be understood with reference to the relevant description of the information processing method as described above. The processing units in the electronic device of the embodiment of the present disclosure may be realized by analog circuits realizing the functions as described in the embodiments of the present disclosure, or may be realized by the software performing the functions as described in the embodiments of the present disclosure, being executed on a smart terminal.

According to another aspect of the present disclosure, the first display content and the second display content are relevant.

Particularly, the relevance of the first display content and the second display content will be described in detail with reference to the ninth embodiment to the eleventh embodiment of the second implementation.

Ninth Embodiment of Second Implementation

An electronic device is provided in the embodiment of the second implementation of the present disclosure. The electronic device has a first display module 281 and a second display module 282 with different display principles, the first display module 281 having a first display region, the second display module 282 having a second display region smaller than the first display region; a first interaction way for a user using the first display module 281 of the electronic device as an observation way in which the user's eyes are away from the first display region of the electronic device, being different from a second interaction way for the user using the second display module 282 of the electronic device as an observation way in which the user's eyes are close to the second display region of the electronic device, due to the different display principles of the first display module 281 and the second display module 282; light beam from the second display module 282 being incident to the user's eyes to make a second perception image, the size of which is larger than that of the second display region, be perceived by the user when the user approaches the second display region of the electronic device in the second interaction way; light beam from the first display module being incident to the user's eyes to make a first perception image, the size of which is equal to that of the first display region, be perceived by the user when the user moves away from the first display region of the electronic device in the first interaction way.

The electronic device further comprises: a controlling unit 285, a detecting unit 283 and a switching processing unit 284.

The controlling unit 285 is used for controlling the second display module 282 to display first display content so that the display content of the second perception image perceived by the user is the first display content, when the user observes the second display region in the second interaction way; and is used for controlling the first display module 281 to display second display content so that the display content of the first perception image perceived by the user is the second display content, when the user observes the first display region in the first interaction way.

The detecting unit 283 is used for detecting whether the interaction way between the user and the electronic device is switched from the second interaction way to the first interaction way or not, to generate a detection result.

The switching processing unit 284 is used for analyzing the first display content, abstracting at least two selection items as specific content when the first display content comprises the specific content of selection items that needs to be selected and judged, and generating the second display content for display by the first display module 281 from the at least two selection items; or generating at least one operable data item according to a parameter featuring the first display content, and generating the second display content for display by the first display module 281 from the at least one operable data item, when the detection results indicates that the interaction way between the user and the electronic device is switched from the second interaction way to the first interaction way.

Those skilled in the art should understand that the functions of the processing units in the electronic device of the embodiment of the present disclosure may be understood with reference to the relevant description of the information processing method as described above. The processing units in the electronic device of the embodiment of the present disclosure may be realized by analog circuits realizing the functions as described in the embodiments of the present disclosure, or may be realized by the software performing the functions as described in the embodiments of the present disclosure, being executed on a smart terminal.

Tenth Embodiment of Second Implementation

An electronic device is provided in the embodiment of the second implementation of the present disclosure. The electronic device has a first display module 281 and a second display module 282 with different display principles, the first display module 281 having a first display region, the second display module 282 having a second display region smaller than the first display region; a first interaction way for a user using the first display module 281 of the electronic device as an observation way in which the user's eyes are away from the second display region of the electronic device, being different from a second interaction way for the user using the second display module 282 of the electronic device as an observation way in which the user's eyes are close to the first display region of the electronic device, due to the different display principles of the first display module 281 and the second display module 282; light beam from the second display module 282 being incident to the user's eyes to make a second perception image, the size of which is larger than that of the second display region, be perceived by the user when the user approaches the second display region of the electronic device in the second interaction way; light beam from the first display module being incident to the user's eyes to make a first perception image, the size of which is equal to that of the second display region, be perceived by the user when the user moves away from the first display region of the electronic device in the first interaction way.

The electronic device further comprises: a controlling unit 285, a detecting unit 283 and a switching processing unit 284.

The controlling unit 285 is used for controlling the second display module 282 to display first display content so that the display content of the second perception image perceived by the user is the first display content, when the user observes the second display region in the second interaction way; and is used for controlling the first display module 281 to display second display content so that the display content of the first perception image perceived by the user is the second display content, when the user observes the first display region in the first interaction way.

The detecting unit 283 is used for detecting whether the interaction way between the user and the electronic device is switched from the second interaction way to the first interaction way or not, to generate a detection result.

The switching processing unit 284 is used for generating an identification image based on an address of the first display content, and generating the second display content for display by the first display module 281 from the identification image; or analyzing the first display content, cutting the identification image comprised in the first display content and generating the second display content for display by the first display module 281 from the identification image, when the detection results indicates that the interaction way between the user and the electronic device is switched from the second interaction way to the first interaction way.

Those skilled in the art should understand that the functions of the processing units in the electronic device of the embodiment of the present disclosure may be understood with reference to the relevant description of the information processing method as described above. The processing units in the electronic device of the embodiment of the present disclosure may be realized by analog circuits realizing the functions as described in the embodiments of the present disclosure, or may be realized by the software performing the functions as described in the embodiments of the present disclosure, being executed on a smart terminal.

Eleventh Embodiment of Second Implementation

An electronic device is provided in the embodiment of the second implementation of the present disclosure. The electronic device has a first display module 281 and a second display module 282 with different display principles, the first display module 281 having a first display region, the second display module 282 having a second display region smaller than the first display region; a first interaction way for a user using the first display module 281 of the electronic device as an observation way in which the user's eyes are away from the second display region of the electronic device, being different from a second interaction way for the user using the second display module 282 of the electronic device as an observation way in which the user's eyes are close to the first display region of the electronic device, due to the different display principles of the first display module 281 and the second display module 282; light beam from the second display module 282 being incident to the user's eyes to make a second perception image, the size of which is larger than that of the second display region, be perceived by the user when the user approaches the second display region of the electronic device in the second interaction way; light beam from the first display module being incident to the user's eyes to make a first perception image, the size of which is equal to that of the second display region, be perceived by the user when the user moves away from the first display region of the electronic device in the first interaction way.

The electronic device further comprises: a controlling unit 285, a detecting unit 283 and a switching processing unit 284.

The controlling unit 285 is used for controlling the second display module 282 to display first display content so that the display content of the second perception image perceived by the user is the first display content, when the user observes the second display region in the second interaction way; and is used for controlling the first display module 281 to display second display content so that the display content of the first perception image perceived by the user is the second display content, when the user observes the first display region in the first interaction way.

The detecting unit 283 is used for detecting whether the interaction way between the user and the electronic device is switched from the second interaction way to the first interaction way or not, to generate a detection result.

The switching processing unit 284 is used for abstracting a part of display content in the first display content to generate the second display content for display by the first display module 281, so that a privacy level of the first display content is higher than that of the second display content, when the detection results indicates that the interaction way between the user and the electronic device is switched from the second interaction way to the first interaction way.

Those skilled in the art should understand that the functions of the processing units in the electronic device of the embodiment of the present disclosure may be understood with reference to the relevant description of the information processing method as described above. The processing units in the electronic device of the embodiment of the present disclosure may be realized by analog circuits realizing the functions as described in the embodiments of the present disclosure, or may be realized by the software performing the functions as described in the embodiments of the present disclosure, being executed on a smart terminal.

Twelfth Embodiment of Second Implementation

An electronic device is provided in the embodiment of the second implementation of the present disclosure. The electronic device has a first display module 281 and a second display module 282 with different display principles, the first display module 281 having a first display region, the second display module 282 having a second display region smaller than the first display region; a first interaction way for a user using the first display module 281 of the electronic device as an observation way in which the user's eyes are away from the second display region of the electronic device, being different from a second interaction way for the user using the second display module 282 of the electronic device as an observation way in which the user's eyes are close to the first display region of the electronic device, due to the different display principles of the first display module 281 and the second display module 282; light beam from the second display module 282 being incident to the user's eyes to make a second perception image, the size of which is larger than that of the second display region, be perceived by the user when the user approaches the second display region of the electronic device in the second interaction way; light beam from the first display module being incident to the user's eyes to make a first perception image, the size of which is equal to that of the second display region, be perceived by the user when the user moves away from the first display region of the electronic device in the first interaction way.

The electronic device further comprises: a controlling unit 285, a detecting unit 283 and a switching processing unit 284.

The controlling unit 285 is used for controlling the second display module 282 to display first display content so that the display content of the second perception image perceived by the user is the first display content, when the user observes the second display region in the second interaction way; and is used for controlling the first display module 281 to display second display content so that the display content of the first perception image perceived by the user is the second display content, when the user observes the first display region in the first interaction way.

The detecting unit 283 is used for detecting whether the interaction way between the user and the electronic device is switched from the second interaction way to the first interaction way or not, to generate a detection result.

The switching processing unit 284 is used for processing the first display content to generate second display content for display by the first display module 281, when the detection results indicates that the interaction way between the user and the electronic device is switched from the second interaction way to the first interaction way.

wherein the electronic device is in a first mode when the user observes the first display region of the first display module 281 in the first interaction way; and the electronic device is in a second mode when the user observes the second display region of the second display module 282 in the second interaction way.

Particularly, the first mode is a guest mode and the second mode is a normal working mode.

Those skilled in the art should understand that the functions of the processing units in the electronic device of the embodiment of the present disclosure may be understood with reference to the relevant description of the information processing method as described above. The processing units in the electronic device of the embodiment of the present disclosure may be realized by analog circuits realizing the functions as described in the embodiments of the present disclosure, or may be realized by the software performing the functions as described in the embodiments of the present disclosure, being executed on a smart terminal.

In the eighth embodiment to the twelfth embodiment of the second implementation of the present disclosure, the controlling unit 285, the detecting unit 283 and the switching processing unit 284 in the electronic device may be realized by the central processing unit (CPU), the digital signal processor (DSP) or the field programmable gate array (FPGA) in practical use. The first display unit 281 in the electronic device may be realized by the display or the display screen in the electronic device in practical use. The second display unit 282 in the electronic device may be realized by an optical projection system in the electronic device in practical use.

(Third Implementation)

First Embodiment of Third Implementation

Figure 25:
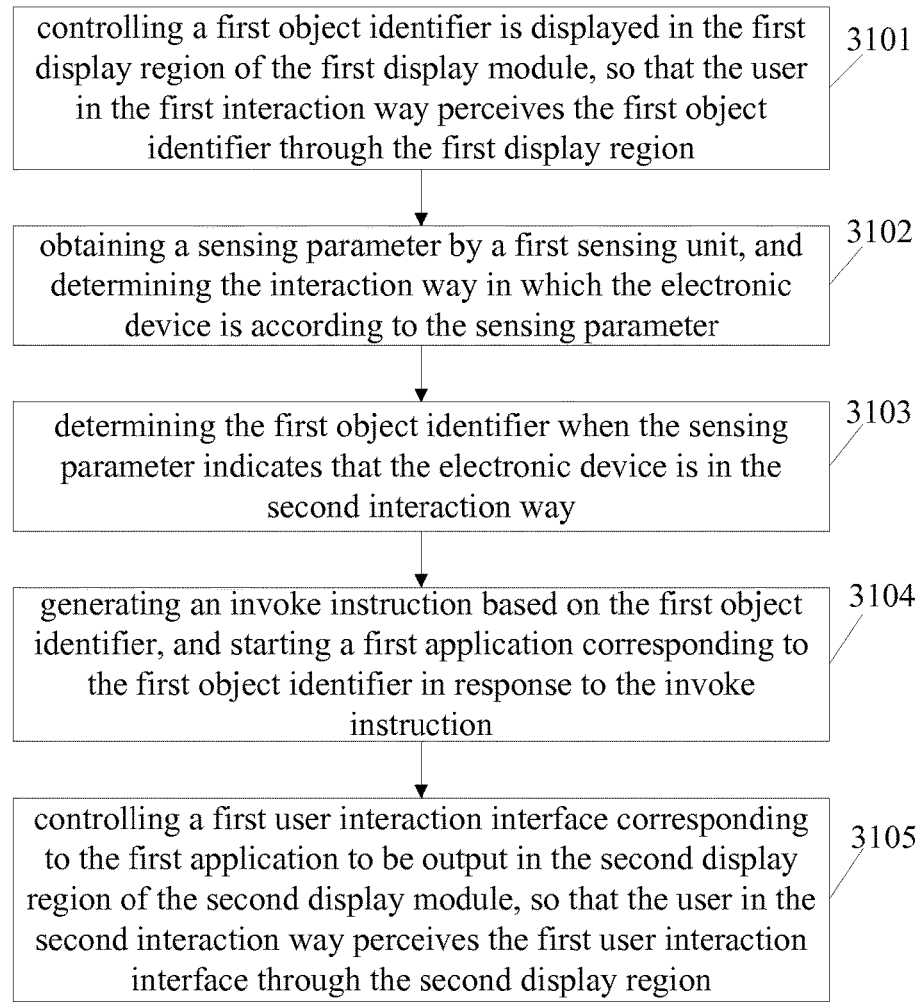
FIG. 25 is a schematic diagram of a flowchart of an information processing method according to a first embodiment of a third implementation of the present disclosure.

An information processing method applied to an electronic device is provided in an embodiment of the third implementation of the present disclosure. The electronic device has a first sensing unit, a first display module having a first display region and a second display module having a second display region. The user can observe the first display region of the first display module when the electronic device interacts with the user of the electronic device in a first interaction way. The user can observe the second display region of the second display module when the electronic device interacts with the user of the electronic device in a second interaction way. FIG. 25 is a schematic diagram of a flowchart of the information processing method of the first embodiment of the third implementation of the present disclosure. As shown in FIG. 25, the method includes the following steps.

At step S3101, a first object identifier is controlled to be displayed in the first display region of the first display module, so that the user in the first interaction way perceives the first object identifier through the first display region.

In the present embodiment, the electronic device may be a terminal device such as a smart phone, a tablet, or the like, or may be a wearable smart electronic device such as a smart watch or the like.

Herein, particularly, the first object identifier may be the object identifier of a certain application in the electronic device, such as an icon of a clock application or an icon of a weather application or the like. Optionally, the object identifier may be a live icon such as a live weather icon. The first object identifier may also be a widget, such as a clock widget which can display the time, the date, the current weather condition and the contamination condition or the like, which is capable of rendering at least one kind of information.

At step 3102, a sensing parameter is obtained by a first sensing unit, and the interaction way of the electronic device is determined according to the sensing parameter.

The embodiment may be applied to several scenarios in the following.

In a first scenario, the electronic device has two screens at different planes of the electronic device, respectively. For example, the first screen is at the front surface of the electronic device, and the second screen is at the back surface of the electronic device. The display region of the second screen is the second display region. In this scenario, the first interaction way is an interaction way in which the user faces to the first screen. The second interaction way is an interaction way in which the user faces to the second screen. The display region of the first screen is the first display screen. In the step, the first sensing unit may be an image capturing unit in particular, which is in the same plane with the first display region. The sensing parameter is an image data parameter. Particularly, the image data is captured by the image capturing unit. When the image data includes a feature parameter of the human face, it may be determined that the electronic device is in the first interaction way. When the electronic device is turned over, the image data captured by the image capturing unit does not include the feature parameter of the human face, it may be determined that the electronic device is in the second interaction way.

In a second scenario, the electronic device has two screens stacked with each other in a first direction. Assume that the first screen is above the second screen, and the first screen may slides above or below via a sliding track to make the second screen appear. In this scenario, the first interaction way is an interaction way in which the first screen does not slides above or below so that the user faces the first screen. The second interaction way is an interaction way in which the first screen slides above or below so that the user faces the second screen. In this step, the first sensing unit may be a pressure sensor arranged on the sliding track, and the sensing parameter is a pressure value detected by the pressure sensor. Particularly, when the detected pressure value is a first preset value, it may be determined that the electronic device is in the first interaction way. When the first screen slides above or below and the detected pressure value is changed to a second value, it may be determined that the electronic device is in the second interaction way.

At step S3103, the first object identifier is determined when the sensing parameter indicates that the electronic device is in the second interaction way.

Herein, based on the two scenarios described in step 3102, the second interaction way is an interaction way in which the electronic device is turned over so that the user faces the second screen in the first scenario, or an interaction way in which the first screen slides above or below so that the user faces the second screen in the second scenario.

Wherein, the process of determining of the first object identifier is to select the first object identifier displayed in the first display region. Particularly, the first display region of the first display module only outputs the first object identifier. The first object identifier is triggered to be selected when the electronic device is switched from the first interaction way to the second interaction way.

At step 3104, an invoke instruction is generated based on the first object identifier, and a first application corresponding to the first object identifier is started in response to the invoke instruction.

Herein, when the first object identifier is an object identifier of a certain application in the electronic device, the attribute parameter of the object identifier includes an installation address of the application corresponding to the first object identifier in the electronic device. When the first object identifier is a widget capable of rendering at least one kind of information, the attribute parameter of the widget includes a URL of a webpage linked to the widget, or the attribute parameter of the widget includes an installation address of the application corresponding to the widget in the electronic device. The step of generating an invoke instruction based on the first object identifier and starting a first application corresponding to the first object identifier in response to the invoke instruction includes: recognizing the attribute parameter of the first object identifier, acquiring the installation address of the first application corresponding to the first object identifier according to the attribute parameter of the first object identifier, generating the invoke instruction based on the installation address of the first application, and responding to the invoke instruction to start the first application.

Wherein, the first application is a browser application when the attribute parameter of the widget includes the URL of the webpage linked to the widget.

At step 3105, a first user interaction interface corresponding to the first application is controlled to be output in the second display region of the second display module, so that the user in the second interaction way perceives the first user interaction interface through the second display region.

Herein, based on the two scenarios described in step 3102, the second display region is a display region of the second screen after the electronic device is turned over in the first scenario, or a display region of the second screen that can be rendered to the user after the first screen of the electronic device slides above or below in the second scenario. Wherein, the first user interaction interface is an interface rendered to the user after the first application is started. When the first application is an application installed in the electronic device, the first user interaction interface is the interaction interface rendered after the application is started. When the first application is a browser application, the first user interaction interface is a webpage interaction interface corresponding to the URL comprised in the webpage in the attribute parameter of the first object identifier after the browser application is started.

With the technical solution of the embodiment of the present disclosure, the application corresponding to the first object identifier may be started without a trigger operation on the first object identifier, and at the same time the first user interaction interface corresponding to the first application is output, the acquisition efficiency of the information is largely improved and the user experience is improved. On the other hand, the embodiment of the present disclosure provides two display interfaces, some brief information is displayed through the first display module, and more and detailed information can be displayed through the second display module. In this way, the electronic device provided in the embodiment of the present disclosure may not be limited by the size itself, and can provide an image or video display with a larger size and a higher resolution.

Second Embodiment of Third Implementation

An information processing method applied to an electronic device is provided in another embodiment of the present disclosure, based on the information processing method described in the above first embodiment. The electronic device has a first sensing unit, a first display module having a first display region and a second display module having a second display region. The user can observe the first display region of the first display module when the electronic device interacts with the user of the electronic device in a first interaction way. The user can observe the second display region of the second display module when the electronic device interacts with the user of the electronic device in a second interaction way. The display principles of the first display module and the second display module are different, the second display region is smaller than the first display region; the interaction ways between the user and the electronic device are different due to different display principles of the first display module and the second display module.

The first interaction way is an observation way in which the user's eyes are away from the first display region of the first display module of the electronic device, and a first perception image is perceived by the user when the user observes the first display region of the electronic device in the first interaction way, the size of the first perception image is equal to that of the first display region, and the first perception image comprises the first object identifier.

The second interaction way is an observation way in which the user's eyes are close to the second display region of the second display module of the electronic device, wherein light beam from the second display module is incident to the user's eyes so that a second perception image is perceived when the user observes the second display region of the electronic device. The size of the second perception image is larger than that of the second display region. The second perception image includes the first user interaction interface.

In the present embodiment, a detailed description is made taking the electronic device being a smart wearable electronic device such as a smart watch as an example. The schematic structure of the electronic device has been described above with reference to FIG. 11a and FIG. 11b, and will not be repeated here.

Figure 26A:
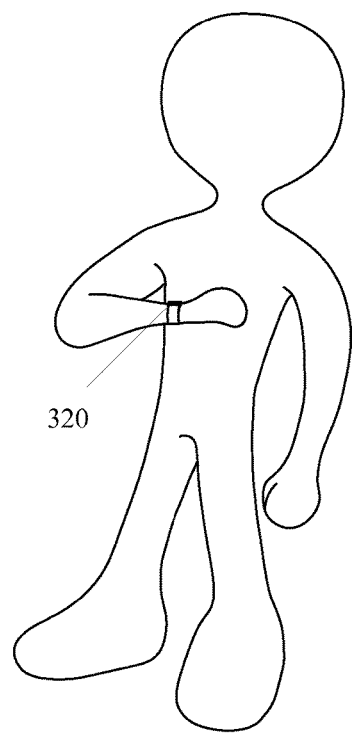
FIG. 26a to FIG. 26c are schematic diagrams of an interaction way of an electronic device according to a second embodiment of the third implementation of the present disclosure.
Figure 26B:
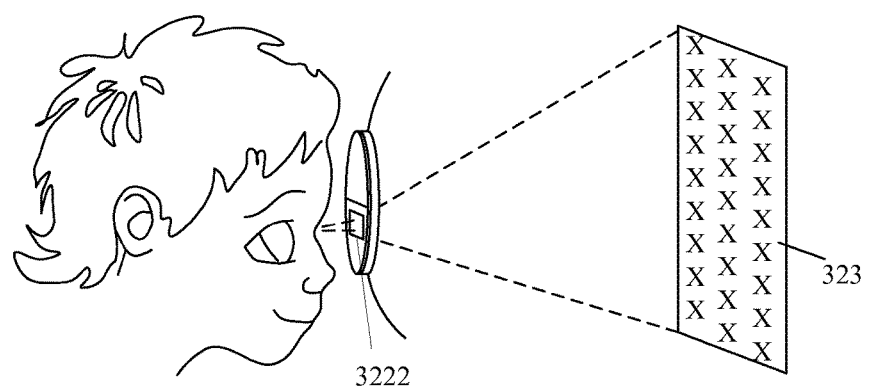
Figure 26C:
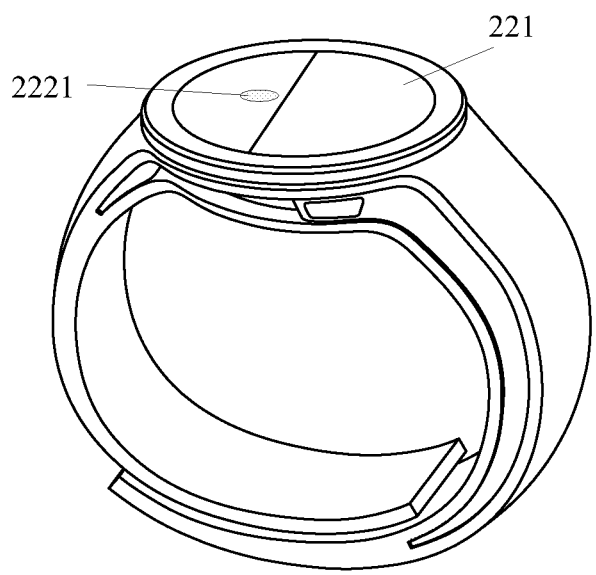

FIG. 26a to FIG. 26c are schematic diagrams of the interaction ways of the electronic device in the second embodiment of the third implementation of the present disclosure. Taking the electronic device being a smart watch as an example, when the smart watch is in the first interaction way, that is, the interaction way in which the user's eyes are away from the first display region of the first display module of the electronic device, the user wears the smart watch to observe the first display region, as shown in FIG. 26a. With reference to FIG. 11a and FIG. 11b, the user raises up the wrist in front of the chest so that the electronic device 320 is away from the user's eyes, thereby the user observes the first display region 21 in the first interaction way. When the smart watch is in the second interaction way, that is, the interaction way in which the user's eyes are close to the second display region of the second display module of the electronic device, as shown in FIG. 26b, when the user's eyes are close to the second display region 22 of the electronic device, the light from the second display module is incident to the user's eyes directly. That is, the size of the second perception image 323 perceived by the user is much larger than that of the second display region 22 in the view field of the user, in a projection way, and the second perception image 323 perceived by the user seems to be far away from the user in perception. In this way, when the user observes the second display region 22 in the second interaction way, the size of the observed image is larger, and the user's visual experience is greatly improved.

Particularly, when the smart watch is in the second interaction way, in practical use, when the light from the second display module is incident to the user's eyes directly, a light spot is to be the output of the display content output by the second display module in the second display region 22, such as the light spot 2221 as shown in FIG. 26c. In this case, the light spot 2221 is the second display region 22.

In the present embodiment, the second display region is smaller than or equal to a predetermined area, and the first display region is larger than the predetermined area. The predetermined area is a sectional area of the view field of the user's eyes when the distance between the user's eyes and the electronic device meets a predetermined distance.

The predetermined distance is a distance from the user's eyes to the electronic device when the electronic device is in the second interaction way. When the user observes the first display region at the predetermined distance, obviously, the area of the first display region is larger than the sectional area of the view field of the user's eyes. When the user observes the second display region at the predetermined distance, i.e., the light spot 2221 in FIG. 26c, since the distance from the user's eyes to the electronic device is changeable, that is, the user's head moves back and forth, the area of the second display region may be smaller than the sectional area of the view field of the user's eyes. It may also be possible that the area of the second display region is equal to the sectional area of the view field of the user's eyes when the distance from the user's eyes to the electronic device is proper.

With the technical solution of the embodiment of the present disclosure, the application corresponding to the first object identifier may be started without a trigger operation on the first object identifier, and at the same time the first user interaction interface corresponding to the first application is started, the acquisition efficiency of the information is largely improved and the user experience is improved. On the other hand, the embodiment of the present disclosure may be applied to two kinds of display modules with different display principles. Correspondingly, two display interfaces corresponding to two different display modules with different display principles are provided. Some brief information is displayed through the first display module, and more and detailed information can be displayed through the second display module. In this way, the electronic device provided in the embodiment of the present disclosure may not be limited by the size itself, and can provide an image or video display with a larger size and a higher resolution.

Third Embodiment of Third Implementation

Figure 27:
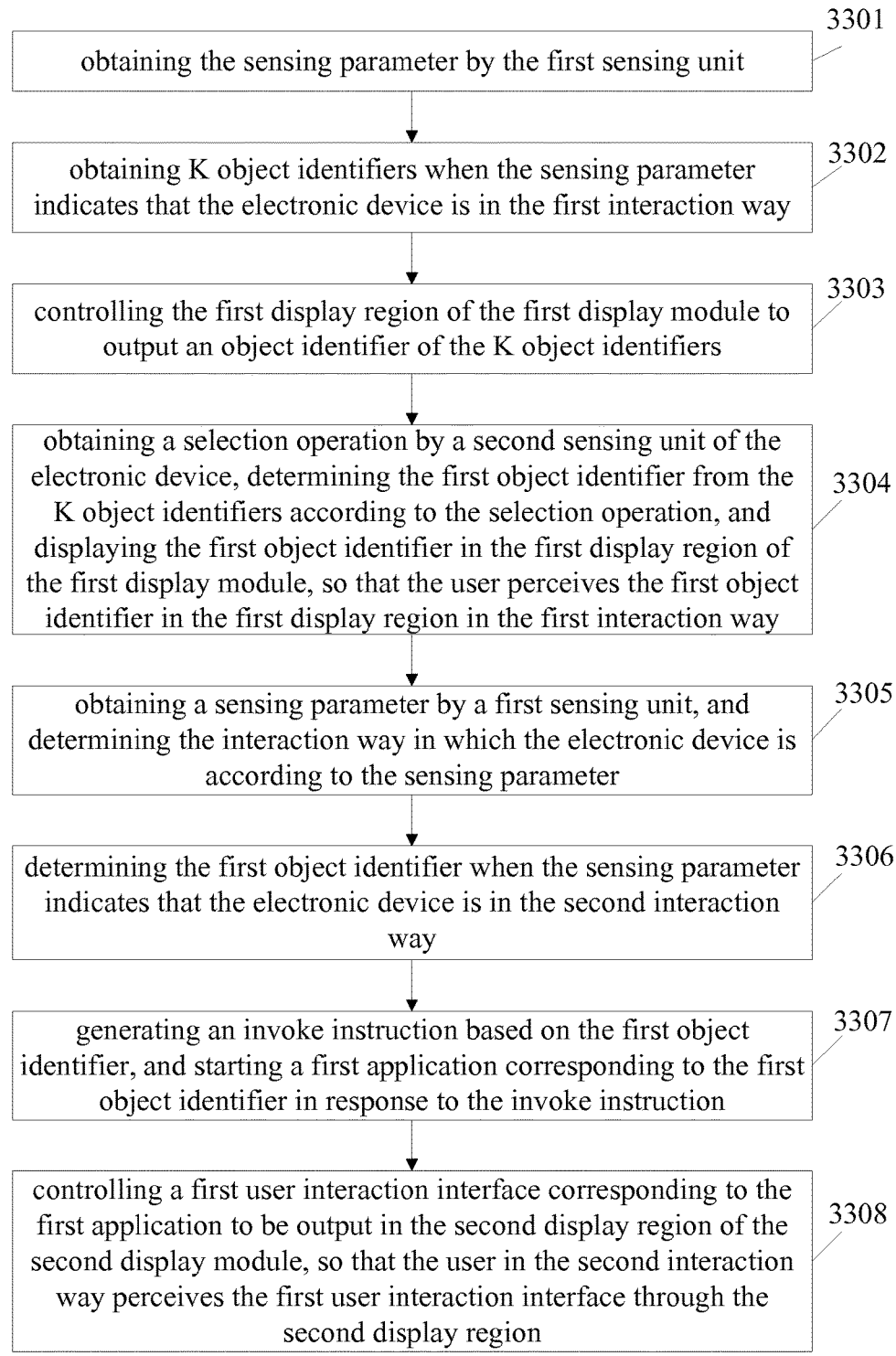
FIG. 27 is a schematic diagram of a flowchart of an information processing method according to a third embodiment of the third implementation of the present disclosure.

In another embodiment of the present disclosure, an information processing method is applied in the embodiment of the present disclosure, based on the electronic device described in the second embodiment. FIG. 27 is a schematic diagram of a flowchart of the information processing method in the third embodiment of the third implementation of the present disclosure. As shown in FIG. 27, the method includes the following steps.

At step 3301, the sensing parameter is obtained by the first sensing unit.

In the present embodiment, the electronic device may be a wearable smart electronic device with two display modules particularly, such as the smart watch, or may be as smart phone having two display modules with different display principles. The structure and interaction way of the electronic device may be as shown in the second embodiment, and will not be described here redundantly.

Herein, in this step, the process of obtaining of the sensing parameter by the first sensing unit may be realized in the following ways.

In a first way, the electronic device is arranged with a switch key. When it is detected that the switch key is triggered in the electronic device, it is determined that the interaction way between the user and the electronic device is switched from the first interaction way to the second interaction way. It is determined that the interaction way between the user and the electronic device is switched from the second interaction way to the first interaction way by detecting that the switch key is triggered again. In this scenario, the first sensing unit is particularly a key detection unit, and the sensing parameter is a key detection parameter. The relationship between the key detection parameter and the interaction way may be set in advance. For example, the key detection parameter is set to be 0, and the corresponding interaction way is the first interaction way. The key detection parameter is set to be 1, and the corresponding interaction way is the second interaction way. Then, it may be determined whether the switch way of the electronic device is the first interaction way or the second interaction way by the key detection parameter detected by the key detecting unit. Particularly, the switch key may be a physical key on the electronic device, or may be a virtual key which may be triggered by the touch display screen corresponding to the first display region.

In a second way, the first sensing unit is a voice recognition unit. The sensing parameter is a voice data parameter obtained by the voice recognition unit. When a voice data parameter corresponding to a preset switch instruction is recognized by the voice recognition unit in the electronic device, the interaction way where the electronic device is at is determined according to the preset switch instruction corresponding to the voice data parameter.

In a third way, the first sensing unit is a gravity sensing unit or a gyro sensor. The sensing parameter is an incline angle obtained by the gravity sensing unit or the gyro sensor. When it is detected that the incline angle of the electronic device is in a first threshold range by the gravity sensing unit or the gyro sensor of the electronic device, it is determined that the electronic device is in the first interaction way. When it is detected that the incline angle of the electronic device is in a second threshold range by the gravity sensing unit or the gyro sensor, it is determined that the electronic device is in the second interaction way.

In a fourth way, the first sensing unit is a distance sensor. The sensing parameter is a distance to an obstacle detected by the distance sensor. The distance sensor may be arranged in the same plane with the second display region. When it is detected that the distance from an obstacle to the electronic device is smaller than a first threshold by the distance sensor of the electronic device, it is determined that the electronic device is in the second interaction way. When it is detected that the distance from the obstacle to the electronic device reaches the first threshold by the distance sensor, it is determined that the electronic device is in the first interaction way.

In a fifth way, the first sensing unit is a height measurement meter and a gravity sensor, and the sensing parameter is the height value detected by the height measurement meter and the incline angle detected by the gravity sensor. When it is detected that the electronic device is raised up to a second height (a height where the user's eyes is at) by the height measurement meter and it is detected that the incline angle of the electronic device is changed from a first angle range to a second angle range (i.e., the orientation of the electronic device is changed from facing the outer side of the user's side to facing the inner side of the user's front side) by the gravity sensor, it is determined that the electronic device is in the second interaction way. When it is detected that the electronic device falls down from the second height range to a third height range by the height meter, and it is detected that the orientation of the electronic device is not changed by the gravity sensor, it is determined that the interaction way between the user and the electronic device is the first interaction way.

At step 3302, K object identifiers are obtained when the sensing parameter indicates that the electronic device is in the first interaction way, wherein K is a positive integer.

Herein, particularly, the K object identifiers may be the object identifiers of K applications in the electronic device, such as an icon of a clock application or an icon of a weather application or the like. Optionally, the K object identifiers may be a live icon such as a live weather icon. The K object identifiers may also be K widgets, such as a clock widget which can display the time, the date, the current weather condition and the contamination condition or the like, which is capable of rendering at least one kind of information.

At step 3303, the first display region of the first display module is controlled to output the first object identifier of the K object identifiers.

In this embodiment, the first display region of the electronic device may only display one object identifier of the K object identifiers.

At step 3304, a selection operation is obtained by a second sensing unit of the electronic device. The first object identifier is determined from the K object identifiers according to the selection operation, and the first object identifier is displayed in the first display region of the first display module, so that the user in the first interaction way perceives the first object identifier through the first display region.

Herein, the second sensing unit may be a touch control sensing unit, through which a touch control gesture operation, such as a page turning operation, is recognized. Since only one object identifier of the K object identifiers can be displayed in the first display region of the electronic device in the present embodiment, if the object identifier displayed in the current first display region is not the object identifier determined by the user, the content displayed in the first display region may be turned to the next page through a page turning operation recognized by the touch control sensing unit, to display the next object identifier of the current object identifier, until the object identifier determined by the user is displayed in the first display region by the page turning operation, to determine the object identifier determined by the user as the first object identifier.

In another embodiment, the second sensing unit may be a voice recognition unit. A voice operation is recognized by the voice recognition unit, the page turning of the content displayed in the first display region is performed according to the operation instruction corresponding to the voice operation, until the object identifier determined by the user is displayed in the first display region by the voice operation, to determine the object identifier determined by the user as the first object identifier.

At step 3305, a sensing parameter is obtained by a first sensing unit, and the interaction way in which the electronic device is at is determined according to the sensing parameter.

Herein, the detailed implementation of this step may be as shown in step 3301, and will not be described here redundantly.

At step S3306, the first object identifier is determined when the sensing parameter indicates that the electronic device is in the second interaction way.

Herein, the process of determining the first object identifier is to select the first object identifier displayed in the first display region. Particularly, the first display region of the first display module only outputs the first object identifier. The first object identifier is triggered to be selected when the electronic device is switched from the first interaction way to the second interaction way.

At step 3307, an invoke instruction is generated based on the first object identifier, and a first application corresponding to the first object identifier is started in response to the invoke instruction.

Herein, when the first object identifier is an object identifier of a certain application in the electronic device, the attribute parameter of the object identifier includes an installation address of the application corresponding to the first object identifier in the electronic device. When the first object identifier is a widget capable of rendering at least one kind of information, the attribute parameter of the widget includes a URL of a webpage linked to the widget, or the attribute parameter of the widget includes an installation address of the application corresponding to the widget in the electronic device. The step of generating an invoke instruction based on the first object identifier and starting a first application corresponding to the first object identifier in response to the invoke instruction includes: recognizing the attribute parameter of the first object identifier, acquiring the installation address of the first application corresponding to the first object identifier according to the attribute parameter of the first object identifier, generating the invoke instruction based on the installation address of the first application, and responding to the invoke instruction to start the first application.

Wherein, the first application is a browser application when the attribute parameter of the widget includes the URL of the webpage linked to the widget.

At step 3308, a first user interaction interface corresponding to the first application is controlled to be output in the second display region of the second display module, so that the user in the second interaction way perceives the first user interaction interface through the second display region.

Herein, the first user interaction interface is an interface rendered to the user after the first application is started. When the first application is an application installed in the electronic device, the first user interaction interface is the interaction interface rendered after the application is started. When the first application is a browser application, the first user interaction interface is a webpage interaction interface corresponding to the URL of the webpage comprised in the attribute parameter of the first object identifier.

With the technical solution of the embodiment of the present disclosure, the application corresponding to the first object identifier may be started without a trigger operation on the first object identifier, and at the same time the first user interaction interface corresponding to the first application is output, the acquisition efficiency of the information is largely improved and the user experience is improved. On the other hand, the embodiment of the present disclosure provides two display interfaces, some brief information is displayed through the first display module, and more detailed information can be displayed through the second display module. In this way, the electronic device provided in the embodiment of the present disclosure may not be limited by the size itself, and can provide an image or video display with a larger size and a higher resolution.

Fourth Embodiment of Third Implementation

Figure 28:
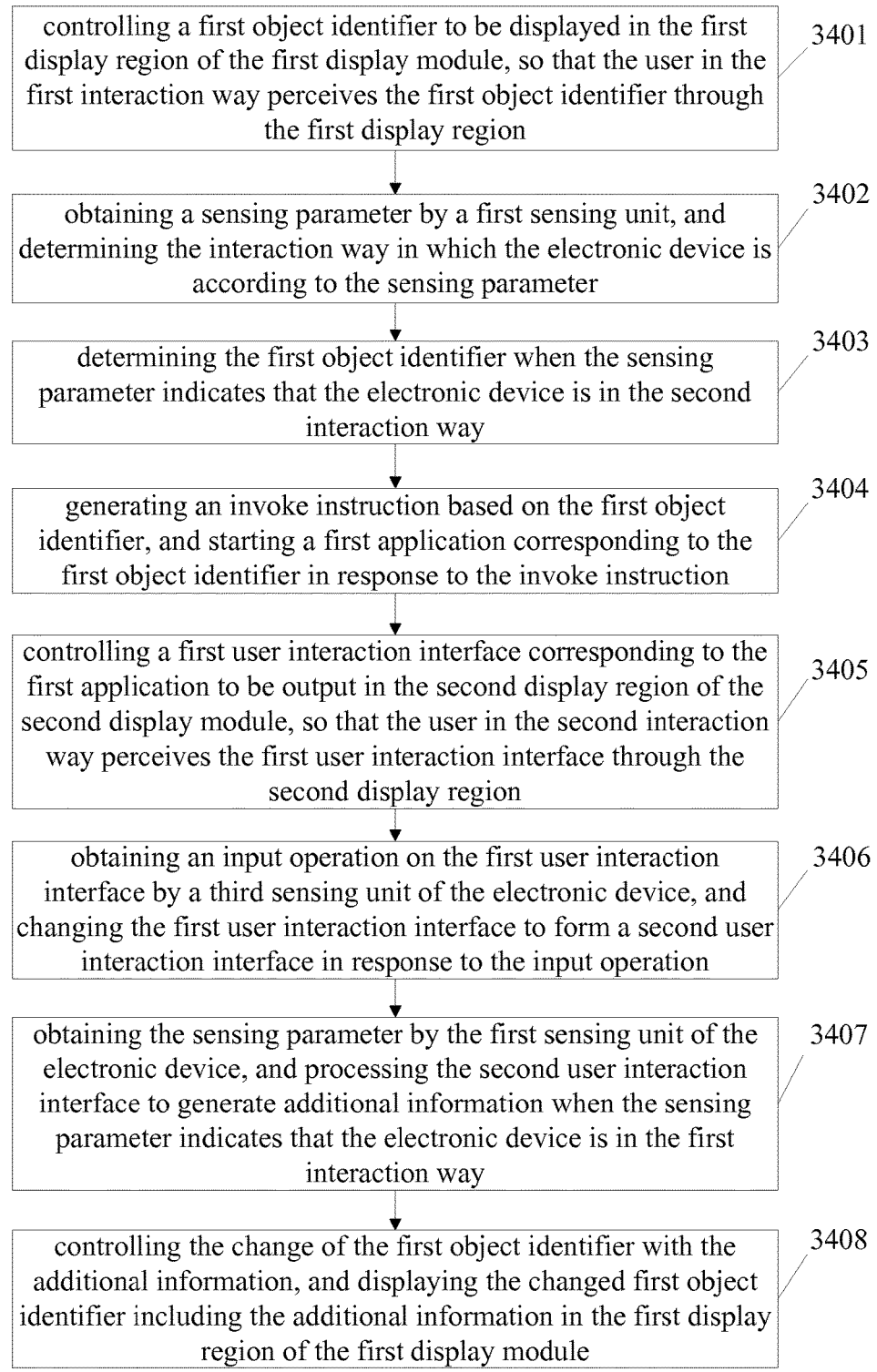
FIG. 28 is a schematic diagram of a flowchart of an information processing method according to a fourth embodiment of the third implementation of the present disclosure.

In another embodiment of the present disclosure, an information processing method is provided in an embodiment of the present disclosure, based on the electronic device described in the second embodiment of the third implementation. FIG. 28 is a schematic diagram of the information processing method of the fourth embodiment of the third implementation of the present disclosure. As shown in FIG. 28, the method includes the following steps.

At step S3401, a first object identifier is controlled to be displayed in the first display region of the first display module, so that the user in the first interaction way perceives the first object identifier through the first display region.

In the present embodiment, the electronic device may be a wearable smart electronic device such as a smart watch or the like with two display modules, or a smart phone with two display modules. The display principles of the two display modules are different. The structure and interaction way of the electronic device may be shown as that in the second embodiment, and will not be described here redundantly.

Herein, particularly, the first object identifier may be the object identifier of a certain application in the electronic device, such as an icon of a clock application or an icon of a weather application or the like. Optionally, the object identifier may be a live icon such as a live weather icon. The first object identifier may also be a widget, such as a clock widget which can display the time, the date, the current weather condition and the contamination condition or the like, which is capable of rendering at least one kind of information.

At step 3402, a sensing parameter is obtained by a first sensing unit, and the interaction way in which the electronic device is at is determined according to the sensing parameter.

Herein, in this step, the obtaining of the sensing parameter by the first sensing unit may be realized in the following ways.

In a first way, the electronic device is arranged with a switch key. When it is detected that the switch key is triggered in the electronic device, it is determined that the interaction way between the user and the electronic device is switched from the first interaction way to the second interaction way. It is determined that the interaction way between the user and the electronic device is switched from the second interaction way to the first interaction way by detecting that the switch key is triggered again. In this scenario, the first sensing unit is particularly a key detection unit, and the sensing parameter is a key detection parameter. The relationship between the key detection parameter and the interaction way may be set in advance. For example, the key detection parameter is set to be 0, and the corresponding interaction way is the first interaction way. The key detection parameter is set to be 1, and the corresponding interaction way is the second interaction way. Then, it may be determined whether the switch way of the electronic device is the first interaction way or the second interaction way by the key detection parameter detected by the key detecting unit. Particularly, the switch key may be a physical key on the electronic device, or may be a virtual key which may be triggered by the touch display screen corresponding to the first display region.

In a second way, the first sensing unit is a voice recognition unit. The sensing parameter is a voice data parameter obtained by the voice recognition unit. When a voice data parameter corresponding to a preset switch instruction is recognized in the electronic device, the interaction way where the electronic device is at is determined according to the preset switch instruction corresponding to the voice data parameter.

In a third way, the first sensing unit is a gravity sensing unit or a gyro sensor. The sensing parameter is an incline angle obtained by the gravity sensing unit or the gyro sensor. When it is detected that the incline angle of the electronic device is in a first threshold range by the gravity sensing unit or the gyro sensor of the electronic device, it is determined that the electronic device is in the first interaction way. When it is detected that the incline angle of the electronic device is in a second threshold range by the gravity sensing unit or the gyro sensor, it is determined that the electronic device is sin the second interaction way.

In a fourth way, the first sensing unit is a distance sensor. The sensing parameter is a distance to an obstacle detected by the distance sensor. The distance sensor may be arranged in the same plane with the second display region. When it is detected that the distance from an obstacle to the electronic device is smaller than a first threshold by the distance sensor of the electronic device, it is determined that the electronic device is in the second interaction way. When it is detected that the distance from the obstacle to the electronic device reaches the first threshold by the distance sensor, it is determined that the electronic device is in the first interaction way.

In a fifth way, the first sensing unit is a height measurement meter and a gravity sensor, and the sensing parameter is the height value detected by the height meter and the incline angle detected by the gravity sensor. When it is detected that the electronic device is raised up to a second height (a height where the user's eyes is at) by the height measurement meter and it is detected that the incline angle of the electronic device is changed from a first angle range to a second angle range (i.e., the orientation of the electronic device is changed from facing the outer side of the user's side to facing the inner side of the user's front side) by the gravity sensor, it is determined that the electronic device is in the second interaction way. When it is detected that the electronic device falls down from the second height range to a third height range by the height measurement meter, and it is detected that the orientation of the electronic device is not changed by the gravity sensor, it is determined that the interaction way between the user and the electronic device is the first interaction way.

At step S3403, the first object identifier is determined when the sensing parameter indicates that the electronic device is in the second interaction way.

Wherein, the process of determining the first object identifier is to select the first object identifier displayed in the first display region. Particularly, the first display region of the first display module only outputs the first object identifier. The first object identifier is triggered to be selected when the electronic device is switched from the first interaction way to the second interaction way.

At step 3404, an invoke instruction is generated based on the first object identifier, and a first application corresponding to the first object identifier is started in response to the invoke instruction.

Herein, when the first object identifier is an object identifier of a certain application in the electronic device, the attribute parameter of the object identifier includes an installation address of the application corresponding to the first object identifier in the electronic device. When the first object identifier is a widget capable of rendering at least one kind of information, the attribute parameter of the widget includes a URL of a webpage linked to the widget, or the attribute parameter of the widget includes an installation address of the application corresponding to the widget in the electronic device. The step of generating an invoke instruction based on the first object identifier and starting a first application corresponding to the first object identifier in response to the invoke instruction includes: recognizing the attribute parameter of the first object identifier, acquiring the installation address of the first application corresponding to the first object identifier according to the attribute parameter of the first object identifier, generating the invoke instruction based on the installation address of the first application, and responding to the invoke instruction to start the first application.

Wherein, the first application is a browser application when the attribute parameter of the widget includes the URL of the webpage linked to the widget.

At step 3405, a first user interaction interface corresponding to the first application is controlled to be output in the second display region of the second display module, so that the user in the second interaction way perceives the first user interaction interface through the second display region.

Herein, the first user interaction interface is an interface rendered to the user after the first application is started.

When the first application is an application installed in the electronic device, the first user interaction interface is the interaction interface rendered after the application is started. When the first application is a browser application, the first user interaction interface is a webpage interaction interface corresponding to the URL of the webpage comprised in the attribute parameter of the first object identifier.

At step 3406, an input operation is obtained on the first user interaction interface by a third sensing unit of the electronic device, and the first user interaction interface is changed to form a second user interaction interface in response to the input operation.

Herein, the third sensing unit may be a voice recognition unit, and the electronic device may obtain the voice information by the voice recognition unit, generate a voice instruction corresponding to the voice information by analyzing the voice information, and generate an input operation on the first user interaction interface based on the voice instruction.

Particularly, when the first user interaction interface is a display interface of a map application, the first user interaction interface is a map interface of a city where the user is currently located displayed after the map application is started. The user may issue the voice instruction by the voice recognition unit, such as: setting the start location A, the destination location B, computing the best path between the start location A and the destination location B, and starting navigation. Then, a second user interaction interface may be generated based on the voice instruction, which may render the start location A, the destination location B, the best path between the start location A and the destination location B and the location where the user is currently located, and acquires the user's current location in real time, navigate based on the user's current location, and changes the user's current location in the second user interaction interface.

At step 3407, the sensing parameter is obtained by the first sensing unit of the electronic device, and the second user interaction interface is processed to generate additional information when the sensing parameter indicates that the electronic device is in the first interaction way.

In the present step, after the second user interaction interface is formed, when the sensing parameter obtained by the first sensing unit indicates that the electronic device is in the first interaction way, i.e., the electronic device is switched from the second interaction way to the first interaction way, additional information is generated based on the second user interaction interface.

Wherein, when the electronic device is switched from the second interaction way to the first interaction way, the second user interaction interface is still output in the second display region by the second display module, and is changed with the change of the time or the user's location. Therefore, the additional information may be information that can indicate the change in the second user interaction interface.

Figures 29A, 29B:
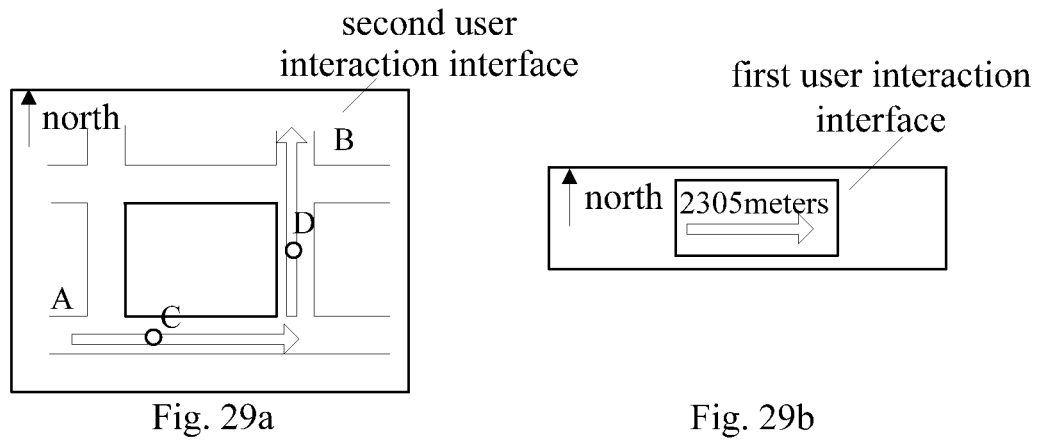
FIG. 29a and FIG. 29b are schematic diagrams of scenes to which an information processing method according to the fourth embodiment of the third implementation of the present disclosure is applied.

Taking a particular application as an example, FIG. 29*a* and FIG. 29*b* are schematic diagrams of an application scenario in the fourth embodiment of the third implementation of the present disclosure. FIG. 29*a* is a schematic diagram of the second user interaction interface in the fourth embodiment of the present disclosure. As shown in FIG. 29*a*, when the navigation is performed based on the second user interaction interface rendering the start location A, the destination location B, the best path between the start location A and the destination location B and the location C or D where the user is located, the additional information may be a direction arrow to which the user should move. FIG. 29*b* is a schematic diagram of the additional information in the first user interaction interface in the embodiment of the present disclosure. As shown in FIG. 29*b*, when the user's current location is C, according to the navigation path in the second user interaction interface, the user should continue to move to the east, i.e., the additional information is an arrow to the east. Optionally, the distance with which the user can continue to move to the east may be added in the additional information, such as the arrow to the east and 2305 meters in FIG. 29*b*.

At step 3408, the change of the first object identifier is controlled with the additional information, and the changed first object identifier including the additional information is displayed by the first display region of the first display module.

Herein, when the first object identifier is an object identifier of a certain application in the electronic device, such as an icon of a weather application and an icon of a map application, the additional information is added to the first object identifier. When the first object identifier is the icon of the map application, the additional information (such as the arrow, or the arrow and the distance) in the step 3407 is added to the icon of the map application, to control the icon of the map application to change with the change of the user's current location, so that the user may navigate with the change of the arrow direction in the icon of the map application, or the change of the arrow direction in the icon of the map application and the change of the distance.

When the first object identifier is a widget capable of rendering at least one kind of information, the additional information is added to the widget. When the widget is a map widget, the additional information (such as the arrow, or the arrow and the distance) in the step 3407 is added to the map widget, to control the map widget to change with the change of the user's current location, so that the user may navigate with the change of the arrow direction in the map widget, or the change of the arrow direction and the change of the distance in the map widget.

With the technical solution of the embodiment of the present disclosure, the application corresponding to the first object identifier may be started only by a switch from the first interaction way to the second interaction way, without a trigger operation on the first object identifier, and at the same time the first user interaction interface corresponding to the first application is started, the acquisition efficiency of the information is largely improved and the user experience is improved. On the other hand, the embodiment of the present disclosure provides two display interfaces, some brief information is displayed through the first display module, and more detailed information can be displayed through the second display module. In this way, the electronic device provided in the embodiment of the present disclosure may not be limited by the size itself, and can provide an image or video display with a larger size and a higher resolution.

Fifth Embodiment of Third Implementation

In another embodiment of the present disclosure, displaying parameter value of the bearer interface of the first user interaction interface corresponding to the first application controlled to be output by the second display region of the second display module is updated for the same object identifier each time when the sensing parameter indicates that the electronic device is in the second interaction way, based on the information processing method described in the second embodiment of the third implementation.

Particularly, the technical solution provided in the present embodiment may be applied to multiple environments, such as the surrounding regions in which the outdoor light is strong, the indoor light is weak, the colors are rich, or the colors are monotonous. Herein, when the electronic device is switched from the first interaction way to the second interaction way and is for the same object identifier, the background of the first user interaction interface output by the second display region of the second display module of the electronic device is adapted to the surrounding parameter. For example, when the current surrounding is a region with a strong lightness, the lightness of the background of the first user interaction interface may be adaptively adjusted to be close to that of the current surrounding. When the current surrounding is a region in which the main color is green such as a grass or a forest, the background color of the first user interaction interface may be adaptively adjusted to be green. In this way, the display of the first user interaction interface is consistent with the surrounding, the user's visual fatigue is eased, and the uncomfortable feeling to the user's body due to the visual difference of both eyes of the user is avoided, and the user's operation experience is improved.

In the first embodiment to the fifth embodiment of the third implementation of the present disclosure, the electronic device is a wearable electronic device, the structure of which is similar to those shown with reference to FIG. 23a to FIG. 23d. Particularly, as shown in FIG. 23a, the wearable electronic device includes a frame 271, a fixing apparatus and a main functional section.

The fixing apparatus is connected to the frame 271, which is used for fixing the electronic device to a support part, and forms an annular space together with the fixing apparatus when the electronic device is fixed to the support part through the fixing apparatus.

The main functional section comprises at least a first display apparatus 11 arranged in the frame 271 and a second display apparatus 12 arranged in the frame 271. The electronic device has a first section, which is a ring formed by sectioning the electronic device vertically to the support part, when the electronic device is fixed to the support part by the fixing apparatus, with the support part as a reference. The first direction is a direction from the outer side of the ring to the inner side of the ring and being towards the center of the ring.

In the embodiment of the present disclosure, the electronic device is the wearable electronic device. As an embodiment, the electronic device may be a smart watch. The first section may be understood as the section as shown in FIG. 23a. From the section seen in FIG. 23a, the frame 271 and the fixing apparatus form a ring in the electronic device, into which the support part may be inserted. When the ring is a standard ring, the first direction may be understood as a direction from the outer side of the ring to the inner side of the ring and towards the center of the ring. The ring may not be a standard ring, therefore it is only for describing the technical solution of the embodiment of the present disclosure, of the first direction explained above taking the standard ring as an example, but is not necessarily the true case. The truth is that assuming the smart watch is worn at the wrist, since the human wrist is not a standard cylinder, the ring formed by the smart watch is not a standard cycle.

In an embodiment of the present disclosure, the support part may be the human's wrist, or may be other part of the user. Of course, the support part may be any object other than the human body of the user, for example, an artificial limb or the like, or may be a handrail on a bus or a subway.

In the embodiment of the present disclosure, the electronic device is a wearable electronic device. As an optional embodiment, the electronic device may also be a smart ring. When the electronic device is the smart ring, the support part may be a finger accordingly.

In an embodiment of the present disclosure, the electronic device may include two fixing apparatuses as shown in FIG. 23a, that is, the first fixing apparatus 272 and the second fixing apparatus 273. A first end of the first fixing apparatus 272 is connected to a first end of the frame 271 actively. A first end of the second fixing apparatus 273 is connected to a second end of the frame 271 actively. A second end of the first fixing apparatus 272 and a second end of the second fixing apparatus 273 cooperate with each other to fix the electronic device at the support part. In detailed implementation, those skilled in the art may realize the cooperation between the second end of the first fixing apparatus 272 and the second end of the second fixing apparatus 273 by a splice part or the like. Those skilled in the art may also realize the active connection between the first end of the first fixing apparatus 272 and the first end of the frame 271, and the active connection between the first end of the second fixing apparatus 273 and the second end of the frame 271, by pivot, which will not be described here redundantly.

Sixth Embodiment of Third Implementation

Figure 30:
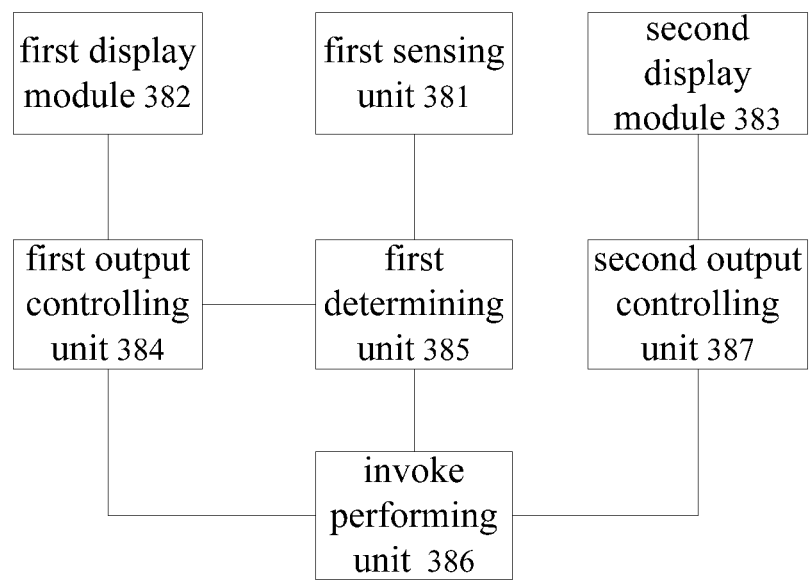
FIG. 30 is a schematic diagram of a first kind of a structure of an electronic device according to an embodiment of the third implementation of the present disclosure.

An electronic device is provided in the embodiment of the third implementation of the present disclosure. FIG. 30 is a schematic diagram of a first kind of consisting structure of the electronic device of the embodiment of the third implementation of the present disclosure. As shown in FIG. 30, the electronic device has a first sensing unit 381, a first display module 382 having a first display region and a second display module 383 having a second display region, the user being able to observe the first display region of the first display module 382 when the electronic device interacts with the user of the electronic device in a first interaction way, and to observe the second display region of the second display module 383 when the electronic device interacts with the user of the electronic device in a second interaction way, the electronic device further comprises a first output controlling unit 384, a first determining unit 385, an invoke performing unit 386 and a second output controlling unit 387.

The first output controlling unit 384 is used for controlling a first object identifier to be displayed in the first display region of the first display module 382, so that the user in the first interaction way perceives the first object identifier through the first display region.

The first determining unit 385 is used for obtaining a sensing parameter by a first sensing unit 381, and the interaction way in which the electronic device is at is determined according to the sensing parameter;

The invoke performing unit 386 is used for determining the first object identifier displayed by the first output controlling unit 384, generating an invoke instruction based on the first object identifier, and starting a first application corresponding to the first object identifier in response to the invoke instruction when the first determining unit 385 determines that the electronic device is in the second interaction way.

The second output controlling unit 387 is used for controlling a first user interaction interface corresponding to the first application started by the invoke performing unit 386, to be output in the second display region of the second display module 383, so that the user in the second interaction way perceives the first user interaction interface through the second display region.

According to an embodiment of the present disclosure, the display principles of the first display module 382 and the second display module 383 are different, the second display region is smaller than the first display region; the interaction ways between the user and the electronic device are different due to different display principles of the first display module 382 and the second display module 383.

The first interaction way is an observation way in which the user's eyes are away from the first display region of the first display module 382 of the electronic device, and a first perception image is perceived by the user when the user observes the first display region of the electronic device in the first interaction way, the size of the first perception image is equal to that of the first display region, and the first perception image comprises the first object identifier.

The second interaction way is an observation way in which the user's eyes are close to the second display region of the second display module 383 of the electronic device, wherein light beam from the second display module 383 is incident to the user's eyes so that a second perception image is perceived when the user observes the second display region of the electronic device. The size of the second perception image is larger than the second display region and the second perception image includes the first user interaction interface.

Herein, the second display region is smaller than or equal to a predetermined area, and the first display region is larger than the predetermined area. The predetermined area is a sectional area of the view field of the user's eyes when the distance between the user's eyes and the electronic device meets a predetermined distance.

Those skilled in the art should understand that the functions of the processing units in the electronic device of the embodiment of the present disclosure may be understood with reference to the relevant description of the information processing method as described above. The processing units in the electronic device of the embodiment of the present disclosure may be realized by analog circuits realizing the functions as described in the embodiments of the present disclosure, or may be realized by the software performing the functions as described in the embodiments of the present disclosure, being executed on a smart terminal.

Seventh Embodiment of Third Implementation

Figure 31:
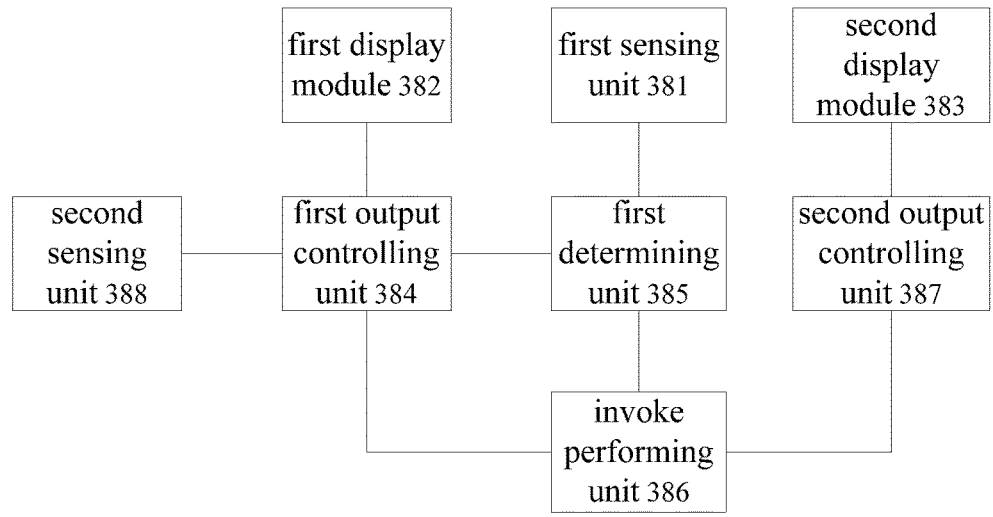
FIG. 31 is a schematic diagram of a second kind of a structure of an electronic device according to an embodiment of the third implementation of the present disclosure.

An electronic device is provided in the embodiment of the present disclosure. FIG. 31 is a schematic diagram of a second kind of consisting structure of the electronic device of the embodiment of the third implementation of the present disclosure. As shown in FIG. 31, the electronic device has a first sensing unit 381, a first display module 382 having a first display region and a second display module 383 having a second display region, the user being able to observe the first display region of the first display module 382 when the electronic device interacts with the user of the electronic device in a first interaction way, and to observe the second display region of the second display module 383 when the electronic device interacts with the user of the electronic device in a second interaction way. The display principles of the first display module 382 and the second display module 383 are different, the second display region is smaller than the first display region; the interaction ways between the user and the electronic device are different due to different display principles of the first display module 382 and the second display module 383.

The first interaction way is an observation way in which the user's eyes are away from the first display region of the first display module 382 of the electronic device, and a first perception image is perceived by the user when the user observes the first display region of the electronic device in the first interaction way, the size of the first perception image is equal to that of the first display region, and the first perception image comprises the first object identifier.

The second interaction way is an observation way in which the user's eyes are close to the second display region of the second display module 383 of the electronic device, wherein light beam from the second display module 383 is incident to the user's eyes so that a second perception image is perceived when the user observes the second display region of the electronic device in the second interaction way. The size of the second perception image is larger than that of the second display region and the second perception image includes the first user interaction interface.

The electronic device further comprises: a second sensing unit 382, a first output controlling unit 384, a first determining unit 385, an invoke performing unit 386 and a second output controlling unit 387.

The second sensing unit 382 is used for obtaining a selection operation.

The first output controlling unit 384 is used for obtaining the sensing parameter by the first sensing unit 381 before controlling the first display region of the first display module 382 to output the first object identifier; obtaining K object identifiers when the sensing parameter indicates that the electronic device is in the first interaction way, wherein K is a positive integer; controlling the first display region of the first display unit 382 to display one object identifier of the K object identifiers; determining the first object identifier from the K object identifiers according to the selection operation obtained by the second sensing unit 388, and displaying the first object identifier in the first display region of the first display module 382; controlling the first display region of the first display unit 382 to display the first object identifier, so that the user in the first interaction way perceive the first object identifier through the first display region.

The first determining unit 385 is used for obtaining a sensing parameter by a first sensing unit 381, and determining the interaction way in which the electronic device is according to the sensing parameter.

The invoke performing unit 386 is used for determining the first object identifier displayed by the first output controlling unit 384, generating an invoke instruction based on the first object identifier, and starting a first application corresponding to the first object identifier in response to the invoke instruction when the first determining unit 385 determines that the electronic device is in the second interaction way.

The second output controlling unit 387 is used for controlling a first user interaction interface corresponding to the first application started by the invoke performing unit 386, to be output in the second display region of the second display module 383, so that the user in the second interaction way perceives the first user interaction interface through the second display region.

Those skilled in the art should understand that the functions of the processing units in the electronic device of the embodiment of the present disclosure may be understood with reference to the relevant description of the information processing method as described above. The processing units in the electronic device of the embodiment of the present disclosure may be realized by analog circuits realizing the functions as described in the embodiments of the present disclosure, or may be realized by the software performing the functions as described in the embodiments of the present disclosure, being executed on a smart terminal.

Eighth Embodiment of Third Implementation

Figure 32:
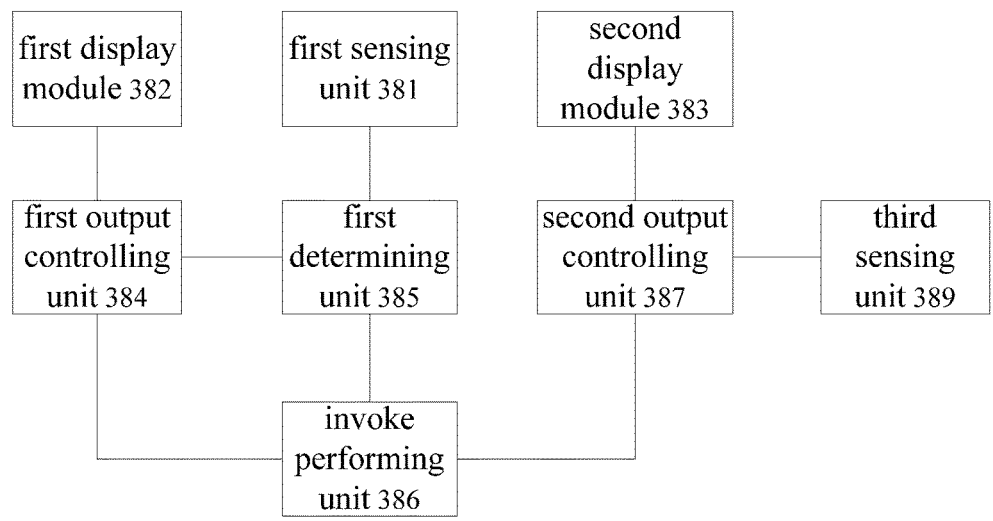
FIG. 32 is a schematic diagram of a third kind of a structure of an electronic device according to an embodiment of the third implementation of the present disclosure.

An electronic device is provided in the embodiment of the third implementation of the present disclosure. FIG. 32 is a schematic diagram of a third kind of consisting structure of the electronic device of the embodiment of the third implementation of the present disclosure. As shown in FIG. 32, the electronic device has a first sensing unit 381, a first display module 382 having a first display region and a second display module 383 having a second display region, the user being able to observe the first display region of the first display module 382 when the electronic device interacts with the user of the electronic device in a first interaction way, and to observe the second display region of the second display module 383 when the electronic device interacts with the user of the electronic device in a second interaction way. The display principles of the first display module 382 and the second display module 383 are different, the second display region is smaller than the first display region; the interaction ways between the user and the electronic device are different due to different display principles of the first display module 382 and the second display module 383.

The first interaction way is an observation way in which the user's eyes are away from the first display region of the first display module 382 of the electronic device, and a first perception image is perceived by the user when the user observes the first display region of the electronic device in the first interaction way, the size of the first perception image is equal to that of the first display region, and the first perception image comprises the first object identifier.

The second interaction way is an observation way in which the user's eyes are close to the second display region of the second display module 383 of the electronic device, wherein light beam from the second display module 383 is incident to the user's eyes so that a second perception image is perceived when the user observes the second display region of the electronic device in the second interaction way. The size of the second perception image is larger than that of the second display region, and the second perception image includes the first user interaction interface.

The electronic device further comprises a third obtaining unit 389, a first output controlling unit 384, a first determining unit 385, an invoke performing unit 386 and a second output controlling unit 387.

The first output controlling unit 384 is used for controlling a first object identifier to be displayed in the first display region of the first display module 382, so that the user in the first interaction way perceives the first object identifier through the first display region, and processing the second user interaction interface to generate additional information when the first determining unit 385 determines that the electronic device is in the first interaction way; controlling the change of the first object identifier with the additional information, and outputting the changed first object identifier with the additional information in the first display region of the first display unit 382.

The first determining unit 385 is used for obtaining a sensing parameter by a first sensing unit 381, and determining the interaction way in which the electronic device is according to the sensing parameter.

The invoke performing unit 386 is used for determining the first object identifier displayed by the first output controlling unit 384, generating an invoke instruction based on the first object identifier, and starting a first application corresponding to the first object identifier in response to the invoke instruction when the first determining unit 385 determines that the electronic device is in the second interaction way.

The second output controlling unit 387 is used for controlling a first user interaction interface corresponding to the first application started by the invoke performing unit 386, to be output in the second display region of the second display module 383, so that the user in the second interaction way perceives the first user interaction interface through the second display region, and changing the first user interaction interface to form a second user interaction interface in response to the input operation obtained by the third obtaining unit 389.

The third obtaining unit 389 is used for obtaining an input operation on the first user interaction interface.

Those skilled in the art should understand that the functions of the processing units in the electronic device of the embodiment of the present disclosure may be understood with reference to the relevant description of the information processing method as described above. The processing units in the electronic device of the embodiment of the present disclosure may be realized by analog circuits realizing the functions as described in the embodiments of the present disclosure, or may be realized by the software performing the functions as described in the embodiments of the present disclosure, being executed on a smart terminal.

Ninth Embodiment of Third Implementation

An electronic device is provided in the embodiment of the present disclosure. As shown in FIG. 30, the electronic device has a first sensing unit 381, a first display module 382 having a first display region and a second display module 383 having a second display region, the user being able to observe the first display region of the first display module 382 when the electronic device interacts with the user of the electronic device in a first interaction way, and to observe the second display region of the second display module 383 when the electronic device interacts with the user of the electronic device in a second interaction way. The display principles of the first display module 382 and the second display module 383 are different, the second display region is smaller than the first display region; the interaction ways between the user and the electronic device are different due to different display principles of the first display module 382 and the second display module 383.

The first interaction way is an observation way in which the user's eyes are away from the first display region of the first display module 382 of the electronic device, and a first perception image is perceived by the user when the user observes the first display region of the electronic device in the first interaction way, the size of the first perception image is equal to that of the first display region, and the first perception image comprises the first object identifier.

The second interaction way is an observation way in which the user's eyes are close to the second display region of the second display module 383 of the electronic device, wherein light beam from the second display module 383 is incident to the user's eyes so that a second perception image is perceived when the user observes the second display region of the electronic device in the second interaction way. The size of the second perception image is larger than that of the second display region, and the second perception image includes the first user interaction interface.

The electronic device further comprises a first output controlling unit 384, a first determining unit 385, an invoke performing unit 386 and a second output controlling unit 387.

The first output controlling unit 384 is used for controlling a first object identifier of a first object to be displayed in the first display region of the first display module 382, so that the user in the first interaction way perceives the first object identifier through the first display region.

The first determining unit 385 is used for obtaining a sensing parameter by a first sensing unit 381, and determining the interaction way in which the electronic device is according to the sensing parameter.

The invoke performing unit 386 is used for determining the first object identifier displayed by the first output controlling unit 384, generating an invoke instruction based on the first object identifier, and starting a first application corresponding to the first object identifier in response to the invoke instruction when the first determining unit 385 determines that the electronic device is in the second interaction way.

The second output controlling unit 387 is used for controlling a first user interaction interface corresponding to the first application started by the invoke performing unit 386, to be output in the second display region of the second display module 383, so that the user in the second interaction way perceives the first user interaction interface through the second display region, and updating displaying parameter value of the bearer interface of the first user interaction interface corresponding to the first application controlled to be output by the second display region of the second display module 383 for the same object identifier started by the invoke performing unit 386, each time when the sensing parameter indicates that the electronic device is in the second interaction way.

Those skilled in the art should understand that the functions of the processing units in the electronic device of the embodiment of the present disclosure may be understood with reference to the relevant description of the information processing method as described above. The processing units in the electronic device of the embodiment of the present disclosure may be realized by analog circuits realizing the functions as described in the embodiments of the present disclosure, or may be realized by the software performing the functions as described in the embodiments of the present disclosure, being executed on a smart terminal.

In the sixth embodiment to the ninth embodiment of the third implementation of the present disclosure, the first output controlling unit 384, the first determining unit 385, the invoke performing unit 386 and the second output controlling unit 387 in the electronic device may be realized by the central processing unit (CPU), the digital signal processor (DSP) or the field programmable gate array (FPGA) in practical use. The first display unit 382 in the electronic device may be realized by the display or the display screen in the electronic device in practical use. The second display unit 383 in the electronic device may be realized by an optical projection system in the electronic device in practical use. The first sensing unit 381 in the electronic device may be realized by the camera, the pressure sensor, the gravity sensor, the distance sensor, the chip with a voice recognition function or a chip with a key detection function in the electronic device in practical use. The second sensing unit 388 in the electronic device may be realized by a touch control screen in practical use. The third sensing unit 389 in the electronic device may be realized by the CPU, the DSP or the FPGA in practical use.

Those skilled in the art should understand that the embodiments of the present disclosure may be provided as methods, devices or computer program products. Therefore, the present disclosure may be embodied as a hardware embodiment, a software embodiment or an embodiment combining the hardware with the software. Moreover, the present disclosure may be embodied as a computer program product implemented on one or more computer usable storage medium, including but not limited to, a diskette storage and an optical storage with computer usable code therein.

The present disclosure has been described with reference to flowcharts and/or block diagrams of the methods, the devices and the computer program products according to the embodiments of the present disclosure. It should be understood that each flow and/or block and the combination of the flows and/or blocks in the flowcharts and/or block diagrams may be realized by computer program instructions, which may be provided to a general use computer, a dedicated computer, an embedded processor or a processor of another programmable data processing device to produce a machine, which makes the instructions performed by the computer or the processor of the other programmable data processing device generate an apparatus for realizing the functions specified in one or more flows and/or blocks in the flowcharts and/or block diagrams.

The computer program instructions may also be stored into a computer readable storage which may direct the computer or other programmable data processing device to function in a specified way, so that the instructions stored in the computer readable storage generate an article including instruction apparatus, which may realize the functions specified in one or more flows and/or blocks in the flowcharts and/or block diagrams.

The computer program instructions may be loaded to the computer or other programmable data processing device, so that the computer or other programmable data processing device performs a series of operation steps to generate a process realized by the computer, so that the instruction preformed on the computer or other programmable data processing device provide steps for realizing the functions specified in one or more flows and/or blocks in the flowcharts and/or block diagrams.

The above descriptions are only some embodiments of the present disclosure, and are not for limit the protection scope of the present disclosure thereto.

The invention claimed is:

1. A display switching method for a wearable electronic device, the method comprising:
   turning on a first display apparatus of the wearable electronic device to make the first display apparatus in a working state;
   rendering a first image in a first display region of the first display apparatus with a first display effect by the first display apparatus;
   obtaining a sensing parameter related to an input operation by a sensing apparatus of the wearable electronic device;
   judging whether a second display apparatus of the wearable electronic device is to be turned on or not and obtaining a first judging result according to the sensing parameter; and
   rendering a second image in a second display region of the second display apparatus with a second display effect by the second display apparatus, when the first judging result indicates that the second display apparatus is to be turned on to make the second display apparatus in the working state,
   a size of the first image rendered in the first display region with the first display effect which is viewed by a user is larger than a size of the second image rendered in the second display region with the second display effect which is perceived by the user, when a distance from the user to a frame of the wearable electronic device is a first distance;
   wherein a size of the first image rendered in the first display region with the first display effect which is viewed by the user is equal to a size of the first display region, when a distance from the user to a frame of the wearable electronic device is a second distance; and the step of rendering a second image in the second display region with a second display effect by the second display apparatus comprises:

controlling a display output of the second display apparatus at a first timing, so that the size of the second image rendered in the second display region with the second display effect which is perceived by the user is equal to the size of the first display region, when the distance from the user to the frame is the second distance; and controlling the display output of the second display apparatus at a second timing after the first timing, so that the size of a third image rendered in the second display region with the second display effect which is perceived by the user is larger than the size of the first display region, when the distance from the user to the frame is the second distance;

and wherein display content of the second image is consistent with that of the first image.

2. The method of claim 1, wherein the first display apparatus and the second display apparatus are different display apparatuses, and the first display region and the second display region are different display regions.

3. The method of claim 2, wherein the first display apparatus and the second display apparatus are display apparatuses following different display principles, and a size of the first display region is larger than a size of the second display region.

4. The method of claim 2, wherein the first display apparatus comprises a first display screen having a first size equal to a size of the first display region;

the second display apparatus comprises a second display screen having a second size smaller than a size of the second display region;

a size of the first image rendered in the first display region with the first display effect that is viewed by a user is equal to the size of the first display region, when a distance from the user to a frame of the wearable electronic device is a second distance; and a size of the second image rendered in the second display region with the second display effect which is perceived by the user is larger than the size of the second display region, when a distance from the user to the frame is the second distance.

5. The method of claim 1, wherein the sensing apparatus is a first sensing apparatus for obtaining spatial location information of the electronic device under a control of an input operation by a user; and the step of judging whether the second display apparatus is to be turned on or not according to the sensing parameter comprises judging whether the electronic device is moved from a first location to a second location in a gravity direction or not, and judging whether the electronic device is rotated from a first angle to a second angle around a first operating body of the user as a center, according to the spatial location information.

6. The method of claim 1, wherein the sensing apparatus is a second sensing apparatus for sensing control operation information generated when a second operating body of a user is approaching or contacting a sensing region comprising at least a part of the first display region and at least a part of the second display region; and the step of judging whether the second display apparatus is to be turned on or not according to the sensing parameter comprises judging whether the second operating body slides from the at least a part of the first display region to the at least a part of the second display region or not, according to the control operation information.

7. The method of claim 1, wherein a size of the first image rendered in the first display region with the first display effect that is viewed by a user is equal to a size of the first display region, when a distance from the user to a frame of the wearable electronic device is a second distance; and the step of rendering a second image in the second display region with a second display effect by the second display apparatus comprises:

controlling a display output of the second display apparatus at a first timing, so that a size of the second image rendered in the second display region with the second display effect that is perceived by the user is equal to the size of the first display region, when the distance from the user to the frame is the second distance; and controlling the display output of the second display apparatus at a second timing after the first timing, so that a size of a third image rendered in the second display region with the second display effect that is perceived by the user is larger than the size of the first display region, when the distance from the user to the frame is the second distance;

and wherein display content of the second image is consistent with that of the first image.

8. The method of claim 1, wherein the step of rendering a second image in the second display region with a second display effect by the second display apparatus comprises:

controlling a display output of the first display apparatus at a first timing, so that a size of the first image rendered in the first display region with the first display effect that is viewed by a user is equal to the size of the first display region, when a distance from the user to a frame of the wearable electronic device is the second distance; and controlling the display output of the first display apparatus at a second timing after the first timing, so that the size of the first image rendered in the first display region with the first display effect that is viewed by the user is smaller than the size of the first display region, when the distance from the user to the frame is the second distance;

controlling the display output of the second display apparatus at a third timing after the second timing, so that a size of the second image rendered in the second display region with the second display effect that is perceived by the user is smaller than the size of the first display region, when the distance from the user to the frame is the second distance; and controlling the display output of the second display apparatus at a fourth timing after the third timing, so that a size of a third image rendered in the second display region with the second display effect that is perceived by the user is larger than the size of the first display region, when the distance from the user to the frame is the second distance;

and wherein the size of the second image perceived by the user at the third timing is equal to the size of the first image viewed by the user at the second timing, and display content of the second image is consistent with that of the first image.

9. The method of claim 1, wherein the sensing parameter is used to indicate an interaction way between the wearable electronic device and the user; a second interaction way is an observation way in which a user's eyes are close to the second display region of the electronic device; a first interaction way is an observation way in which the user's eyes are away from the first display region of the electronic device, a light beam from the second display apparatus is incident to the user's eyes to make a second perception image, a size of which is larger than that of the second display region, is perceived by the user when the user approaches the second display region of the electronic device in the second interaction way; a first perception image, a size of which is equal to that of the first display region, is perceived at the user's eyes by the user when the user moves away from the first display region of the electronic device in the first interaction way; the method further comprises:
  controlling the second display apparatus to display first display content so that the display content of the second perception image perceived by the user is first display content, when the user observes the second display region in the second interaction way;
  processing the first display content to generate second display content for display by the first display module, when the sensing parameter indicates that the interaction way between the user and the electronic device is switched from the second interaction way to the first interaction way;
  controlling the first display apparatus to display the second display content so that the display content of the first perception image perceived by the user is the second display content, when the user observes the first display region in the first interaction way.

10. The method of claim 9, wherein the first display content and the second display content are associated.

11. The method of claim 10, wherein the step of processing the first display content to generate second display content for display by the first display module comprises:
  analyzing the first display content, abstracting at least two selection items as specific content from the first display content when the first display content comprises the specific content having selection items that need to be selected and judged, and generating the second display content for display by the first display apparatus from the at least two selection items; or
  generating at least one operable data item according to a parameter featuring the first display content, and generating the second display content for display by the first display apparatus from the at least one operable data item.

12. The method of claim 10, wherein the second display content is an identification image for another electronic device to obtain the first display content;
  the step of processing the first display content to generate second display content for display by the first display module comprises:
  generating the identification image based on an address of the first display content, and generating the second display content for display by the first display module from the identification image; or
  analyzing the first display content, cutting the identification image comprised in the first display content and generating the second display content for display by the first display module from the identification image.

13. The method of claim 10, wherein the step of processing the first display content to generate second display content for display by the first display module comprises abstracting a part of display content in the first display content to generate the second display content for display by the first display module, so that a privacy level of the first display content is higher than a privacy level of the second display content.

14. The method of claim 1, wherein the sensing parameter is used to indicate an interaction way between the wearable electronic device and a user, the user observes the first display region of the first display apparatus when the electronic device is interacted with the user of the electronic device in a first interaction way, and the user observes the second display region of the second display apparatus when the electronic device is interacted with the user in a second interaction way, the first image is a first object identifier;
  controlling the second display apparatus to render the second image in the second display region with the second display effect comprises:
    determining the first object identifier;
    generating an invoke instruction based on the first object identifier;
    starting a first application corresponding to the first object identifier in response to the invoke instruction; and
    controlling a first user interaction interface corresponding to the first application to be output in the second display region of the second display apparatus, as the second image.

15. The method of claim 14, further comprising:
  obtaining the sensing parameter by the sensing apparatus of the wearable electronic device before controlling the first display apparatus to render the first image in the first display region with the first display effect;
  obtaining K object identifiers when the sensing parameter indicates that the electronic device is in the first interaction way, wherein K is a positive integer;
  controlling the first display apparatus to render the first image in the first display region with the first display effect comprises:
    obtaining a selection operation by a second sensing apparatus of the electronic device;
    determining the first object identifier from the K object identifiers according to the selection operation, and displaying the first object identifier in the first display region of the first display apparatus.

16. The method of claim 14, further comprising:
  obtaining an input operation on a first user interaction interface by a third sensing apparatus of the electronic device;
  changing the first user interaction interface to form a second user interaction interface in response to the input operation;
  obtaining the sensing parameter by the sensing apparatus of the electronic device;
  processing the second user interaction interface to generate additional information when the sensing parameter indicates that the electronic device is in the first interaction way; and
  controlling the change of the first object identifier with the additional information, and displaying the changed first object identifier comprising the additional information in the first display region by the first display module.

17. The method of claim 14, further comprising updating displaying parameter value of a bearer interface of the first user interaction interface corresponding to the first application controlled to be output in the second display region by the second display module for the same object identifier, each time when the sensing parameter indicates that the electronic device is in the second interaction way.

18. A wearable electronic device comprising:
a first turning-on unit for turning on a first display apparatus of the wearable electronic device to make the first display apparatus in a working state;
a first rendering unit for rendering a first image in a first display region of the first display apparatus with a first display effect by the first display apparatus;
an information obtaining unit for obtaining a sensing parameter related to an input operation, by a sensing apparatus of the wearable electronic device;
an operation judging unit for judging whether a second display apparatus of the wearable electronic device is to be turned on or not and obtaining a first judging result, according to the sensing parameter; and
a second rendering unit for rendering a second image in a second display region of the second display apparatus with a second display effect by the second display apparatus, when the first judging result indicates that the second display apparatus is to be turned on to make the second display apparatus in the working state,
wherein a size of the first image rendered in the first display region with the first display effect which is viewed by a user is larger than a size of the second image rendered in the second display region with the second display effect that is perceived by the user, when a distance from the user to a frame of the wearable electronic device is a first distance;
wherein a size of the first image rendered in the first display region with the first display effect which is viewed by the user is equal to a size of the first display region, when a distance from the user to a frame of the wearable electronic device is a second distance: and the second rendering unit is configured to:
control a display output of the second display apparatus at a first timing, so that the size of the second image rendered in the second display region with the second display effect which is perceived by the user is equal to the size of the first display region, when the distance from the user to the frame is the second distance: and
control the display output of the second display apparatus at a second timing after the first timing, so that the size of a third image rendered in the second display region with the second display effect which is perceived by the user is larger than the size of the first display region, when the distance from the user to the frame is the second distance;
and wherein display content of the second image is consistent with that of the first image.

19. The wearable electronic device of claim 18, wherein the first display apparatus and the second display apparatus are different display apparatuses, and the first display region and the second display region are different display regions.

20. The wearable electronic device of claim 18, wherein the first display apparatus and the second display apparatus are display apparatuses following different display principles, and a size of the first display region is larger than a size of the second display region.

21. The wearable electronic device of claim 18, wherein the first display apparatus comprises a first display screen having a first size equal to a size of the first display region;
the second display apparatus comprises a second display screen having a second size smaller than a size of the second display region;
a size of the first image rendered in the first display region with the first display effect that is viewed by a user is equal to the size of the first display region, when a distance from the user to a frame of the wearable electronic device is a second distance; and
a size of the second image rendered in the second display region with the second display effect that is perceived by the user is larger than the size of the second display region, when a distance from the user to the frame is the second distance.

22. The wearable electronic device of claim 18, wherein the sensing apparatus is a first sensing apparatus for obtaining spatial location information of the electronic device under a control of an input operation by the user; and
the operation judging unit is configured to judge whether the electronic device is moved from a first location to a second location in a gravity direction or not, and to judge whether the electronic device is rotated from a first angle to a second angle around a first operating body of the user as a center, according to the spatial location information.

23. The wearable electronic device of claim 18, wherein the sensing apparatus is a second sensing apparatus for sensing control operation information generated when a second operating body of the user is approaching or contacting a sensing region comprising at least a part of the first display region and at least a part of the second display region; and the operation judging unit is configured to judge whether the second operating body slides from the at least a part of the first display region to the at least a part of the second display region or not, according to the control operation information.

24. The wearable electronic device of claim 18, wherein the second rendering unit is configured to:
control a display output of the first display apparatus at a first timing, so that the size of the first image rendered in the first display region with the first display effect which is viewed by the user is equal to a size of the first display region, when a distance from the user to a frame of the wearable electronic device is the second distance; and
control the display output of the first display apparatus at a second timing after the first timing, so that the size of the first image rendered in the first display region with the first display effect that is viewed by the user is smaller than the size of the first display region, when the distance from the user to the frame is the second distance;
control the display output of the second display apparatus at a third timing after the second timing, so that a size of the second image rendered in the second display region with the second display effect that is perceived by the user is smaller than the size of the first display region, when the distance from the user to the frame is the second distance; and
control the display output of the second display apparatus at a fourth timing after the third timing, so that a size of a third image rendered in the second display region with the second display effect that is perceived by the user is larger than the size of the first display region, when the distance from the user to the frame is the second distance;
and wherein the size of the second image perceived by the user at the third timing is equal to the size of the first image viewed by the user at the second timing, and display content of the second image is consistent with that of the first image.

25. The wearable electronic device of claim 18, wherein the sensing parameter is used to indicate an interaction way between the wearable electronic device and the user; a second interaction way is an observation way in which a user's eyes are close to the second display region of the electronic device; a first interaction way is an observation way in which the user's eyes are away from the first display region of the electronic device, a light beam from the second display apparatus is incident to the user's eyes to make a second perception image, a size of which is larger than a size of the second display region, is perceived by the user when the user approaches the second display region of the electronic device in the second interaction way; a first perception image, a size of which is equal to a size of the first display region, is perceived at the user's eyes by the user when the user moves away from the first display region of the electronic device in the first interaction way;

the wearable electronic device further comprises:
a first controlling unit for controlling the second display apparatus to display first display content so that the display content of the second perception image perceived by the user is a first display content, when the user observes the second display region in the second interaction way;
a processing unit for processing the first display content to generate second display content for display by the first display module, when the sensing parameter indicates that the interaction way between the user and the electronic device is switched from the second interaction way to the first interaction way;
a second controlling unit for controlling the first display apparatus to display the second display content so that the display content of the first perception image perceived by the user is the second display content, when the user observes the first display region in the first interaction way.

26. The wearable electronic device of claim 25, wherein the first display content and the second display content are associated.

27. The wearable electronic device of claim 25, wherein the processing unit is configured to:
analyze the first display content, to abstract at least two selection items as specific content from the first display content when the first display content comprises the specific content having selection items that needs to be selected and judged, and to generate the second display content for display by the first display apparatus from the at least two selection items; or
generate at least one operable data item according to a parameter featuring the first display content, and generate the second display content for display by the first display apparatus from the at least one operable data item.

28. The wearable electronic device of claim 25, wherein the second display content is an identification image for another electronic device to obtain the first display content; and the processing unit is configured to:
generate the identification image based on an address of the first display content, and generate the second display content for display by the first display module from the identification image; or
analyze the first display content, cut the identification image comprised in the first display content and generate the second display content for display by the first display module from the identification image.

29. The wearable electronic device of claim 25, wherein the processing unit is configured to abstract a part of display content in the first display content to generate the second display content for display by the first display module, so that a privacy level of the first display content is higher than that of the second display content.

30. The wearable electronic device of claim 18, wherein the sensing parameter is used to indicate an interaction way between the wearable electronic device and a user, the user observes the first display region of the first display apparatus when the electronic device is interacted with the user of the electronic device in a first interaction way, and observes the second display region of the second display apparatus when the electronic device is interacted with the user in a second interaction way, the first image is a first object identifier;
the second rendering unit comprises:
an identifier determining unit for determining the first object identifier;
an instruction generating unit for generating an invoke instruction based on the first object identifier;
an application starting unit for starting a first application corresponding to the first object identifier in response to the invoke instruction; and
a first output controlling unit for controlling a first user interaction interface corresponding to the first application to be output in the second display region of the second display apparatus, as the second image.

31. The wearable electronic device of claim 30, further comprising:
a second information obtaining unit for obtaining the sensing parameter by the sensing apparatus of the wearable electronic device before controlling the first display apparatus to render the first image in the first display region with the first display effect;
a second output controlling unit for obtaining K object identifiers when the sensing parameter indicates that the electronic device is in the first interaction way, wherein K is a positive integer;
the first rendering unit comprising:
a selection obtaining unit for obtaining a selection operation by a second sensing apparatus of the electronic device; and
an identifier display unit for determining the first object identifier from the K object identifiers according to the selection operation, and displaying the first object identifier in the first display region of the first display apparatus.

32. The wearable electronic device of claim 30, further comprising:
a third information obtaining unit for obtaining an input operation on a first user interaction interface by a third sensing apparatus of the electronic device;
an interface changing unit for changing the first user interaction interface to form a second user interaction interface in response to the input operation;
a fourth information obtaining unit for obtaining the sensing parameter by the sensing apparatus of the electronic device;
an additional information generating unit for processing the second user interaction interface to generate additional information when the sensing parameter indicates that the electronic device is in the first interaction way; and
an identifier changing unit for controlling the change of the first object identifier with the additional information, and displaying the changed first object identifier comprising the additional information in the first display region by the first display module.

33. The wearable electronic device of claim 30, further comprising an updating unit for updating displaying parameter value of a bearer interface of the first user interaction interface corresponding to the first application controlled to be output by the second display region of the second display module for the same object identifier, each time when the sensing parameter indicates that the electronic device is in the second interaction way.

34. A non-transitory information recording medium having stored therein a program, wherein when the program is executed by a processor of a wearable electronic device, the program instructs the wearable electronic device to perform a display switching method by the following steps:
- turning on a first display apparatus of the wearable electronic device to make the first display apparatus in a working state;
- rendering a first image in a first display region of the first display apparatus with a first display effect by the first display apparatus;
- obtaining first parameter information related to an input operation by a sensing apparatus of the wearable electronic device;
- judging whether a second display apparatus of the wearable electronic device is to be turned on or not and obtaining a first judging result, according to the sensing parameter; and
- rendering a second image in a second display region of the second display apparatus with a second display effect by the second display apparatus, when the first judging result indicates that the second display apparatus is to be turned on to make the second display apparatus in the working state,
- wherein a size of the first image rendered in the first display region with the first display effect which is viewed by a user is larger than a size of the second image rendered in the second display region with the second display effect that is perceived by the user, when a distance from the user to a frame of the wearable electronic device is a first distance;
- wherein a size of the first image rendered in the first display region with the first display effect which is viewed by the user is equal to a size of the first display region, when a distance from the user to a frame of the wearable electronic device is a second distance: and
- the step of rendering a second image in the second display region with a second display effect by the second display apparatus comprises:
- controlling a display output of the second display apparatus at a first timing, so that the size of the second image rendered in the second display region with the second display effect which is perceived by the user is equal to the size of the first display region, when the distance from the user to the frame is the second distance; and
- controlling the display output of the second display apparatus at a second timing after the first timing, so that the size of a third image rendered in the second display region with the second display effect which is perceived by the user is larger than the size of the first display region, when the distance from the user to the frame is the second distance;
- and wherein display content of the second image is consistent with that of the first image.

* * * * *